United States Patent
Yeh et al.

(10) Patent No.: US 12,323,319 B2
(45) Date of Patent: Jun. 3, 2025

(54) RELIABILITY ENHANCEMENTS FOR MULTI-ACCESS TRAFFIC MANAGEMENT

(71) Applicant: Intel Corporation, Santa Clara, CA (US)

(72) Inventors: Shu-ping Yeh, Campbell, CA (US); Wei Mao, San Jose, CA (US); Hosein Nikopour, San Jose, CA (US); Shilpa Talwar, Santa Clara, CA (US); Murali Narasimha, Lake Oswego, OR (US); Jingwen Bai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 635 days.

(21) Appl. No.: 17/550,936

(22) Filed: Dec. 14, 2021

(65) Prior Publication Data
US 2022/0109622 A1  Apr. 7, 2022

(51) Int. Cl.
*H04L 45/121* (2022.01)
*H04L 45/302* (2022.01)
(Continued)

(52) U.S. Cl.
CPC .......... *H04L 45/121* (2013.01); *H04L 45/302* (2013.01); *H04L 47/215* (2013.01); *H04L 69/22* (2013.01)

(58) Field of Classification Search
CPC ... H04L 45/121; H04L 45/302; H04L 47/215; H04L 69/22; H04L 67/10; H04L 67/12;
(Continued)

(56) References Cited

U.S. PATENT DOCUMENTS

| 2015/0029879 A1* | 1/2015 | Chou | H04B 7/0686 370/252 |
| 2022/0150769 A1* | 5/2022 | Vivanco | H04W 36/38 |

(Continued)

FOREIGN PATENT DOCUMENTS

WO   WO-2021201933 A1 * 10/2021 ............ H04W 28/02

OTHER PUBLICATIONS

Jing Zhu, Multi-access Traffic Management at the Edge, Sep. 2020, 3 Pages, https://www.intel.com/content/www/us/en/research/blogs/multi-access-traffic-management-edge.html (Year: 2020).*
(Continued)

*Primary Examiner* — Liem H. Nguyen
(74) *Attorney, Agent, or Firm* — Schwabe, Williamson & Wyatt, P.C.

(57) ABSTRACT

The present disclosure is related to multi-access traffic management in multi-access computing environments. A reliability enhancement engine (REE) operated by a multi-access multipath traffic manager identifies traffic flows that have high reliability requirements ("reliability flows") and performs admission control for the reliability flows. The REE determines a coding rate (e.g., a redundancy factor) and traffic distribution strategies for the identified reliability flows. The REE applies cross-access network coding (NC) on the reliability flows, and handles multi-access acknowledgements and traffic pacing, which may involve multiplexing traffic of the reliability flows with non-high-reliability traffic. Other embodiments may be described and/or claimed.

28 Claims, 16 Drawing Sheets

(51) Int. Cl.
*H04L 47/215* (2022.01)
*H04L 69/22* (2022.01)

(58) Field of Classification Search
CPC ....... H04L 67/566; H04L 69/14; H04L 69/24; H04L 69/40; Y02D 30/50
See application file for complete search history.

(56) References Cited

U.S. PATENT DOCUMENTS

| | | | | |
|---|---|---|---|---|
| 2022/0338208 | A1* | 10/2022 | Chen | H04W 28/0967 |
| 2023/0092997 | A1* | 3/2023 | Mody | H04L 47/29 370/235 |

OTHER PUBLICATIONS

"3rd Generation Partnership Project; Technical Specification Group Radio Access Network; NG-RAN; Architecture description (Release 16)", 3GPP TS 38.401 V16.6.0, 79 pages (Jul. 1, 2021).
"O-RAN Operations and Maintenance Interface Specification", O-RAN.WG1.O1-Interface.0-v04.00, O-RAN Alliance, 66 pages (Nov. 2020).
"O-RAN Operations and Maintenance Architecture", O-RAN.WG1. OAM-Architecture-v04.00 2020, O-RAN Alliance, 54 pages (Nov. 2020).
"O-RAN Architecture Description", O-RAN.WG1.O-RAN-Architecture-Description-v04.00, O-RAN Alliance, 33 pages (Mar. 2021).
"O-RAN Working Group 3, Near-Real-time RAN Intelligent Controller, E2 Application Protocol (E2AP)", O-RAN.WG3.E2AP-v01.01, O-RAN Alliance, 84 pages (Jul. 2020).
"O-RAN Fronthaul Working Group Control, User and Synchronization Plane Specification", O-RAN.WG4.CUS.0-v06.00, O-RAN Alliance, 298 pages (Mar. 2021).
O-Ran Alliance, "O-RAN Fronthaul Working Group Control, User and Synchronization Plane Specification", O-RAN.WG4.CUS.0-v06.00, O-RAN Alliance, 298 pages (Mar. 2021).
O-Ran Alliance, "Cloud Architecture and Deployment Scenarios for O-RAN Virtualized RAN", O-RAN.WG6.CAD-v02.01, O-RAN Alliance, 52 pages (Jul. 2020).
"O-RAN Working Group 3 Near-Real-time RAN Intelligent Controller E2 Service Model (E2SM) KPM", ORAN-WG3.E2SM-KPM-v01.00.00, O-RAN Alliance, 44 pages (Feb. 2020).
"O-RAN Working Group 3 Near-Real-time RAN Intelligent Controller E2 Service Model (E2SM), RAN Function Network Interface (NI)", ORAN-WG3.E2SM-NI-v01.00.00, O-RAN Alliance, 44 pages (Feb. 2020).
"O-RAN Working Group 3 Near-Real-time RAN Intelligent Controller", ORAN-WG3.E2SM-v01.00.00, O-RAN Alliance, 27 pages (Feb. 2020).
Changhoon Kim et al., "Barefoot Networks Advanced Data-Plane Telemetry", One Connect, 23 pages (Dec. 2018).
Erik Chromy et al., "Admission Control Methods in IP Networks", Advances in Multimedia, vol. 2013, Article ID 918930, 7 pages (2013), https://doi.org/10.1155/2013/918930.
Shu Fan et al., "Cross-Layer Control with Worst Case Delay Guarantees in Multihop Wireless Networks", Journal of Electrical and Computer Engineering, vol. 2016, Article ID 5762851, 11 pages (Oct. 10, 2016), https://www.hindawi.com/journals/jece/2016/5762851/.
3GPP, "3rd Generation Partnership Project; Technical Specification Group Services and System Aspects; System architecture for the 5G System (5GS); Stage 2 (Release 17)", 3GPP TS 23.501 v17.2.0, 542 pages (Sep. 24, 2021).
3GPP, "3rd Generation Partnership Project; Technical Specification Group Services and System Aspects; Architecture for enabling Edge Applications; (Release 17)", 3GPP TS 23.558 v17.1.0, 162 pages (Sep. 24, 2021).
3GPP, "3rd Generation Partnership Project; Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 16)", 3GPP TS 36.361 V16.0.0, 10 pages (Jul. 24, 2020).
3GPP, "3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 v16.7.0, 89 pages (Sep. 27, 2021).
3GPP, "3rd Generation Partnership Project; Technical Specification Group Radio Access Network; NG-RAN; Architecture description (Release 16)", 3GPP TS 38.401 v16.7.0, 79 pages (Oct. 1, 2021).
Kok-Lim Alvin Yau et al., "Application of Reinforcement Learning in Cognitive Radio Networks: Models and Algorithms", 2014, 24 pages, The Scientific World Journal, vol. 2014, Article ID 209810.
Volodymyr Mnih et al, "Human-level control through deep reinforcement learning", Feb. 26, 2015, 13 pages, vol. 518.
Julien Perez et al, "Utility-based Reinforcement Learning for Reactive Grids", May 2008, 10 pages, The 5th IEEE International Conference on Autonomic Computing, Chicago, USA.
Max Pumperla et a., "Deep Learning and the Game of Go", 2019, 22 pages.
David Silver et al., "Deterministic Policy Gradient Algorithms", 2014, 9 pages, Proceedings of the 31st International Conference on Machine Learning, Beijing, China, 2014. JMLR: W&CP vol. 32.
Richard S. Sutton et al., "Reinforcement Learning: An Introduction", Nov. 5, 2017, 445 pages, London, England.
Csaba Szepesvari, "Algorithms for Reinforcement Learning", Jun. 9, 2009, 98 pages.
Yunhao Tang, "Introduction to Deep Learning with Tensorflow", Feb. 25, 2019, 153 pages, Department of IEOR, Columbia University.
Huasen Wu et al.,"Adaptive Exploration-Exploitation Tradeoff for Opportunistic Bandits", Nov. 30, 2018, 18 pages, arXiv:1709.04004v2 [cs.LG].
Zhao et al., "Improving Worst-Case Delay Analysis for Traffic of Additional Stream Reservation Class in Ethernet-AVB Network", Sensors 18, No. 11: 3849, 18 pages (Nov. 9, 2018), https://www.mdpi.com/1424-8220/18/11/3849/htm.
Hunt et al., "Enhanced Utilization Telemetry for Polling Workloads with collectd and the Data Plane Development Kit (DPDK) User Guide", Intel Corp., 14 pages (last updated: Aug. 19, 2020) https://networkbuilders.intel.com/solutionslibrary/enhanced-utilization-telemetry-for-polling-workloads-with-collectd-and-the-data-plane-development-kit-dpdk-user-guide.
"In-band Network Telemetry (INT) Dataplane Specification Version 2.1", The P4.org Applications Working Group, 56 pages (Nov. 22, 2020), https://p4.org/p4-spec/docs/INT_v2_1.pdf.
Johnson et al., "NexRAN: Closed-loop RAN slicing in Powder—A top-to-bottom open-source open-RAN use case", The 15th ACM Workshop on Wireless Network Testbeds, Experimental evaluation & CHaracterization (WiNTECH), pp. 17-23 (Jan. 31, 2022), https://www.flux.utah.edu/paper/oran-slicing.
Milić et al., "New Concepts of Asynchronous Circuits Worst-Case Delay and Yield Estimation", Micro Electronic and Mechanical Systems, Ch. 25, Kenichi Takahata (ed.), IntechOpen, 24 pages (Dec. 1, 2009), https://www.intechopen.com/chapters/6644.
Yaguang Yang, "A Flow Network Model for Software Reliability Assessment", Sixth American Nuclear Society International Topical Meeting on Nuclear Plant Instrumentation, Control, and Human-Machine Interface Technologies NPIC&HMIT 2009, Knoxville, Tennessee, Apr. 5-9, 2009, on CD-ROM, American Nuclear Society, LaGrange Park, IL, 14 pages (Apr. 5, 2009).
Michael J. Neely, "Opportunistic Scheduling with Worst Case Delay Guarantees in Single and Multi-Hop Networks", Proceedings IEEE INFOCOM, 2011, pp. 1728-1736 (Apr. 10, 2011), https://ee.usc.edu/stochastic-nets/docs/wc-delay-infocom2011.pdf.
Henry D. Pfister, "A Short Introduction to Channel Coding", Supplemental Material for Graphical Models and Inference, 21 pages (Sep. 15, 2015), http://pfister.ee.duke.edu/courses/ece590_gmi/coding_intro.pdf.

(56) References Cited

OTHER PUBLICATIONS

Prof. John A. Stankovic et al., "Admission Control, Reservation, and Reflection in Operating Sytsems", Appeared in IEEE Bulletin of the Technical Committee on Operating Systems and Application Environments (TCOS), vol. 10, No. 2, Summer 1998, 6 pages (1998), https://citeseerx.ist.psu.edu/viewdoc/download?doi=10.1.1.57.2026&rep=rep1&type=pdf.

"3rd Generation Partnership Project; Technical Specification Group Services and System Aspects; System architecture for the 5G System (5GS); Stage 2 (Release 17)", 3GPP TS 23.501 v17.3.0, 559 pages (Dec. 23, 2021).

"3rd Generation Partnership Project; Technical Specification Group Services and System Aspects; Management and orchestration; Concepts, use cases and requirements (Release 17)" 3GPP TS 28.530 v17.2.0, 37 pages (Dec. 23, 2021).

"3rd Generation Partnership Project; Technical Specification Group Services and System Aspects; Management and orchestration; Performance assurance (Release 16)", 3GPP TS 28.550 v16.8.0, 85 pages (Sep. 23, 2021).

"3rd Generation Partnership Project; Technical Specification Group Services and System Aspects; Telecommunication management; Performance Management (PM); Concept and requirements (Release 16)", 3GPP TS 32.401 v16.0.0, 29 pages (Jul. 10, 2020).

"3rd Generation Partnership Project; Technical Specification Group Services and System Aspects; Telecommunication management; Subscriber and equipment trace; Trace concepts and requirements (Release 17)", 3GPP TS 32.421 v17.3.0, 49 pages (Dec. 23, 2021).

"Zero-touch network and Service Management (ZSM); Reference Architecture", ETSI GS ZSM 002 V1.1.1, 80 pages (Aug. 2019).

X. Geng et al., "5G End-to-end Network Slice Mapping from the view of Transport Network", IETF, draft-geng-teas-network-slice-mapping-04, 19 pages (Oct. 25, 2021), https://www.ietf.org/archive/id/draft-geng-teas-network-slice-mapping-04.html.

A. Farrel et al., "Framework for IETF Network Slices", IETF, draft-ietf-teas-ietf-network-slices-05, 40 pages (Oct. 25, 2021), https://www.ietf.org/archive/id/draft-ietf-teas-ietf-network-slices-05.txt.

Mnavarro, "Architecture", ONAP Developer Wiki, 4 pages (Jul. 26, 2019; retrieved on Dec. 23, 2021), https://wiki.onap.org/display/DW/Architecture.

Lillicrap et al., "Continuous Control With Deep Reinforcement Learning", arXiv:1509.02971v6 [cs.LG], London, U.K., 14 pages (Jul. 5, 2019).

Langford et al., "The Epoch-Greedy Algorithm for Multi-armed Bandits with Side Information", Advances in Neural Information Processing Systems (NIPS), vol. 20, 8 pages (2007), https://papers.nips.cc/paper/2007/file/4b04a686b0ad13dce35fa99fa4161c65-Paper.pdf.

Konda et al., "Actor-Critic Algorithms", Advances in Neural Information Processing Systems (NIPS), vol. 12, pp. 1008-1014 (2000).

Konda, "Actor-Critic Algorithms", MIT PhD Thesis, 147 pages (Jun. 2002).

Toro Icarte et al., "Reward Machines: Exploiting Reward Function Structure in Reinforcement Learning", arXiv:2010.03950v1 [cs.LG], 31 pages (Oct. 6, 2020).

Dalal et al., "Safe Exploration in Continuous Action Spaces", arXiv:1801.08757v1, 9 pages (Jan. 26, 2018).

Wirth et al., "Model-Free Preference-Based Reinforcement Learning", Proceedings of the Thirtieth Association for the Advancement of Artificial Intelligence (AAAI-16), Germany, pp. 2222-2228 (Mar. 2, 2016), https://www.aaai.org/ocs/index.php/AAAI/AAAI16/paper/viewFile/12247/11865.

Agrawal, "Reinforcement Learning: Lecture Notes, Spring 2019", Columbia University IEOR 8100, 104 pages (2019).

Bengio et al., "Learning Long-Term Dependencies with Gradient Descent is Difficult", IEEE Transactions on Neural Networks, vol. 5, No. 2, pp. 157-166 (Mar. 1994).

Bengio et al., "Representation Learning: A Review and New Perspectives", arXiv:1206.5538v3 [cs.LG], 30 pages (Apr. 23, 2014).

Chia-Yu Chang, "Cloudification and Slicing in 5G Radio Access Network", Networking and Internet Architecture [cs.NI], Sorbonne Université, 2018, NNT: 2018SORUS293, HAL id: tel-02501244, version 1, 227 pages (Mar. 6, 2020).

Coronado et al., "Zero Touch Management: A Survey of Network Automation Solutions for 5G and 6G Networks", IEEE Communications Survey s & Tutorials, vol. 24, No. 4, Fourth Quarter, pp. 2535-2578, 44 pages, (2022).

* cited by examiner

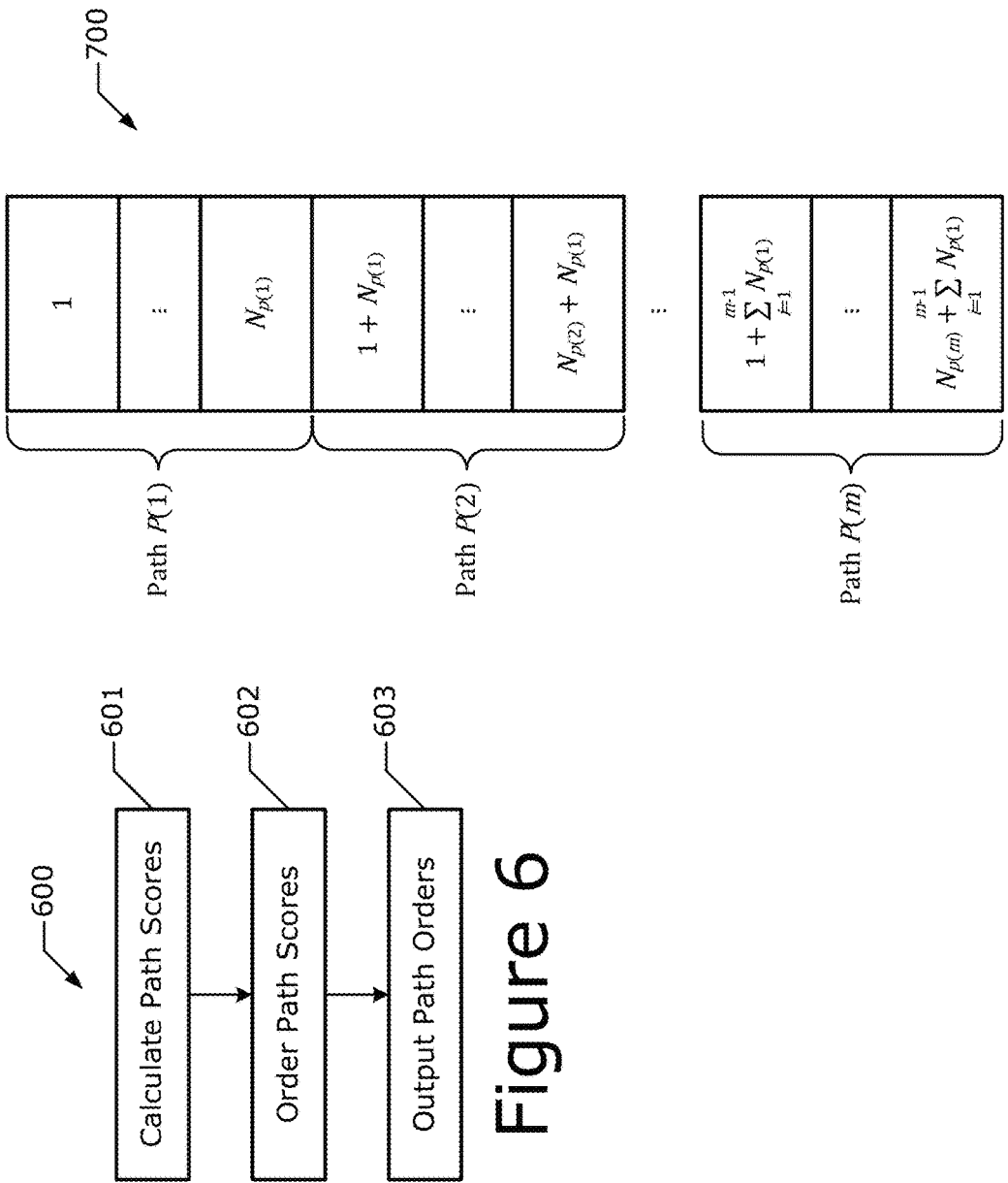

RELIABILITY ENHANCEMENTS FOR MULTI-ACCESS TRAFFIC MANAGEMENT

TECHNICAL FIELD

Embodiments described herein generally relate to edge computing, network communication, communication system implementations, and artificial intelligence (AI) and machine learning (ML), and in particular, to AI/ML techniques for managing traffic in multi-access communications networks.

BACKGROUND

Multi-access technology involves, for example, user equipment (UE) that have more than one radio interface that can access multiple radio access networks (RANs) that implement different radio access technologies (RATs). However, what is currently missing are strategies for efficiently managing the multi-access traffic to meet diverse quality-of-service (QoS) requirements of various applications.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 6 depicts a path ordering process according to various embodiments. FIG. 7 depicts an example packet transmission indexing according to various embodiments.

DETAILED DESCRIPTION

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment.

1. Reliability Enhancement Engine for Edge-Based Multi-Access Traffic Management Edge computing technologies (ECTs) are emerging technologies that provide intelligence at the network's edge to address the need of latency-sensitive applications, such as gaming, autonomous driving, and factory automation, and the like. One such emerging ECT is ETSI Multi-access Edge Computing (MEC) (see e.g., [MEC]). ECTs offer a more efficient compute-offload model by placing distributed computing and storage resources in proximity to data providers and consumers. As more and more client devices (e.g., UEs 1521, 1511 of FIG. 15) are equipped with multiple radio interfaces, and can access multiple radio access networks (RANs) (see e.g., RANs including one or more NANs 1531-1533 of FIG. 15) using multiple types of radio access technologies (RATs) (e.g., 5G/NR, LTE, WiFi, LoRa, etc.). there has been increasing interest to establish multiple concurrent connections between multi-radio devices and the network for enhanced bandwidth and reliability. The rise of ECTs inspires a new multi-access traffic convergence model: by placing a new multi-access convergence point at the edge, an intelligent traffic manager can distribute packets across multiple paths to achieve better quality-of-service (QoS).

The present disclosure provides, inter alia, a reliability enhancement engine for edge-based multi-access traffic management. The reliability enhancement engine identifies flow(s) requiring extra reliability protection, applies additional network coding on top of the identified traffic flow, computes coding rate and rules to distribute traffic across available multi-access links based on reliability requirement.

Figure 1:
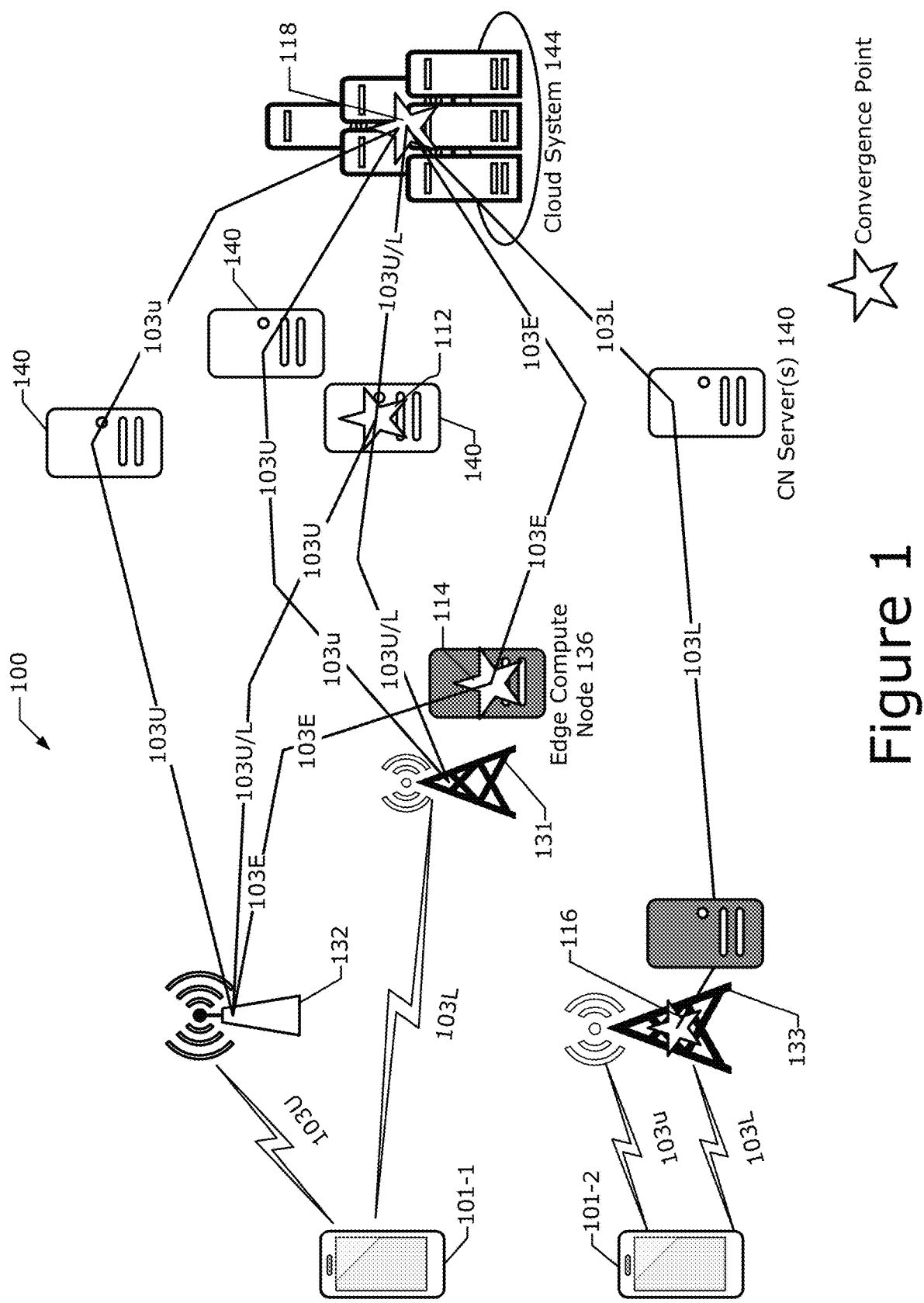
FIG. 1 depicts an example Multi-RAT network with different convergence architectures.

FIG. 1 depicts an example multi-access network 100 with different convergence points. The multi-access network 100 includes compute nodes 101 (which may correspond to UEs 1521, 1511 of FIG. 15), which are computing systems/devices that are capable of obtaining services from the cloud system 144 (which may correspond to cloud 1544 of FIG. 15), an edge computing service (which may correspond to edge network 1535 of FIG. 15) including the edge compute node 136 (which may correspond to edge compute nodes 1536 of FIG. 15), and/or a core network including core network (CN) server(s) 140 (which may correspond to CN 1542 of FIG. 15).

The compute nodes 101 are capable of accessing such services using one or more radio access technologies (RATs), which may be the same or different than one another. The network access may include licensed access or unlicensed access. The licensed access is represented by a series of connections/links 103L (e.g., making up respective paths 103L) and the unlicensed access is represented by a series of connections/links 103U (e.g., making up respective paths 103U). The connections 103U/L may be used for either licensed or unlicensed access.

The edge compute node 136 is disposed at an edge of a corresponding access network (e.g., networks provided by NANs 131, 132, 133). The edge compute node 136 is co-located with network access node (NAN) 133 in FIG. 1 (which may be the same or similar as any of NANs 1531, 1532, 1533 of FIG. 15). The edge compute node 136 provides computing resources and/or various services (e.g., computational task and/or workload offloading, cloud-computing capabilities, IT services, and other like resources and/or services as discussed herein) in relatively close proximity to network subscribers (e.g., compute nodes 101 also referred to as "UEs," "edge users," and/or the like). The virtualization infrastructure (VI) of edge compute node 136 provides virtualized environments and virtualized resources for the edge compute node 136, and the edge computing applications may run as VMs and/or application containers on top of the VI. Additionally or alternatively, the edge compute node 136 may be part of an edge cloud and/or an edge computing framework, such as those described herein.

When a compute node 101 has multiple radio interfaces (or multiple communication chips/circuitries), the compute node 101 can transmit and/or receive data through multiple paths. This means that there can be different multi-radio or multi-path convergence points 112, 114, 116, 118 to aggregate and/or distribute traffic between e2e communication link(s). According to various embodiments, when a compute node 101 has multiple radio interfaces, a new multi-radio convergence point 114 can take place at the edge of the network (e.g., at edge server 136 in FIG. 1) to offer multi-path traffic management for low latency communication as envisioned for 3GPP 5G/NR networks (see e.g., [AC6833Z], [AC6833PCT]). With new intelligence enabled by edge-computing, multi-RAT deployments can be utilized more efficiently by cleverly distributing traffic to multiple network paths based on edge measurements.

Algorithms and techniques to optimally leverage such multi-link aggregation may boost both the peak rates as well as the area spectral efficiency in 3GPP NR/5G wireless networks. Smart UE to AP association strategies in multi-RAT HetNets has attracted significant interest from both academia and industry. Most of the work in this area, however, does not leverage UE multi-link aggregation capabilities, and do not account for dynamic distribution of traffic and resource allocation across multiple RATs.

There are multiple existing solutions to realize multi-radio convergence. As shown in FIG. 1, the convergence point 116 can be at the NAN 133 in FIG. 1, which may involve a WLAN access point (AP) or a small cell base station. The NAN 133 may operate according to LTE-WiFi Aggregation (LWA) (see e.g., Sirotkin, "LTE-WLAN Aggregation (LWA): Benefits and Deployment Considerations," Intel® White Paper, available at: http://www.intel.com/content/www/us/en/wireless-network/lte-wlan-aggregation-deployment-white-paper.html ("[Sirotkin]"), 3GPP TS 36.465 v15.0.0 (2018 Jun. 22), LTE-WLAN Radio Level Integration Using IPsec Tunnel (LWIP) (see e.g., 3GPP TS 36.361 v16.0.0 (2020 Jul. 24) ("[TS36361]")), and Multi-Radio Dual Connectivity (MR-DC) (see e.g., 3GPP TS 37.340 v 16.7.0 (2021 Sep. 27) ("[TS37340]")), at the TCP layer or application layer (see e.g., multi-path TCP (MPTCP) (see e.g., Ford et al, "TCP Extensions for Multipath Operation with Multiple Addresses", Internet Engineering Task Force (IETF) RFC 6824 (January 2013) and IETF Multipath TCP working group, available at: https://datatrackerietf.org/wg/mptcp/documents/(collectively "[MPTCP]")) and/or Quick UDP (QUIC) (see e.g., Iyengar et al., "QUIC: A UDP-Based Multiplexed and Secure Transport", draft-ietf-quic-transport-27, Standards Track (21 Feb. 2020) ("[QUIC]"), and/or at arbitrary servers within the network via Generic Multi-Access (GMA) (see e.g., Zhu et al., "Generic Multi-Access (GMA) Convergence Encapsulation Protocols," IETF INTAREA/Network Working Group, version 12, draft-zhu-intarea-gma-12 (21 Oct. 2021) ("[GMA]"). 3GPP has also defined dual-connectivity solutions to support simultaneous connections to more than one cellular nodes such as LTE eNBs, NR gNBs, and the like (see e.g., [TS37340]).

Regarding strategies to distribute traffic across multiple radio paths, past solutions, such as those discussed in Singh et al., "Optimal Traffic Aggregation in Multi-RAT Heterogeneous Wireless Networks," 2016 *IEEE International Conference on Communications Workshops* (ICC), Kuala Lumpur (2016) ("[Singh]"), focused on optimizing throughput performance for best-effort traffic only. The approach discussed in [Singh], focuses on multi-radio convergence at the RAN or access point (e.g., convergence point 116 in FIG. 1). Additionally, [AC6833PCT] provides strategies to improve delay performance for delay-sensitive traffic. However, the solutions discussed in [Singh] and [AC6833PCT] cannot provide reliability guarantee. Simple repetitive transmission of the same packet over multiple paths can improve reliability at the cost of inefficient radio resource usages. There is no prior work that provides guidelines for utilizing multi-path to achieve reliability target with efficient radio usage and minimum latency. Furthermore, network coding has been proposed to efficiently enhance reliability for end-to-end (e2e) network connectivity. However, the manner in which RAN information should be utilized for networking coding at the edge is not considered in such solutions.

The present disclosure adds reliability enhancements to the edge-based multi-access traffic manager discussed in [AC6833PCT], which may include a reliability enhancement engine at edge multi-access/multipath traffic manager. The reliability enhancement engine identifies traffic flows requiring extra reliability support and performs admission control for flows demanding high reliability guarantees. Additionally or alternatively, the reliability enhancement engine calculates a coding rate (e.g., redundancy factor) and traffic distribution rules for flows identified for reliability enhancement, and then applies cross-access Network Coding (NC) on various traffic flows. Additionally or alternatively, the reliability enhancement engine handles Multi-Access acknowledgement (ACK) and traffic pacing (e.g., multiplexing with non-high-reliability traffic). The edge-based traffic management embodiments discussed herein provides extra reliability support while providing better worst-case delay guarantees and/or better resource utilization efficiency. The edge-based traffic management embodiments discussed herein enables more high reliability delay sensitive applications for ECTs.

Additionally or alternatively, the reliability enhancement engine discussed herein may be implemented in or with the reinforcement learning (RL) traffic management framework discussed in U.S. application Ser. No. 17/484,743 filed on 24 Sep. 2021 ("[AD2644-US]"), the contents of which is hereby incorporated by reference in its entirety. The various traffic management techniques discussed herein can be used to realize edge/cloud RAN intelligence that can potentially offer unprecedented QoS improvements and enhancements. Specific implementations of the embodiments herein can be provided by various standards and/or specification such as 3GPP (including 3GPP SA6 EDGEAPP architecture), ETSI MEC, Open RAN (O-RAN) Alliance, OpenNESS, and/or the like. For example, message format and message exchange signaling between edge/cloud server and RAN nodes can be specified in such standards/specifications.

1.1. Multi-Access Traffic Manager (MA-TM) Aspects

Figure 2:
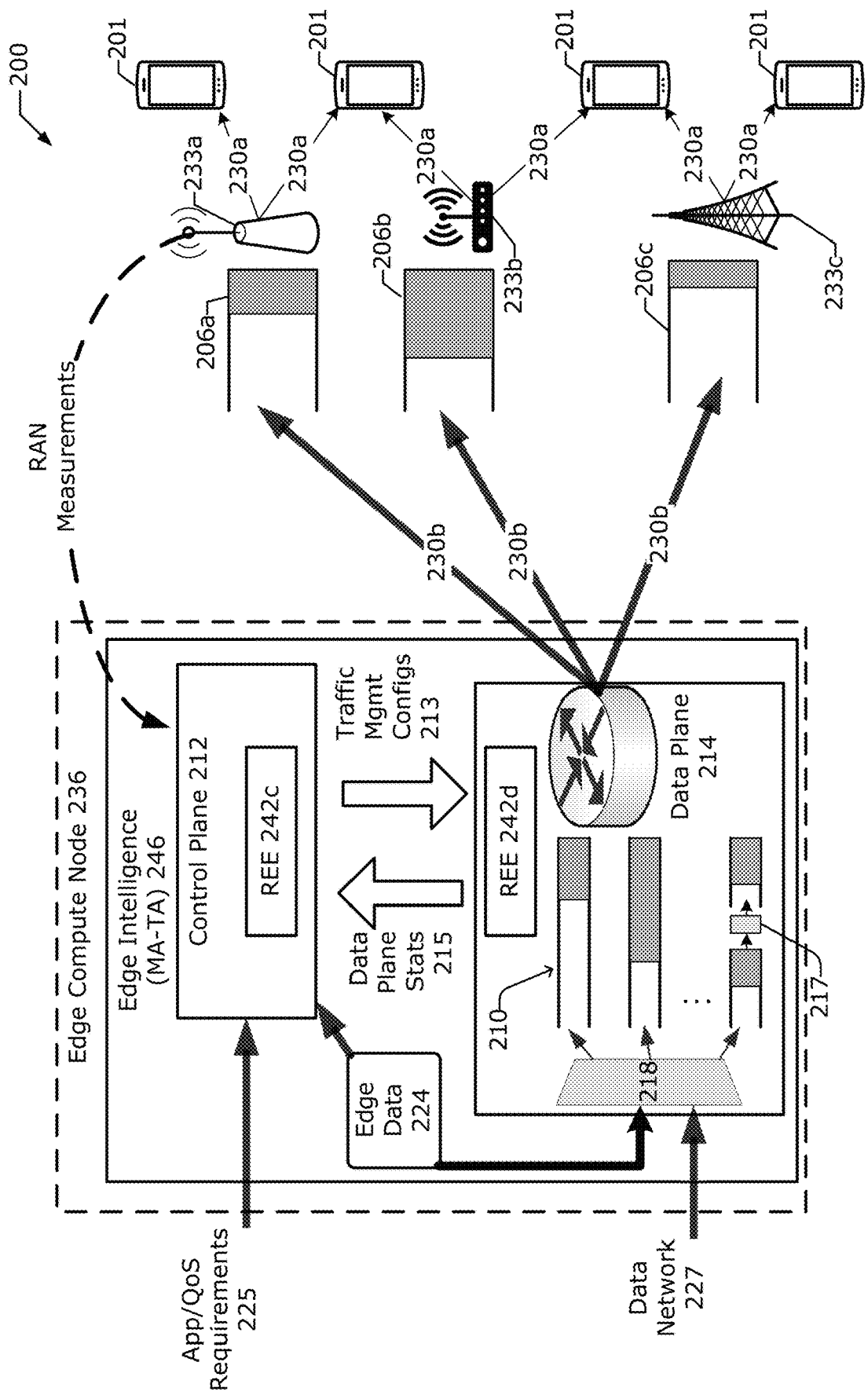
FIG. 2 depicts an example edge-based multi-access traffic management framework.

FIG. 2 depicts an example edge-based multi-access traffic management framework 200. In this example, compute nodes 201 with multiple radio interfaces can simultaneously establish more than one connection to the edge network (e.g., an edge network including edge node 236, edge cloud, and/or the like). For example, in a network including heterogeneous radio access technologies (RATs) (e.g., LTE, 5G/NR, WiFi, etc.) as last-hop connectivity, UEs 201 with multiple radio interfaces can simultaneously connect to wireless infrastructure 233a-c of different RATs such as LTE small-cell base stations (BS) 233a, macro-cell BS 5G gNB 233c, WLAN access points (AP) 233b, etc., as shown in FIG. 2. The UEs 201 may be the same or similar as the UEs 101 discussed previously, and/or UEs 1511, 1512 discussed infra, and the NANs 233a-c may be the same or similar as the NANs 1531-1533 discussed infra. The edge node 236 and individual UEs 201 can utilize convergence technology (e.g., GMA, etc.), at the data plane to distribute and aggregate traffic over multiple paths. Another example is that UE 201 can establish dual connectivity as specified in 3GPP and the edge intelligence 246 resides in the central unit (CU) (see e.g., [TS37340]).

Drastically increasing demand for wireless data and devices has led to an increasing requirement for both peak rates and area spectral efficiency. This, in turn, has led to an increasingly denser and heterogeneous deployment of wireless infrastructure, where the deployed networks are disparate in various features, such as access technology (RAT), coverage area per access network node, deployed frequency band and bandwidth, and backhaul capabilities. As a result, most of the UEs 201 in a dense wireless network are usually located in overlapping coverage areas of multiple access network nodes of differing RATs. UEs 201 with the ability to aggregate traffic from multiple radio links or RATs (e.g. 5G, LTE, WLAN, WiMAX, Bluetooth®, etc.) can leverage multi-link aggregation to boost their throughput and QoS. The rise of heterogeneous wireless network (HetNet) deployments with mixed topologies and different RATs along with UEs 201 with multiple radio interfaces being commonplace, have opened up opportunities to increase the network throughput and reliability by transmitting and aggregating traffic from multiple RATs.

ECTs can support applications with low latency requirements and/or high QoS requirements (e.g., AR/VR, cloud gaming, and the like) by placing the distributed computing and storage resources in proximity to data providers and consumers. An example edge network 200 is shown by FIG. 2 and may correspond to an edge cloud and/or the edge computing system configurations/frameworks discussed herein.

Figure 15:
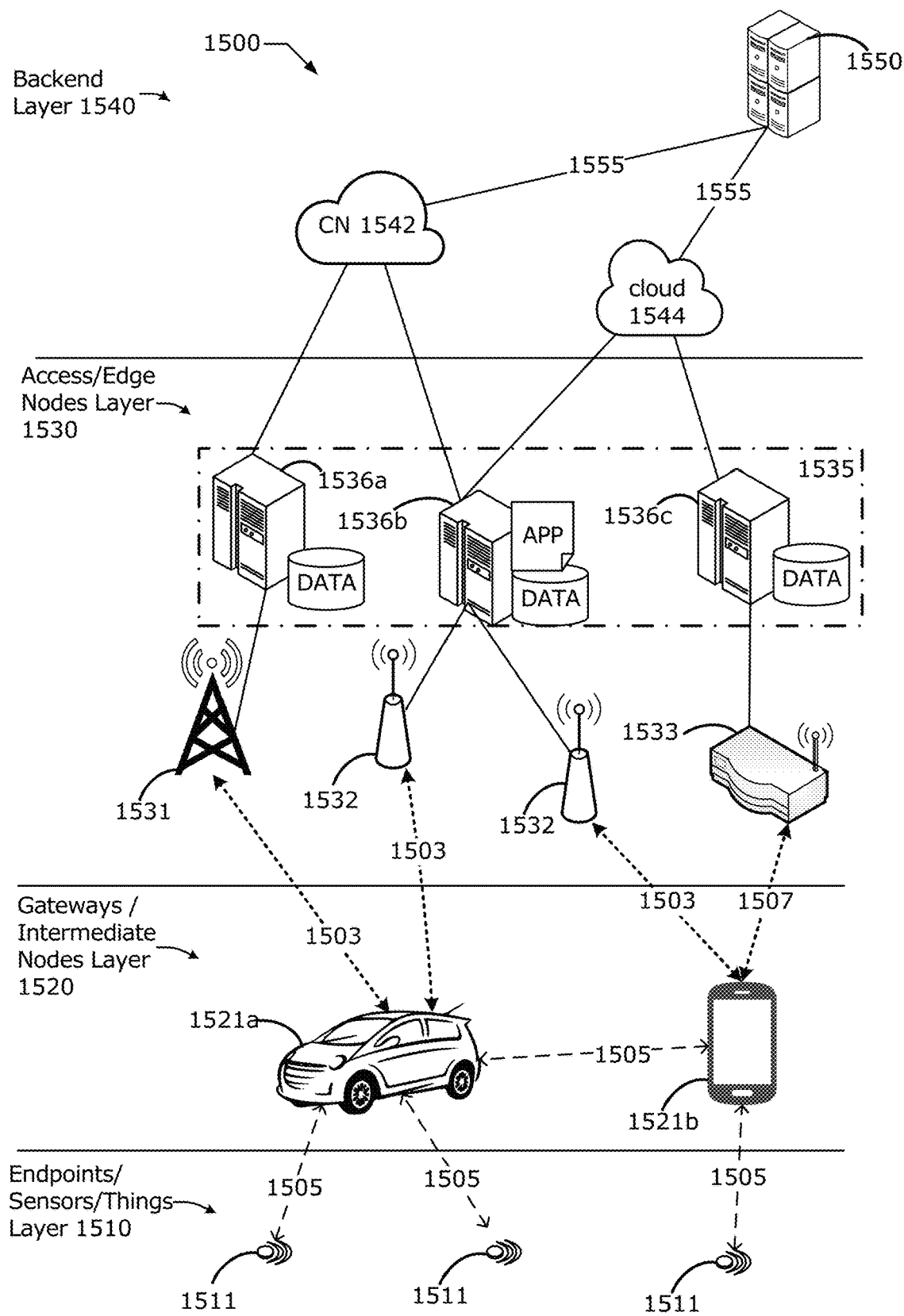
FIG. 15 illustrates an example edge computing environment.

The framework 200 includes UEs 201, which are computing systems/devices within an edge computing network 200 that offload computational workloads/tasks to edge compute node 236 or otherwise obtain services from the edge computing network and/or a cloud system (see e.g., cloud 1544 of FIG. 15). The edge network includes edge compute node 236 (or edge server 236), which is one or more computing systems or servers from which the compute nodes 201 consume services. The edge server 236 may be co-located with one or more NANs 233a, 233b, or 233c (collectively referred to as "NAN 233" or "NANs 233"), which may be the same or similar as any of NANs 130 discussed previously and/or NANs 1531, 1532, 1533 of FIG. 15. Respective connections 230b (also referred to as "backhaul paths 230b") may connect or communicatively couple the edge compute node 236 with one or more NANs 233, and individual connections 230a (also referred to as "access paths 230a" or "fronthaul paths 230a") may connect or communicatively couple individual NANs 233 with one or more UEs 201. Some connections 230a-b may be used for either licensed or unlicensed access and may correspond to connections 103L and/or 103U discussed previously. For purposes of the present disclosure, a "network path 230" or "path 230" may refer to a route between a source node and a destination node (or components thereof), and may include a backhaul path 230b, an access path 230a, or a combination of one or more backhaul paths 230b and one or more access paths 230a. For downlink (DL) traffic the source node may be the edge node 236 and the destination node may be a UE 201, and for uplink (UL) traffic the source node may be a UE 201 and the destination node may be the edge node 236.

The edge compute node 236 is a physical computer system(s) that may include an edge platform and/or virtualization infrastructure, and provides compute, storage, and network resources to edge computing applications. The edge server 236 is disposed at an edge of a corresponding access network (e.g., networks provided by individual NANs 233), and provides computing resources and/or various services (e.g., computational task and/or workload offloading, cloud-computing capabilities, IT services, and other like resources and/or services as discussed herein) in relatively close proximity to network subscribers (e.g., compute nodes 201 also referred to as "UEs," "edge users," and/or the like). The virtualization infrastructure (VI) of the edge server 236 provides virtualized environments and virtualized resources for the edge hosts (e.g., edge server 236), and the edge computing applications may run as VMs and/or application containers on top of the VI.

When a compute node 201 has multiple radio interfaces (or multiple communication chips/circuitries), the compute node 201 can transmit and/or receive data through multiple paths 230. This means that there can be different multi-radio or multi-path convergence points to aggregate and/or distribute traffic between e2e communication link(s). According to various embodiments, when a compute node 201 has multiple radio interfaces, a new multi-radio convergence point can take place at the edge of the network to offer multi-path traffic management for low latency communication as envisioned for 3GPP 5G/NR networks (see e.g., [AC6833Z], [AC6833PCT]). With new intelligence enabled by edge-computing, multi-RAT deployments can be utilized more efficiently by cleverly distributing traffic to multiple network paths 230 based on various metrics and/or measurements.

In some implementations, the edge compute node 236 and UEs 201 can utilize a suitable convergence technology (see e.g., [GMA]), at the data plane to distribute and aggregate traffic over multiple paths 230. Another example is that UEs 201 can establish dual connectivity as specified in 3GPP and the edge intelligence resides in a CU (see e.g., [TS37340]).

Computing power offered by edge compute node 236 can be leveraged to realize intelligent multi-access traffic management. An intelligent multi-access traffic manager (MA-TM) 246 located at the edge node 236 computes traffic distribution rules (e.g., traffic management configurations 213 in FIG. 2) at the control plane 212, which are provided to the data plane 214 and UEs 201 to inform the data plane 214 and the UEs 201 about how to route packets over the multiple paths 230. Additionally, the MA-TM 246 is the intelligence in charge of performing NC and traffic distribution over multiple paths 230.

The traffic distribution control plane 212 collects feedback from wireless infrastructure (e.g., RAN measurements from one or more NANs 233) and/or directly from users (e.g., UE measurements from one or more UEs 201), incorporates data flow/App/QoS requirements 225 provided by higher layer(s), and gathers telemetry statistics 215 from the data plane 214 to determine how data flows should be routed over the multi-paths 230 in order to meet heterogeneous QoS targets. Additionally or alternatively, the traffic distribution control plane 212 collects performance indicators from one or more network functions (NFs) in a core network (e.g., CN 1542 or the like). Edge data 224 and data network data 227 are provided to the data plane 214, filtered by a packet filter 218, and sorted into one or more QoS (data flow) queues 210. An NC engine 217 may also be used to route data from the data flows (queues 210) over the multi-paths 230, and/or may provide various NC services such as those discussed herein.

The edge compute node 236 may correspond to edge compute nodes 1536 of FIG. 15 within edge system/network 1535 of FIG. 15. According to various embodiments, the MA-TM 246 is enhanced with additional reliability enhancement functionality of a reliability enhancement engine (REE) 242, which includes a control plane REE 242$c$ and a data plane REE 242$d$. In various implementations, the MA-TM 246 and/or REE 242 can be part of an edge platform of the edge node 236 and/or may be implemented as an edge application (app) operated by the edge node 236. In some implementations, the MA-TM 246 is part of the edge platform and the REE 242 is implemented as an edge app. Additionally or alternatively, both the MA-TM 246 and the REE 242 are implemented as respective edge apps and/or edge services.

In a first example implementation, the edge system/network 200 is implemented using the MEC framework (see e.g., [MEC]). In these implementations, the edge node 236 is a MEC host/server, the MA-TM 246 and/or the REE 242 may be part of a MEC platform and/or may be implemented as a MEC app as discussed previously.

In a second example implementation, the MA-TM 246 and/or the REE 242 can be, or are operated by a Multi-Access Management Services (MAMS) server or a MAMS client (see e.g., Kanugovi et al., "Multi-Access Management Services (MAMS)", Internet Engineering Task Force (IETF), Request for Comments (RFC) 8743 (March 2020) ("[RFC8743]")). In these implementations, the edge node 236 and/or one or more cloud computing nodes/clusters may be the MAMS server. In MAMS implementations, the MA-TM 246 and/or the REE 242 can be implemented as the same or different Network Connection Managers (NCMs) for downstream/DL traffic or as Client Connection Managers (CCMs) for upstream/UL traffic. An NCM is a functional entity that handles MAMS control messages from clients 201, configures the distribution of data packets over available access and core network paths 230, and manages user-plane treatment (e.g., tunneling, encryption, etc.) of the traffic flows (see e.g., [RFC8743]). The CCM is the peer functional element in a client 201 that handles MAMS control-plane procedures, exchanges MAMS signaling messages with the NCM, and configures the network paths 230 at the client 201 for the transport of user data (e.g., network packets, etc.) (see e.g., [RFC8743]).

In a third example implementation, the MA-TM 246 and/or the REE 242 can be part of the O-RAN framework (see e.g., [O-RAN]). In these implementations, the MA-TM 246 and/or the REE 242 can be part of the RAN intelligence controller (RIC) such as the Non-Real Time (RT) RIC or a Near-RT RIC. Additionally or alternatively, in O-RAN implementations, the MA-TM 246 and/or the REE 242 may be implemented as the same or different xApps.

In a fourth example implementation, the MA-TM 246 and/or the REE 242 can be part of a central unit (CU)/distributed unit (DU)-split architecture of an NG-RAN architecture (see e.g., 3GPP TS 38.401 v16.7.0 (2021-10-01) ("[TS38401]") and 3GPP TS 38.300 v16.7.0 (2021-09-27) ("[TS38300]")). In these implementations, the MA-TM 246 and/or the REE 242 resides at the CU for downstream/DL traffic, and for upstream/UL traffic the REE 242 is implemented by a UE 201 or its NAN 233 (e.g., a DU) if NC is not implemented at the UE 201.

In an fifth example implementation, the MA-TM 246 can be part of a 3GPP edge computing architecture (see e.g., [AD4420-US], [TS23558], and [TS23501]). In these implementations, the edge node 236 is one or more edge servers, Edge Application Servers (EAS), Edge Enabler Servers (EES), and/or Edge Configuration Server (ECS) in an Edge Data Network (EDN), and the MA-TM 246 and/or the REE 242 may be implemented as a part of the EES or ECS, and/or as the same or different EASs.

Additionally or alternatively, emerging data-driven machine learning (ML) techniques can be used to develop advanced multi-access traffic distribution strategies such as those discussed in [AD2644-US].

1.2. Reliability Enhancement Engine (REE) Framework for MA-TM

In various embodiments, the REE 242/MA-TM 246 performs admission control and packet filtering for reliability traffic, calculates code rate and traffic distribution rules, applies NC to reliability flows, routes reliability traffic of the reliability flows according to traffic distribution rules/strategies, and handles multi-access/multipath acknowledgement (ACK) and traffic pacing for reliability traffic and other traffic. The admission control function decides if packets (or a burst of packets) should be permitted to be transmitted or encoded for transmission. The admission control function may utilize a model of the state of system/network resources, knowledge about incoming packets, one or more algorithms to make admission control decisions, and policies for the actions to take upon admission and upon rejection. As discussed in more detail infra, the reliability traffic distribution optimizer (RTDO) 302, 312 may provide this admission control functionality.

The control plane 212 of the REE 242/MA-TM 246 determines the configuration parameters/criteria for reliability enhancement, such as admission control criteria, NC scheme, coding rate, traffic distribution rules, traffic pacing, and/or other like reliability configuration parameters. In order to set up the configurations for reliability enhancement, the REE 242 can collect some or all of the following information for optimization purposes: RAN and/or WLAN measurements, RAN and/or WLAN capabilities indicated by RAN/WLAN configurations, application layer signaling, and/or data plane telemetry.

The RAN/WLAN measurements can be collected by NANs 233 and/or from UEs 201. The RAN/WLAN measurements may include, for example, radio channel/signaling measurements/indicators (e.g., RSRP, RSSI, RSRQ, RCPI, RSNI, ANPI, SNR, SINR, expected peak data rate, and/or any other signal measurements such as any of those discussed herein), packet drop rate, packet loss rate, backhaul delay measurements for individual paths 230$b$ (e.g., the minimum delay of individual paths 230$b$, average delay of individual paths 230$b$, and/or can be estimated delay based on past delay measurements), and/or any other measurements/metrics such as any of those discussed herein.

RAN/WLAN configurations may include or indicate various capabilities of UEs 201 and/or NANs 233 such as, for example, transmitter (Tx) node capabilities (e.g., whether a Tx node (e.g., 5G gNB and/or other NAN 233) supports Ultra-Reliable-Low-Latency-Communication (URLLC) enhancements such as lower data rate Modulation-and-Coding-Scheme (MCS) and rate selection at $10^{-5}$ Packet-error-rate target; whether Tx node supports cross-RAT ACK handling as described in section 3 infra), and/or the like. Additionally or alternatively, the RAN/WLAN configurations may include access network QoS configurations (e.g., QoS profile as discussed in [TS3830], QoS info field and/or QoS traffic capability as discussed in [IEEE80211], etc.). The QoS configurations may include or indicate various QoS capabilities and/or parameters such as, for example, a minimum QoS guarantee that an access network can provide for a reliability flow, such as minimum guaranteed bit rate configured for the flow, packet-error-rate target for rate selection, and/or other like QoS-related information. Additionally or alternatively, the RAN/WLAN configurations may include IEEE 802.11 configurations including information in a network configuration (e.g., MAC state generic convergence function (MSGCF) link capabilities, MSGCF link parameters, event capabilities, etc.), location configuration information (LCI) report, mesh configuration, configuration profile report, and/or the like. Additionally or alternatively, the RAN/WLAN configurations may include radio resource control (RRC) information from RRC configurations (see e.g., 3GPP TS 38.331 v16.6.0 (2021-09-28) and/or 3GPP TS 36.331 v16.6.0 (2021-09-29)). Other RAN/WLAN configurations may be included in other implementations.

The application layer signaling may include, for example, priority indicators for data flows, QoS requirements of data flows (e.g., reliability target, latency bound, minimum guarantee data rate, maximum burst size, etc.), and/or the like.

The data plane telemetry may include, for example, traffic volume estimate of reliability flows and non-reliability flows, flow path and latency measurements/metrics, packet drop metrics/reports (e.g., dropped packet mirroring and drop reason), traffic congestion metrics/reports (e.g., packet-level snapshots of congested queues/buffers, microburst detection, etc.), platform load/overload and/or application load/overload metrics/reports (see e.g., "Enhanced Utilization Telemetry for Polling Workloads with collectd and the Data Plane Development Kit (DPDK)", Intel® Corp. User Guide, 0820/DN/PTI/PDF, 627392-001US (19 Aug. 2020), available at: https://builders.intel.com/docs/networkbuilders/enhanced-utilization-telemetry-for-polling-workloads-with-collectd-and-the-data-plane-development-kit-dpdk-user-guide.pdf, the contents of which is hereby incorporated by reference in its entirety), Inband Network Telemetry (INT) ingress and/or egress data (see e.g., "In-band Network Telemetry (INT) Dataplane Specification", The P4.org, Applications Working Group, version 2.1 (11 Nov. 2020) and/or "In-band Network Telemetry Detects Network Performance Issues", Intel® White Paper, 1220/RE/WPINT/PDF, 345568-001 US (2020), available at: https://builders.intel.com/docs/networkbuilders/in-band-network-telemetry-detects-network-performance-issues.pdf (collectively referred to as "[INT]"), the contents of each of which are hereby incorporated by reference in their entireties), and/or the like.

In some implementations, the aforementioned measurements/metrics/signaling can be obtained via suitable APIs. For example, in MEC-based implementations, the aforementioned information may be accessed via the Radio Network Information APIs, Bandwidth Management APIs, and/or any other suitable MEC APIs, such as those mentioned herein (see e.g., [MEC]). In these implementations, the MA-TM 246 can be part of MEC platform or may be implemented as a MEC app. Additionally or alternatively, DPDK mechanisms and/or INT mechanisms (see e.g., [INT]) can be used to collect dataplane telemetry metrics/data. Additionally or alternatively, new signaling can be developed to collect the aforementioned measurements. In these implementations, the new signaling/messages can be proprietary or standardized via ETSI MEC (see e.g., [MEC]), O-RAN (see e.g., [O-RAN]), OpenNESS, 3GPP, and/or the like. In these implementations, new API messages can be defined to pass the new signaling to a traffic management edge app, such as an MA-TM 246 edge app.

The REE 242 can combine some or all the aforementioned signaling (e.g., metrics, measurements, etc.) to derive an estimate of data rate, link erasure probability, and delay profile for delivering the reliability flow over individual path 230. Here, the "delay profile" may refer to an amount of time it takes for a source or transmitter (Tx) to send x number of packets through a path 230 to a destination or receiver (Rx), including possible initial delay. Additionally or alternatively, the delay profile may be include or indicate delay characteristics of different paths 230 at or between radio access convergence points (e.g., convergence points 112, 114, 116, or 118; CU-UP, and/or UPF) and a UE 101, 201. The delay profile may be determined using a delay function $\tau_i(x)$ (see e.g., FIGS. 3 and 13 discussed infra). The delay profile is affected by the transmission data rate and possibly some initial delay of the path 230 (e.g., a backhaul delay or the like). The REE 242 can then utilize those estimates to derive traffic distribution rules and configure NC (e.g., NC group size and/or other information discussed infra). One example for reliability provisioning includes the REE 242 deriving a worst-case estimate per path 230 to ensure a reliability target can be met at worst-case scenario(s) (see e.g., delay-optimal reliability traffic distribution optimizer (RTDO) 302 of FIG. 3). Another example for reliability provisioning includes the REE 242 deriving a feasibility estimate per path 230 to determine a most resource efficient traffic distribution (see e.g., resource-optimal RTDO 312 of FIG. 3).

For an admitted reliability flow, the control plane 212 provides some or all of the following configuration parameters (e.g., as traffic mgmt configs 213) to the local data plane 214 and/or UEs 201: packet identifier (ID) for individual reliability flows, NC group size of individual reliability flows, and traffic distribution rules. The packet ID for a reliability flow may include one or more of a source network address (e.g., IP address, etc.), destination network address (e.g., IP address, etc.), port number(s) (e.g., ingress ports, egress ports, source ports, destination ports, etc.), QoS flow identifier (QFI), and/or some other identifier or combination of identifiers. The NC group size (k) includes the number of incoming packets to be jointly encoded for delivery to a receiver (Rx).

The traffic distribution rules (also referred to as "traffic distribution strategy") indicate the number of encoded packets belonging to an NC group to be routed over an individual path 230. The traffic distribution rules can be denoted as $\{x_i\}$, where $x_i$ denotes the number of encoded packets belonging to one NC group to be routed over the $i^{th}$ path, and i=1~m where m is the total number of paths 230. The total number of encoded packets is denoted by $n=\Sigma_{i=1}^{m} x_i$, and coding rate=k/n. Additionally or alternatively, the REE control plane 242c can further configure (e.g., in the traffic distribution rules) the set of encoded packets to be sent over certain path(s) i. For example, as described in section 3 infra, when systematic NC is used, the REE 242c can configure all original packets to be sent over the lowest erasure path. Additionally or alternatively, the traffic distribution rules can include specific RATs (and specific channels/links of different RATs) to be used to convey the encoded packets.

The data plane 214 and/or individual UEs 201 process data (reliability) flows according to configurations provided by the control plane 212. The data plane 214 and/or individual UEs 201 may include, or be configured with, a packet processing pipeline for processing the data (reliability) flows. The packet processing pipeline for reliability enhancement starts from packet filtering that identifies packets requiring additional NC via header inspection. For every k incoming packets, the NC engine 217 (also referred to as "NC encoder 217") applies NC upon the group of packets and generates $n=\Sigma_{i=1}^{m} x_i$ total encoded packets. Based on assignment criteria provided by the control plane 212, $x_i$ packets out of the n encoded packets are selected to be routed towards the $i^{th}$ path, for all m paths 230. For purposes of the present disclosure, it may be assumed that all packets belonging to the reliability flow are of the same size (e.g., a maximum transmission unit (MTU), such as 1500 bytes for Ethernet protocol).

In some implementations, the REE data plane 242d can include automatic detection of burst size to apply proper NC scheme. For this implementation, control plane 212 can provide additional configuration parameters to data plane 214 and/or individual and/or individual UEs 201 such as, for example, one supportable NC group sizes and/or a burst time spread parameter (W). In some implementations, a reliability flow can be configured with one or more supportable NC group sizes (e.g., $1 \sim k_{max}$). For each NC group size, its corresponding traffic distribution rule can be provided: $\{x_i^{(k)}\}$, $k=1 \sim k_{max}$. Additionally or alternatively, a burst time spread parameter (W) is configured. The burst time spread parameter (W) specifies the maximum arrival time difference between the first packet and the last packet of a burst. When the REE data plane 242 d is enhanced with automatic burst size detection, the second step of data plane operation can be changed to one or both of the following options:

Option 1 for the second step includes detecting burst size by counting the number of arrival reliability packets within the time window W after arrival of the first packet of a burst. Then, based on incoming data burst size, k, the NC engine 217 selects the corresponding traffic distribution rule, $\{x_i^{(k)}\}$, and generates $n=\Sigma_{i=1}^{m} x_i^{(k)}$ total encoded packets.

Option 2 for the second step is a variant of option 1. In option 2, when systematic code is used for NC, packets arrived within the time window W can be sent immediately (without any encoding) over certain subset of links/paths 230. The particular links/paths 230 used may be specified by the assignment criteria provided by the control plane 212. The assignment criteria may be indicated or specified by the traffic management configurations 213. In one example, the top 1 reliable links, subjected to the availability of those links. Copies of these packets can be retained in the NC engine 217 for generating network coded packets later. Then, based on incoming data burst size k, within the time window W, the NC engine 217 determines the traffic distribution rule $\{x_i^{(k)}\}$, and generates $n-k=\Sigma_{i=1}^{m} x_i^{(k)}-k$ network encoded packets based on original incoming data burst of size k. While calculating the traffic distribution rule $\{x_i^{(k)}\}$, the information packets (or incoming packets) sent during time window W should be accounted for, and $\{v_i^{(k)}\}$ denotes the number of packet being sent during time window W. Additionally or alternatively, the third step of the traffic distribution of data plane operation should be changed to '$x_i^{(k)}-v_i^{(k)}$ encoded packets are selected to be routed towards the $i^{th}$ path, for all m paths (e.g., links/paths 230).

1.3. Control Plane Intelligence for Reliability Enhancement

In some implementations, the REE 242c incorporates radio characteristics and/or QoS requirements to perform admission control, select proper coding scheme and code rate for arrival data burst, and determines how encoded packets should be routed over one or multiple paths 230. For this purpose, the REE 242c may use or include a reliability traffic distribution optimizer (RTDO). Two frameworks for candidate traffic distribution strategies are discussed infra with respect to FIG. 3.

In some implementations, the RTDO includes one or more optimizer(s) to optimize various radio characteristics, QoS requirements, per path characteristics (ei, τi), reliability target ϵ (failure rate<ε), a delay bound D, NC group size (k), and/or other like parameters (collectively referred to herein as "reliability parameters" or the like). These optimizer(s) may use some or all of these reliability parameters to derive a worst-case estimate per path 230 (or worst-case delay guarantee per path 230) to ensure a reliability target can be met at worst-case scenario for one or more paths 230 (see e.g., delay-optimal RTDO 302 of FIG. 3) or derive a feasibility estimate per path 230 to determine a most resource efficient traffic distribution among the set of paths 230 (see e.g., resource-optimal RTDO 312 of FIG. 3).

In some implementations, the RTDO may optimize the reliability parameters by attempting to solve an objective function. For example, the objective function may be a loss function that the RTDO attempts to minimize, for example, by converging to a minimum value of the loss (cost) function. Loss functions may express a discrepancy between predictions of an ML model being trained and one or more problem instances. In some implementations, the RTDO may find a set of reliability parameters that yield an optimal set of packet distribution rules that minimize the loss function on given independent data, and select that set of reliability parameters for generating a set of traffic distribution strategies and/or for determining admission control criteria. Additionally or alternatively, the RTDO uses a global optimization algorithm (also referred to as a global search algorithm) that locates one or more extrema of an objective function for an entire search space (e.g., a population of candidate traffic distribution strategies). In some implementations, the RTDO finds multiple extrema (e.g., a set of traffic distribution strategies) as a Pareto Frontier. The global optimization algorithm traverses the entire search space (e.g., the population of candidate traffic distribution strategies) and gets close to the extrema of the objective function (or finds the exact extrema of the objective function). In these implementations, the RTDO (or global search algorithm) searches for a set of candidate traffic distribution strategies within the population that best fit the reliability parameters at least in comparison to other candidate traffic distribution strategies. Additionally or alternatively, the RTDO may determine one or more traffic distribution strategies that is/are non-dominated or Pareto optimal, which may be traffic distribution strategies where none of the reliability parameters can be improved in value without degrading one or more other ML parameters.

Additionally or alternatively, the RTDO may be based on a multi-objective function, which includes an optimization problem involving more than one objective function to be either minimized or maximized. A multi-objective optimization model may be defined to include one or more decision variables, objectives (the measures to be optimized), and constraints. The decision variables are variables that represent decisions to be made, and the objectives are the measures to be optimized. The constraints define restrictions on feasible solutions (including all optimal solutions) that must be satisfied, and/or restrictions on the values the decision variables may hold. Examples of the decision variables include per path characteristics, reliability targets, NC group size, delay bound, burst size, lower bound of inter-burst interval, and/or other parameters/characteristics. The objective functions indicate how much each of their decision variables contributes to the objectives to be optimized. The multi-objective optimization model may also define one or more coefficients corresponding to one or more of the decision variables. The coefficients indicate the contribution of the corresponding decision variable to the value of the objective function. The optimal solutions in multi-objective optimization can be defined from a mathematical concept of partial ordering. In the parlance of multi-objective optimization, the term domination is used for this purpose. A first solution is said to dominate a second solution if both of the following conditions are true: (1) the first solution is no worse than the second solution in all objectives, and (2) the first solution is strictly better than the second solution in at least one objective. For a given set of solutions, a pair-wise comparison can be made using a graphical representation and a determination as to whether one point in the graph dominates the other can be established. All points that are not dominated by any other member of the set are called "non-dominated points" or "non-dominated solutions". The Pareto frontier comprises a set of non-dominated points in such a graphical representation.

Additionally or alternatively to the frameworks discussed in sections 1.3.1, 1.3.2, 2, and 3, the RTDO may be, or may implement, a multi-objective evolutionary algorithm (MOEA) such as those discussed in Huang et al., "Survey on Multi-Objective Evolutionary Algorithms", IOP Conf Series: J. of Physics: Conf. Series, vol. 1288, No. 1, p. 012057 (1 Aug. 2019) ("[Huang]") and Deb, "Multi-Objective Optimization Using Evolutionary Algorithms", Indian Institute of Technology—Kanpur, Dept. of Mechanical Engineering, Kanpur, India, KanGAL Report No. 2011003 (10 Feb. 2011), available at: https://www.egr.msu.edu/~kdeb/papers/k2011003.pdf ("[Deb1]"), the contents of each of which are hereby incorporated by reference in their entireties (see also Eiben et al., "Introduction to evolutionary computing", 2nd Ed., Springer, Berlin (2015) ("[Eiben]"), the contents of which is hereby incorporated by reference in its entirety).

1.3.1. Framework for Delay-Optimal Traffic Distribution Strategy

For a given reliability target $\epsilon$, the REE 242/MA-TM 246 computes an NC and traffic distribution scheme that fulfills the reliability target E. Sections 2 and/or 3 (infra) provide algorithms that calculate optimal code rates and packet distribution strategies for encoding k incoming data packets to achieve a given reliability target E. The reliability target $\epsilon$ may be a value greater than a failure probability F(x) to decode k packets. These algorithms can be used to implement a delay-optimal reliability traffic distribution optimizer (RTDO) 302 or a resource-optimal RTDO 312 as shown by FIG. 3.

Figure 3:
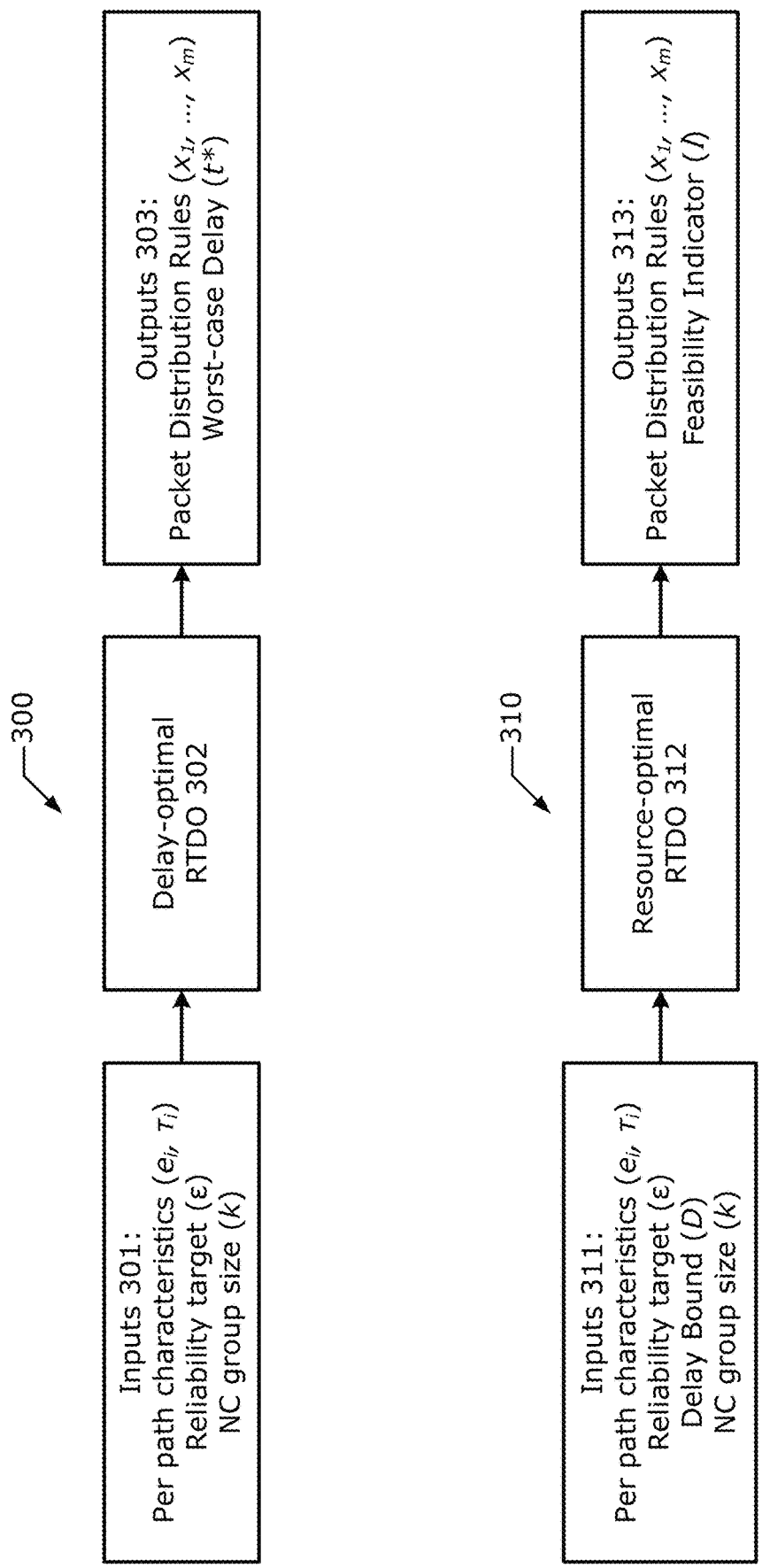
FIG. 3 depicts example reliability traffic distribution optimizers according to various embodiments.

FIG. 3 depicts an example delay-optimal traffic distribution strategy framework 300 according to various embodiments. The framework 300 includes the delay-optimal RTDO 302 that obtains or otherwise accesses inputs 301, processes the inputs 301, and produces outputs 303. The inputs 301 include per path characteristics ($e_i$, $\tau_i$), reliability target $\epsilon$ (e.g., where failure rate F(x)<$\epsilon$), and NC group size k. The outputs 303 include packet distribution rule(s) ($x_1, \ldots, x_m$) and a worst-case delay t*. The packet distribution rule(s) may also be referred to as traffic distribution strategies or the like.

The per path characteristics include an erasure probability $e_i$ for transmitting the reliability data flow over the $i^{th}$ path, and delay characteristic(s) $\tau_i$ where $\tau_i$ (x) is a delay characteristic function that calculates the expected time required for sending x packets of the reliability flow over path i. The delay characteristic function $\tau_i(x)$ can be derived through prior knowledge regarding RAT configurations as well as RAN measurements such as signal strength, data rate, per packet delay statistics, and/or any other measurement(s) such as those discussed herein. Also, the delay characteristic function $\tau_i$ (x) can reflect the impact from resource sharing with other traffic flows. The impact from resource sharing with other traffic flows may be based on, for example, potential queueing from other flows with the same or higher QoS priority, resource reservation level for other traffic flows, maximum radio resource(s) that can be allocated for reliability traffic, and/or the like. This disclosure focuses on admission control mechanisms for single reliability flow. When performing admission control for multiple reliability flows, one potential approach is to adjust the delay profile (characteristic) function $\tau_i$ (x) according to a multi-flow resource sharing factor and then adopt mechanisms described herein for admission control.

The worst-case latency t* is a maximum amount of latency or delay (or a minimum latency or delay bound) for delivering packets of a reliability flow over one or multiple paths to a destination that meets the reliability target $\epsilon$ (e.g., a probability more than 1−$\epsilon$ that the latency for successfully receiving packets is below the worst-case latency t*). In this implementation, the delay-optimal RTDO 302 optimizes the various network coding parameters (e.g., inputs 301) and a traffic distribution strategy (e.g., the number of encoded packets $x_1$ to $x_m$, to be sent over each of paths 1 to m) to minimize the worst-case latency t* for reliability target $\epsilon$. In other words, the RTDO 302 determines a combination of network paths 230, and the number of packets to be sent over each of the network paths 230 in the combination, that has a most optimal (e.g., minimum) worst-case latency t* in comparison to various other combinations of the network paths 230 (and combinations of different numbers of encoded packets to be sent over the network paths 230).

The delay-optimal RTDO 302 may determine the worst-case latency t* using any suitable optimization techniques such as those discussed in Neely, "Opportunistic Scheduling with Worst Case Delay Guarantees in Single and Multi-Hop Networks", 2011 *Proceedings IEEE INFOCOM*, pp. 1728-1736 (10 Apr. 2011), Fan et al., "Cross-Layer Control with Worst Case Delay Guarantees in Multihop Wireless Networks", J. of Electrical and Computer Engineering, vol. 2016, Article ID 5762851, Hindawi Publishing Corp. (10 Oct. 2016), the contents of each of which are hereby incorporated by reference in their entireties.

For a traffic flow with given reliability target $\epsilon$, different burst size results in different packet distribution rules ($x_1, \ldots, x_m$) and worst-case latency t*. In this example, the burst size is equal to the NC group size k. A mapping function between burst size and the corresponding worst-case delay (t*) can be constructed for each reliability data flow: t*(k; $\epsilon$, e, $\tau$). This mapping function can be used to determine the criteria for admission control. The maximum supportable burst size function within a delay bound d can be defined as shown by equation (1-1).

$$k_{max}(d; \varepsilon, e, \tau) = \max_{t^*(k;\varepsilon,e,\tau) \leq d} k \qquad (1\text{-}1)$$

In equation (1-1), $k_{max}$ is the maximum supportable burst size function, d is the delay bound, E is the reliability target, e is a collection of erasure probabilities of each path 230, and is a collection of delay characteristics of each path 230.

Different admission control strategies can be used for different types of traffic arrival patterns. In a first example admission control strategy, the REE 242 can support bursty-arrival reliability traffic with fixed burst size and a minimum inter-burst interval. For this admission control strategy, the maximum supportable burst size is $k_{max}$ (D; ε, e, τ) and the inter-burst interval for burst of size k should be no smaller than t*(k; ε, e, τ). In this example, D is the delay bound for each burst of the reliability flow.

If the REE 242 supports automatic burst detection enhancement, MA-TM 246 may provide the complete admissible (burst size, periodicity) pairs: (k, t*(k; ε, e, τ)), k=1~$k_{max}$(D), to the app layer through a suitable API (e.g., a new or existing MEC API and/or the like). The app (e.g., MA-TM 246 and/or REE 242) generates a reliability burst of size smaller than $k_{max}$(D). The admissible (burst size, periodicity) pairs provides traffic pacing constraint for reliability flow traffic arrival: a new burst will only be generated after an interval of t*(k; ε, e, τ) succeeding the first packet of the last data burst of size k.

Additionally or alternatively, the delay-optimal RTDO 302 can produce another output 303 indicating an interleaving factor F Interleave(k; ε, e, τ). When independence between transmission opportunities cannot be guaranteed, one traffic distribution strategy is to interleave other burst(s) or non-reliability packets to ensure all network coded packets belonged to the same burst are individually sent with independent erasure probability. For this type of implementation, the REE 242 can at most admit $F_{Interleave}$(k; ε, e, τ) number of bursts of size k within an interval of t*(k; ε, e, τ).

In a second example admission control strategy, the REE 242 can support periodic-arrival reliability flow (e.g., deterministic traffic flows in factory automation). In this admission control strategy, the REE 242 determines whether to admit a periodic-arrival reliability flow based on its arrival period, $T_s$, and burst size, k. If the arrival period $T_s$ is longer than the delay bound D, the maximum admissible burst size is $k_{max}$(D). If the arrival period $T_s$ is shorter than the delay bound D, the maximum admissible burst size becomes $k_{max}$($T_s$). In these examples, the delay bound D is the delay bound for each burst of the reliability flow.

Additionally or alternatively, the MA-TM 246 may provide the complete admissible (burst size, periodicity) pairs: (k, t*(k; ε, e, τ)), k=1~$k_{max}$(D), to the app layer through a suitable API (e.g., a new or existing MEC API and/or other signaling/messaging). The app (e.g., MA-TM 246 and/or REE 242) may then determine the burst size and arrival periodicity such that $T_s$≥t*(k; ε, e, τ). For example, the app (e.g., MA-TM 246 and/or REE 242) may choose the configuration achieving the maximum supportable data rate according to equation (1-2).

$$R_{max} = \max_{k=1 \sim k_{max}(D)} \frac{k \cdot PktSize}{t^*(k; \varepsilon, e, \tau)} \quad (1\text{-}2)$$

In equation (1-2), PktSize denotes the packet size in bits, by selecting $$k = \arg\max_{k'=1 \sim k_{max}(D)} \frac{k' \cdot PktSize}{t^*(k'; \varepsilon, e, \tau)}$$

and $T_s$=t*(k; ε, e, τ).

In a third example admission control strategy, the REE 242/MA-TM 246 may adopt a more conservative admission control strategy that can be used for any type of arrival pattern. For example, the REE 242/MA-TM 246 can set the maximum supportable incoming data rate according to equation (1-3).

$$\frac{k_{max}\left(\frac{D}{2}\right) \cdot PktSize}{\frac{D}{2}} \quad (1\text{-}3)$$

Additionally or alternatively, the REE 242/MA-TM 246 can set the maximum burst size for leaky-bucket or token-bucket traffic pacing control to be $k_1$, where $$0 < k_1 < k_{max}\left(\frac{D}{2}\right),$$

and set the leaky-bucket or token-bucket rate according to equation (1-4).

$$\frac{\left(k_{max}\left(\frac{D}{2}\right) - k_1\right) \cdot PktSize}{\frac{D}{2}} \quad (1\text{-}4)$$

In both equations (1-3) and (1-4), D is the delay bound for each packet of the reliability flow.

1.3.2. Framework for Resource-optimal Traffic Distribution Strategy

FIG. 3 depicts an example resource-optimal traffic distribution strategy framework 310 according to various embodiments. The framework 310 includes a resource-optimal RTDO 312 that obtains or otherwise accesses inputs 311, processes the inputs 311, and produces outputs 313. The inputs 311 includes per path characteristics ($e_i$, $τ_i$), reliability target ε (e.g., where a failure rate F(x)<ε), a delay bound D, and NC group size (k). The outputs 313 include packet distribution rule(s) ($x_1$ ..., $x_m$) and a feasibility indicator (I). The packet distribution rule(s) may also be referred to as traffic distribution strategies or the like.

For a given delay bound D, the REE 242 may adopt a resource-optimal strategy while encoding and distributing a reliability traffic flow. Instead of searching for the delay optimal distribution (as is the case with the RTDO 302), the resource-optimal RTDO 312 solves for a most resource efficient traffic distribution strategy for distributing the encoded packets n among the set of paths 230. Here, the most resource efficient traffic distribution strategy may include, for example, optimizing traffic distribution for a minimal amount spectrum resource usage that can meet both the reliability target ε and delay bound D constraints for a given set up of per path characteristics and NC group size. For example, by prioritizing a lower erasure rate link, fewer redundancy is required for reliability guarantee and more spectrum resources become available for other traffic flows. Example implementations of the resource-optimal RTDO 312 can include any suitable search space search algorithm such as those discussed herein.

In various implementations, the resource-optimal RTDO 312 optimizes the various reliability and latency parameters (e.g., inputs 311) to determine the feasibility l and a traffic distribution strategy (e.g., the number of encoded packets $x_1$ to $x_m$, to be sent over each of paths 1 to m) that has a most optimal resource usage among various other candidate traffic distribution strategies. In other words, the RTDO 312 determines a combination of network paths 230, and the number of packets to be sent over each of the network paths 230 in the combination of network paths 230, that has a most optimal (e.g., minimum) resource usage in comparison to various other combinations of the network paths 230 (and combinations of different numbers of encoded packets to be sent over the network paths 230).

If there is a feasible solution that satisfies the reliability and delay target, the resource-optimal RTDO 312 outputs a feasibility indicator/with a value of 'True'. If there is no feasible solution that satisfies the reliability and delay target, the resource-optimal RTDO 312 outputs a feasibility indicator/with a value of 'False'. Additionally or alternatively, the feasibility indicator/may indicate or include a value indicative of the feasibility of the solution to satisfy the reliability and delay target (e.g., a value from 0 to 1 or 0% to 100%). The outputs 313 from the resource-optimal RTDO 312 can be used by the MA-TM 246 to perform admission control and network slicing resource reservation for reliability flows.

When establishing a reliability traffic flow, attributes of the reliability flow, including the reliability target $\epsilon$, the delay bound D, burst size k, and lower bound of inter-burst interval $T_s$, are provided to the REE 242/MA-TM 246. The REE 242/MA-TM 246 utilizes the resource-optimal RTDO 312 to check the feasibility of the reliability flow. If there is no feasible packet distribution for the reliability target $\epsilon$ and/or latency target (e.g., l='False', or l is less than a predetermined or configured feasibility threshold), the establishment of the reliability flow will be rejected. Additionally or alternatively, if the inter-burst interval $T_s$ is smaller than the delay bound D, an additional radio resource availability check may be performed, including one or both of the following approaches. In a first approach, the delay bound D input 312 to the resource-optimal RTDO 312 is changed to the lower bound of inter-burst interval $T_s$ and the REE 242/MA-TM 246 admits the reliability flow if there exists a feasible packet distribution (e.g., l=True, or/is greater than or equal to a predetermined or configured feasibility threshold). In a second approach, for each path i (e.g., each path 230), the resource-optimal RTDO 312 checks if the maximum number of encoded packets that can be sent over path i with a duration equal to $T_s$ is larger than the output of packet distribution rule $x_i$; the reliability flow is admitted if all paths i (e.g., each path 230) pass this test.

In some implementations, there may be a predefined or configured upper limit or threshold for the amount of resources that can be allocated to a reliability flow for a path i (e.g., path i can at most allocate y % of resources for a reliability flow, where y % is the reliability flow resource allocation limit/threshold). If there is a reliability flow resource allocation limit/threshold for one or more paths 230, the admission control function of the REE 242/MA-TM 246 performs an additional check on whether delivering $x_i$ packets over path i exceeds the reliability flow resource allocation limit/threshold (e.g., utilizes more than y % of radio resources) during a period that is a lower one of the lower bound of the inter-burst interval $T_s$ and the delay bound D (e.g., $\min(T_s, D)$). If the admission control function determines that delivering the $x_i$ packets over the path i exceeds the threshold/limit, the admission control function does not admit the traffic to flow over path i.

The output 313 of packet distribution rules $\{x_i\}$, can also be used to indicate the network resources that should be reserved for transmission of the reliability flow. In one example implementation, a static resource slicing strategy can include: for every $T_s$ interval, the network slicing resource management function of the REE 242/MA-TM 246 reserves at least enough resources to support transmission of $x_i$ packets of the reliability flow over path i. Additionally or alternatively, the output of packet distribution rules $[x_i]$ can be used to control traffic pacing of other flows to ensure that there are enough resources to support transmission of $x_i$ packets of the reliability flow over path i.

2. Resource Optimization for Network Coded Traffic Distribution Over Multiple Paths Reactive packet repetition schemes, such as automatic repeat request (ARQ) and/or hybrid ARQ (HARQ) (collectively referred to as "(H)ARQ"), improve reliability of transmission, but does not provide guarantees for e2e delay requirements. For some verticals, such as URLLC, (H)ARQ is not an option for reliability due to its high latency. Packet repetition (sometimes referred to as "repetition coding") can also be used in a proactive way to provide reliability and eliminate the latency imposed by (H)ARQ feedback processes. However, repetition coding is not efficient in terms of resource utilization. If packet repetition is used to enhance reliability in a proactive manner, then the optimal traffic distribution problem can be converted to a classic non-deterministic polynomial-time (NP)-hard optimization problem—the "knapsack problem".

NC on the other hand can be used as an efficient technique to provide proactive redundancy when data packets are transmitted on communication networks, which enhances e2e reliability and at the same time reduces transmission latency. In many application scenarios, there may be multiple paths 230 (which can be on the same or different RATs) between source and destination nodes, possibly with different rates, reliability requirements, and/or delay profiles (or delay characteristics). For example, in cellular networks a UE can be dual- or multi-connected to the different cells of the network. If integrated access and backhaul (IAB) technology is used in the RAN, then the backhaul network can have a complex topology which can potentially introduce multiple paths 230 between the UE 201 and an IAB donor (e.g., a NAN 233 or the like). In edge computing (e.g., MEC, etc.), for enhanced bandwidth and reliability, an edge server may establish multiple concurrent connections to a client device equipped with multiple radio interfaces (see e.g., section 1 and FIG. 1 discussed supra). NC leverages multi-path diversity to enhance reliability and latency performance of the communication. In all these scenarios, when NC is applied to data traffic with a reliability target $\epsilon$ and a delay bound, the amount of coding redundancy to be added to meet the reliability target $\epsilon$ may need to be determined, as well as how these encoded packets should be distributed to different paths 230 to minimize the total radio resource utilization. However, using NC makes the problem even more difficult, and the optimal solution can only be obtained through exhaustive searching. Although the exhaustive searching algorithm can achieve optimality, it is not scalable as the computational complexity is exponential in the number of data paths 230.

Furthermore, non-optimal solutions include the standard Round-Robin algorithm, which distributes an equal amount of traffic to each path. The Round-Robin algorithm can be optimal when all the paths 230 have identical data rates, reliability, and delay profiles (or delay characteristics). However, when these profiles are heterogeneous among the paths 230, it is highly inefficient and may consume large amounts of radio resources.

In contrast to the existing solutions discussed previously, the present disclosure provides a set of scalable solutions for NC optimization and traffic distribution over multi-path communication channels. In particular, the present disclosure provides two ordering processes, each of which assigns a preference order to individual paths 230. Based on these orders, line-search and binary-search greedy algorithms are developed, as well as further adjustment procedures, to calculate the amount of needed NC redundancy and the traffic distribution rules as solutions to the multi-path NC resource optimization problem.

The various algorithms discussed herein have low computational complexity in comparison with existing approaches, while they can achieve near-optimal radio resource utilization. In typical scenarios, for 95% of the time, the algorithms discussed herein can achieve a resource utilization that is within 1% gap of the optimal solution, while on average they only need ~$10^{-4}$ of the computation time for the optimal exhaustive searching algorithm. The algorithms discussed herein provide edge computing platforms and cellular networks with enhanced reliability for delay sensitive applications, and can provide higher radio resource efficiency and/or better reliability/delay performance than existing solutions. In particular, this technology can be applied in various standardized frameworks/technologies such as 3GPP cellular networking, IEEE 802.11 (WiFi), IEEE WiMAX, DSRC, ITS-G5, ETSI MEC, O-RAN, OpenNess, MAMS, and/or the like, as well as multi-RAT networks or environments including multiple RATs. NC can impact standard specifications for various technologies such as those mentioned herein, and the algorithms in this disclosure belong to a fundamental technology that has potential impact on such standardized technologies. The documentation of such standards may be updated to specify the pattern of resource utilization follows a greedy fashion and/or according to various aspects discussed herein.

In some implementations, the resource utilization of various networking technologies can be updated to exhibit the characteristics of a greedy algorithm. That is, the available radio resource units on some paths 230 are fully used, on others they are not used at all, and/or on at least one path they may be partially used. When such greedy patterns are used, changes in the delay and reliability requirements for the input traffic, as well as the number of input packets for each round, can change or otherwise affect the preference order for each path.

2.1. Network Coding Rate and Traffic Distribution for Multiple Paths

Figure 4:
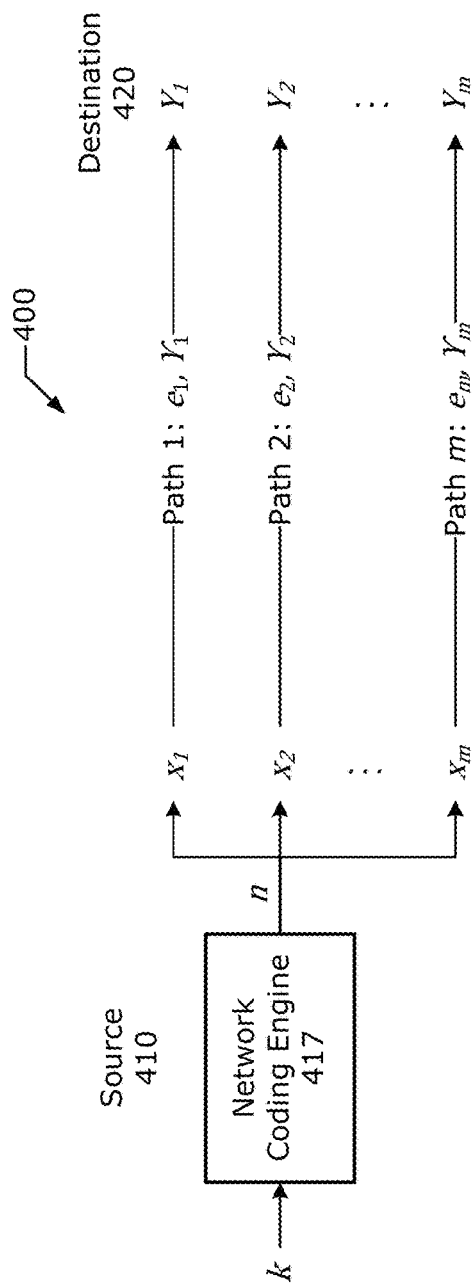
FIG. 4 depicts an example of multi-path network coding according to various embodiments.

FIG. 4 shows an example of multi-path NC resource optimization problem 400 according to various embodiments. In the example of FIG. 4, a group of k information packets (e.g., all of which have a same size B) are to be sent by a source node 410 through a lossy network to a destination node 420, where the lossy network includes m independent paths (e.g., 1 to m paths in FIG. 4, where m is a number). The m independent paths may correspond to individual paths 230 of FIG. 2 (including fronthaul and backhaul connections/links/channels). The k information packets are provided to a NC engine 417 (which may be the same or similar to the NC engine 217 discussed previously with respect to FIG. 2). The NC engine 417 applies a coding scheme to the k information packets, and produces n encoded packets. The n encoded packets are then sent over m independent paths i (e.g., where i=1, ..., m), where $x_i$ number of encoded packets from the n encoded packets are sent over corresponding paths i, and $Y_i$ number of encoded packets are received by the destination node 420 over the corresponding paths i. In this example, the source node 410 may be a UE 201, a NAN 233a-c, or edge node 236 of FIG. 2, and the destination node 420 may be a UE 201, a NAN 233a-c, or edge node 236 of FIG. 2. Additionally, each of the paths i may utilize the same RAT or may be paths belonging to different RATs.

The packet transmission process on each path i is characterized by a packet erasure probability $e_i$, a spectral efficiency $\gamma_i$, and a delay profile (or delay characteristic function $\tau_i(X)$), which is affected by the transmission data rate and possibly some initial delay of the path (e.g., a backhaul delay). The information packets to be transmitted are required to satisfy a delay constraint (or delay bound) D and a reliability target $\epsilon$ (e.g., packet loss rate≤E).

Figure 5:
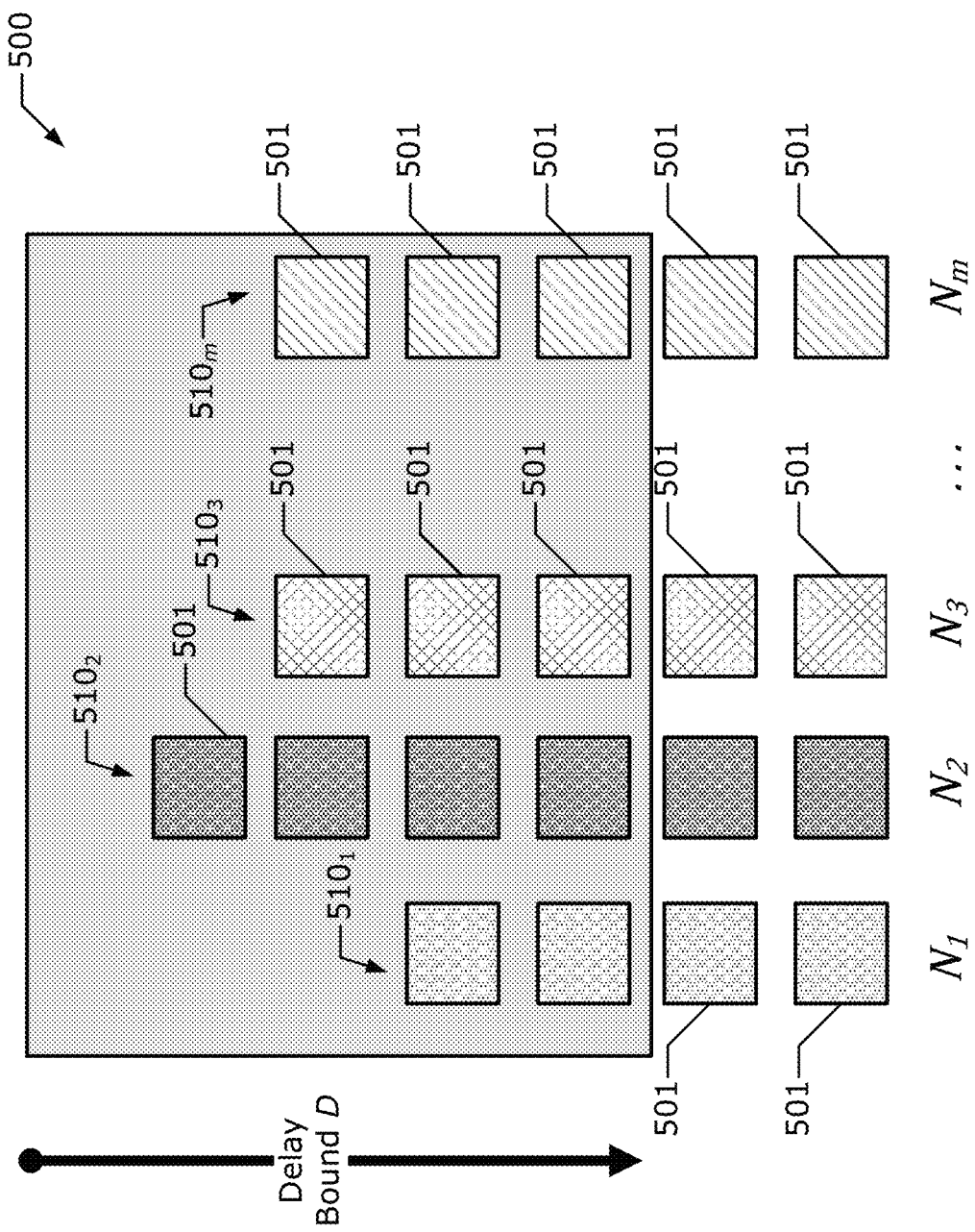
FIG. 5 depicts an example of maximum number of packets allowed on each path.

Under the delay constraint D, each path i (where i= {1, ..., m}) can only afford to transmit $N_i$ data packets of size B, as shown by FIG. 5. FIG. 5 shows transmission buffers 510, (where i={1, ..., m}) for each path i, where each buffer 510, includes $N_i$ number of packets 501, which is the maximum number of packets 501 allowed on each path i. Note that transmitting each of these packets may require different amounts of radio resource (e.g., bandwidth×time), since the spectral efficiency $\gamma_i$ may be different for different paths. In particular, on each path i the amount of radio resource needed to transmit a data packet is inversely proportional to $\gamma_i$.

Referring back to FIG. 4, assume that the delay constraint D is stringent and retransmission mechanisms like (H)ARQ do not react fast enough to meet the reliability target $\epsilon$ within delay bound. NC, in this case, can be used as an effective approach to combat packet losses and provide the required reliability via transmitting proactive redundancies across multiple paths simultaneously. In NC, the k input information packets are viewed as vectors in a finite field and linear combinations of them are formed to produce n encoded packets. Then across the multi-path network these encoded packets are distributed to each path and transmitted to the receiver, say $x_i$ of them are distributed to path i, so that $\sum_{i=1}^{m} x_i = n$. In this case the probability of failing to decode the k input information packets is defined as shown by equation (2-1).

$$F(x_1, \ldots, x_m; k) := Pr\left(\sum_{i=1}^{m} Y_i < k\right) \quad (2\text{-}1)$$

In equation (2-1), is $Y_i$ is the number of successfully received packets after possible erasures on path i. In this example, it is assumed that the network code is well designed so that receiving any k out of n encoded packets ensures successful decoding. This can be achieved by using a suitable channel coding scheme (or error correction code (ECC)) such as, for example, block codes, Reed-Solomon (RS) codes, cyclic codes, Hamming codes, Reed-Muller (RM) codes, Bose-Chaudhuri-Hocquenghem (BCH) codes, algebraic geometric codes, parity codes, repetition codes, Hadamard codes, Walsh-Hadamard codes, expander codes, Golay codes, low-density parity-check codes (LDPC), turbo codes, convolutional codes, line codes, polar codes, concatenated error correction codes, Gaussian random codes, cyclic redundancy check (CRC), and/or other suitable coding techniques or combination(s) thereof. Additionally or alternatively, a suitable has function could be used for channel coding purposes. The problem addressed by the present disclosure is as follows: for given k packets, what is the required n encoded packets, and how should these n encoded packets be distributed to the m paths (e.g., what values should $x_1, \ldots, x_n$, take) to meet a reliability target $\epsilon$ and delay constraint D while minimizing the total radio resource utilization? Namely, the RTDO 302, 312 solves the optimization problem of equation (2-2) when the reliability is equal to the decoding probability:

$$\min_{x_1, \ldots, x_m} \sum_{i=1}^{m} \frac{x_i}{\gamma_i} \quad (2\text{-}2)$$
$$\text{s.t. } 0 \le x_i \le N_i, x_i \in \mathbb{Z}, 1 \le i \le m,$$
$$F(x_1, \ldots, x_m; k) \le \epsilon.$$

In equation (2-2), the term "s.t." is an acronym for "such that" or "so that", the term "$F(x_1, \ldots, x_m; k) \le \epsilon$" is the reliability constraint, and the term "$0 \le x_i \le N_i$" is the latency constraint.

2.1.1. Reliability Constraint

The paths can have different erasure probabilities and the erasures are independent across different paths. For the sake of simplicity, it is assumed that different packets on the same path i are subject to independent and identically distributed (i.i.d.) erasures with probability $e_i$. Then, if $x_i$ packets are transmitted on path i, the number of received packets $Y_i$ follow a binomial distribution as shown by equation (2-3).

$$Pr(Y_i = j) = \binom{x_i}{j}(1-e_i)^j e_i^{x_i - j} \quad (2\text{-}3)$$

In equation (2-3), $Pr(Y_i = j)$ is the probability that $Y_i = j$. In this case, $\sum_{i=1}^{m} Y_i$ becomes the sum of m independent binomial random variables and the reliability constraint can be expressed as equation (2-4).

$$F(x_1, \ldots, x_m; k) := Pr\left(\sum_{i=1}^{m} Y_i < k\right) = \sum_{\substack{j_1 + \ldots + j_m < k \\ j_1, \ldots, j_m \ge 0}} \prod_{i=1}^{m} Pr(Y_i = j_i) \quad (2\text{-}4)$$

2.1.2. Latency Constraint

The maximum number of data packets $N_i$ that can be transmitted on each path i depends on the delay bound D, data packet size B, and path i's data transmission rate and delay profile. With the i.i.d. erasure assumption discussed previously, $N_i$ is further restricted to be the maximum number of independently transmitted packets supported on path i within delay bound D. Note that the radio resources available may allow more data packets to be transmitted if such independence is not required. However, to optimize the performance of NC and the efficiency of overall resource usage, such extra resources were chosen to be allocated to other uncorrelated data traffic (e.g., other groups of network coded packets). Specifically, the following rules can be used to determine $N_i$.

In transmission time interval (TTI)-based transmissions (e.g., cellular systems), the bandwidth is assumed to be large enough to transmit one packet in one TTI regardless of the spectral efficiency. However, only one packet is allowed to be transmitted per TTI due to the independence requirement mentioned previously. The maximum number of data packets $N_i$ for TTI-based systems can be calculated according to equation (2-5).

$$N_i = \left\lfloor \frac{D - D_{B,i}}{T} \right\rfloor \quad (2\text{-}5)$$

In equation (2-5), $\lfloor \cdot \rfloor$ denotes the integer part, $D_{B,i}$ is the backhaul delay (e.g., for downstream traffic, or access delay for upstream traffic) for path i, and is T the duration of each TTI.

In other communication systems (e.g., WiFi systems), the transmission time granularity is small enough to allow for a continuous approximation. The maximum number of data packets $N_i$ for non-TTI-based systems can be calculated according to equation (2-6).

$$N_i = \left\lfloor \frac{(D - D_{B,i})W_i\gamma_i}{B} \right\rfloor \quad (2\text{-}6)$$

In equation (2-6), $W_i$ is the allocated bandwidth for path i, and $D_{B,i}$ is the backhaul/access delay.

2.1.3. Reliability Constraint for Systematic Codes

The reliability constraint can be expressed using the decoding failure probability defined previously (e.g., $F(x_1, \ldots, x_m; k) \le \epsilon$), if the k information packets are intended to be used together (e.g., together they form a file/upper layer packet that is to be delivered and used at the receiver); and/or the information packets are to be used separately, but non-systematic NC is used, in which case none of the original packets can be recovered unless the network code can be decoded.

If the information packets are individually meaningful and systematic NC is used, then the reliability constraint should be changed as discussed in section 3 infra. For systematic code, original information packets are embedded as part of the encoded output packets n. For example, when k information packets are encoded into n coded packets using a systematic code, then k of these n packets are the original information packets themselves, which are called systematic packets. In this way, for each path i, if $x_i$ packets are sent to path i with $\sum_{i=1}^{m} x_i = n$, and among them a systematic packet p is sent through path j, then the receiver 420 has two chances of recovering it: either the transmission of packet p through path j is successful, or it is not, but the receiver 420 recovers packet p by decoding all the k information packets using all packets received from all the paths. In this case, the probability of not recovering packet p at the receiver can be written as shown by equation (2-7).

$$e_j \cdot F(x_1, \ldots, x_j - 1, \ldots, x_m; k) \quad (2\text{-}7)$$

When the reliability target $\epsilon$ is defined by the success decoding rate of individual information packet, the reliability constraint for the optimization problem should be changed to reflect it. For example, the reliability constraint can be changed to the average packet loss probability as shown by equation (2-8).

$$\frac{1}{k}\sum_{i=1}^{k} e_{j_i} F(x_1, \ldots, x_{j_i} - 1, \ldots, x_m; k) \le \epsilon \qquad (2\text{-}8)$$

In equation (2-8), $j_i$ denotes the index of the path through which information packet i is transmitted.

2.2. Path Ordering Methods and Greedy Algorithms

The optimization algorithms discussed in this section of the present disclosure are of greedy-type, according to a certain preference order on the m paths. Two path ordering methods are provided infra, both of which both the same process shown by FIG. 6 to order the paths according to a score that reflects their estimated efficiency of resource-reliability trade-off.

FIG. 6 shows an example path ordering process 600 according to various embodiments. Process 600 may be performed by the REE 242 and/or the MA-TM 246. Process 600 begins at operation 601 where the REE 242/MA-TM 246 calculates path scores for each path i. At operation 602, the REE 242/MA-TM 246 orders the path scores, and at operation 603, the REE/MA-TM 246 outputs the path orders.

In a first path ordering method (M1), the REE/MA-TM 246 estimates this efficiency using the packet repetition scheme due to its simplicity. Where u units of radio resources is/are used on path i for packet repetition, then the number of repetitions is $uy_i$ and the corresponding packet loss probability is calculated according to equation (2-9).

$$e_i^{u\gamma_i} = 10^{u(\gamma_i \log e_i)} = 10^{-u(-\gamma_i \log e_i)} \qquad (2\text{-}9)$$

For a given resource u, the (positive) quantity $s_i := -y_i \log e_i$ measures the reliability of path i under packet repetition. Here, the reliability is better when the score $s_i$ is larger. In the first path ordering method (M1), the score $s_i$ is defined for each path i according to equation (2-10) (operation 601).

$$s_i = -\gamma_i \log e_i \qquad (2\text{-}10)$$

After calculating the score $s_i$, the REE/MA-TM 246 sorts all the path scores in descending order (operation 602). Then, the preference order for path i is the position of the score $s_i$ in the ordering outcome.

In the second path ordering method (M2), the REE/MA-TM 246 calculates the minimum amount of radio resources needed on each path i for NC to meet the given reliability target $\epsilon$, assuming that all packets are transmitted through path i only. Then, this quantity, denoted again by $s_i$, is used to estimate the resource-reliability trade-off efficiency of path i. Given a reliability target $\epsilon$, a path i is deemed to be more efficient if the minimally required amount of resource $s_i$ for NC is smaller.

In the second path ordering method (M2), for each path i, the minimum number of encoded packets needed to meet the reliability target $\epsilon$ if all packets are to be transmitted on path i is calculated according to equation (2-11).

$$n_i = \min\{n : F_i(n, k) \le \epsilon\} \qquad (2\text{-}11)$$

In equation (2-11), $n_i$ is the minimum number of encoded packets needed to meet the reliability target $\epsilon$ if all packets are to be transmitted on path i, and $F_i(n, k)$ is the decoding failure probability if n encoded packets are transmitted on path i. Namely, if Y is the corresponding number of received packets, then $F_i(n, k)$ is defined according equation (2-12).

$$F_i(n, k) := Pr(Y < k) = \sum_{j=0}^{k-1} \binom{n}{j}(1 - e_i)^j e_i^{n-j} \qquad (2\text{-}12)$$

As mentioned previously, if the reliability target $\epsilon$ is defined as individual information packet decoding probability, then $F_i(n, k)$ should be changed accordingly in the definition of $n_i$. Now the score $s_i$ of path i can be defined according to equation (2-13).

$$s_i = n_i / \gamma_i \qquad (2\text{-}13)$$

Equation (2-13) represents the required resource to transmit $n_i$ packets on path i. In the second ordering method (m2), the REE/MA-TM 246 sorts all the path scores in ascending order (operation 602). Then, the preference order for path i is the position of the score $s_i$ in the ordering outcome.

The resulting preference order of either method M1 or M2 can be denoted by a length-m list P, whose i-th entry P(i) represents the index for the i-th preferred path. Given such a preference order P, two algorithms can be performed that use the path resources in a greedy manner. Here, "greedy-manner" refers to allocating resources starting from highest order path until the reliability target $\epsilon$ is met. To help explain these algorithms, FIG. 7 shows an example line-up and indexing scheme 700 of all possible packet transmission opportunities (which are referred to herein as "units of transmission") of all paths within the delay bound D (there are $N_i$ units for each path i). The order of the line-up 700 follows the preference order P, and each transmission unit is indexed by a natural number between 1 and $\Sigma_{i=1}{}^m N_i$.

The greedy algorithms attempt to allocate each path's units in the preference order P for the transmission of network encoded packets, until the reliability target $\epsilon$ is met. In particular, in FIG. 7, if n encoded packets is/are to be transmitted, the allocation will start from the $N_{P(1)}$ units from path P(1) until they are exhausted, and then continue to the path P(2) if needed, and so forth. The resulting allocation ($x_1, \ldots, x_m$) is referred to as the "P-greedy allocation" for the transmission of n packets, where $x_i$ denotes the number of packets sent to path i. The number $x_i$ is also equal to the number of indices in the set $\{1, \ldots, n\}$ that belong to path i in FIG. 7.

The two greedy algorithms both search for the minimal number n that satisfies the following condition: if k information packets are encoded into n packets and use the corresponding P-greedy allocation ($x_1, \ldots, x_m$) for packet transmission, then the reliability constraint is achieved. Both algorithms output the same n and the same corresponding P-greedy allocation ($x_1, \ldots, x_m$), but the searching processes for n are different.

2.2.1. Line-search Greedy Algorithm

Figure 8:
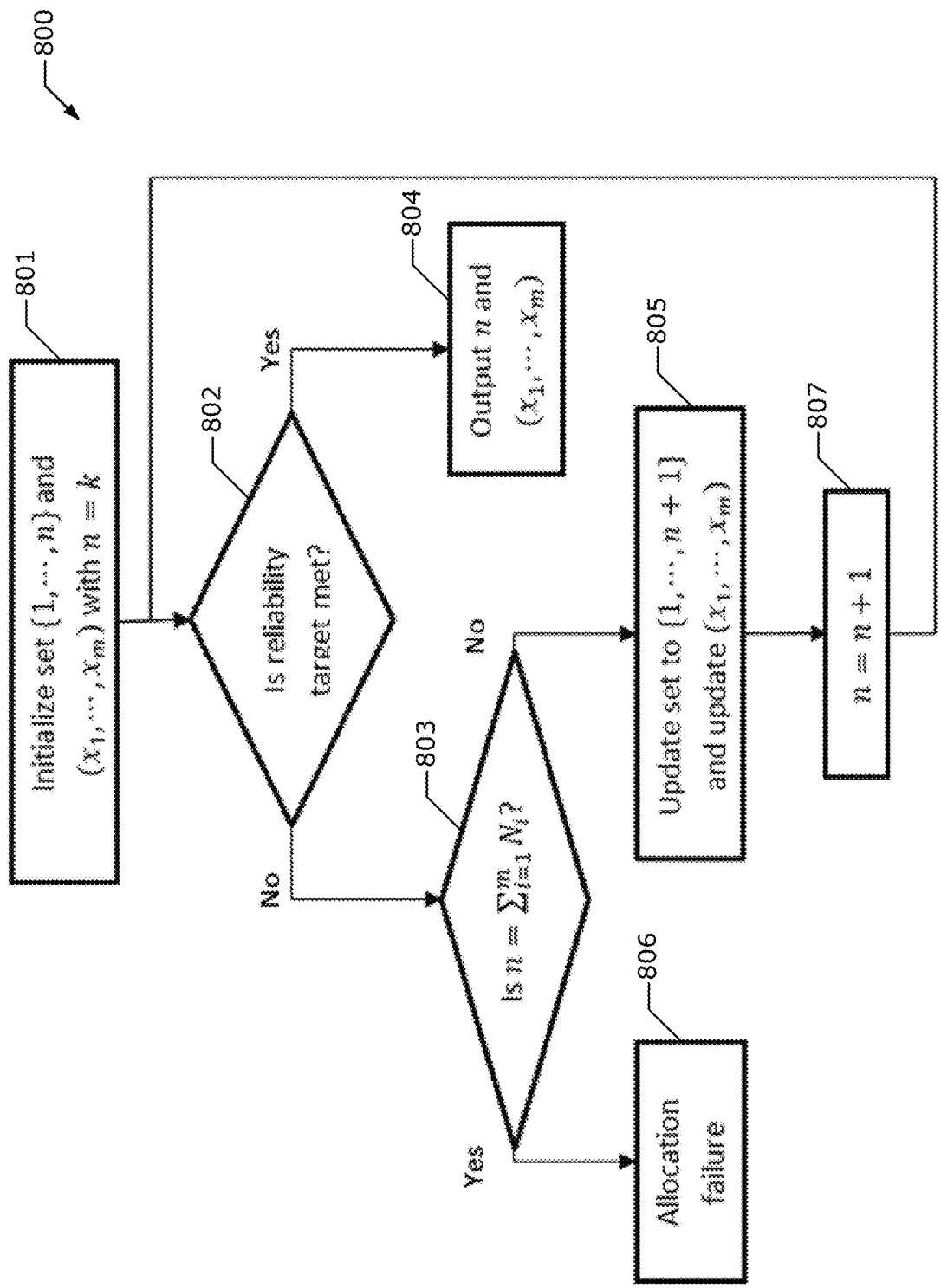
FIG. 8 depicts a line-search greedy search algorithm according to various embodiments.

FIG. 8 depicts a line-search greedy search algorithm 800 (with preference order P) according to various embodiments. The algorithm 800 starts at operation 801 with the set of transmission units $\{1, \ldots, n\}$ with the initialization n=k, and the corresponding P-greedy allocation $(x_1, \ldots, x_m)$. At operation 802, the REE/MA-TM 246 determines whether the reliability target $\epsilon$ is met. If the reliability target $\epsilon$ is met, at operation 804 the REE/MA-TM 246 outputs n and the corresponding P-greedy allocation $(x_1, \ldots$ If the reliability target $\epsilon$ is not met, at operation 803 the REE/MA-TM 246 determines whether $n = \sum_{i=1}^{m} N_i$. If $n = \sum_{i=1}^{m} N_i$, the REE/MA-TM 246 declares the allocation to be a failure at operation 806. Otherwise, the REE/MA-TM 246 updates the set of transmission units to $\{1, \ldots, n+1\}$ and updates the corresponding P-greedy allocation $(x_1, \ldots, x_m)$ at operation 805, and then sets n=n+1 at operation 807. After operation 807, the REE/MA-TM 246 proceeds back to operation 802 to determine whether the reliability target is met.

For every step (iteration) of algorithm 800, the next unit n+1 is added to the set $\{1, \ldots, n\}$ (805) and for the path to which the index n+1 belongs in FIG. 7, and the corresponding allocation entry $x_i$ is increased by 1 (805), and the index n is then updated to be n=n+1 (807). At the end of each step (iteration), the reliability constraint is tested (802) and the algorithm 800 stops if it is satisfied (804). When this is the case, the algorithm 800 outputs the total encoded packets n and the allocation $(x_1, \ldots, x_m)$ (804). Otherwise the algorithm 800 moves on to the next step (iteration). If the reliability constraint cannot be satisfied even if all the $\sum_{i=1}^{m} N_i$ transmission units are exhausted (803), then the algorithm 800 outputs a failure for the allocation (806).

2.2.2. Binary-Search Greedy Algorithm

Figure 9:
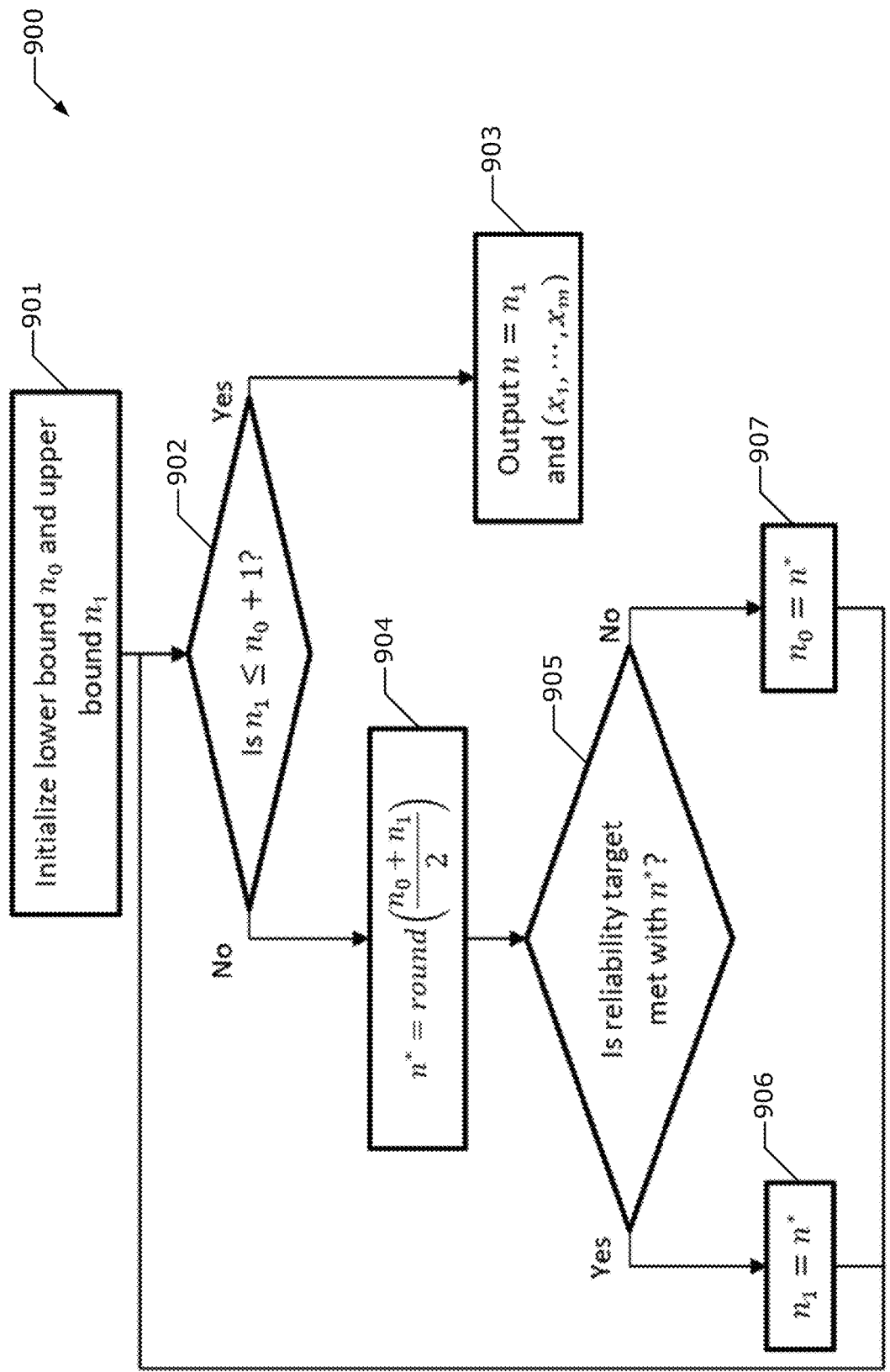
FIG. 9 depicts a binary-search greedy algorithm according to various embodiments.

FIG. 9 depicts a binary-search greedy algorithm 900 (with preference order P) according to various embodiments. The algorithm 900 starts at operation 901 where a lower bound $n_0$ and upper bound $n_1$ are initialized. At operation 902, the REE/MA-TM 246 determines whether the upper bound $n_1$ is less than or equal to the lower bound $n_0$ plus one (e.g., $n_1 \le n_0 + 1$). If the upper bound $n_1$ is less than or equal to the lower bound $n_0$ plus one, then at operation 903 the REE/MA-TM 246 outputs the upper bound $n_1$ (e.g., $n=n_1$) and the corresponding P-greedy allocation $(x_1, \ldots, x_m)$. If the upper bound $n_1$ is not less than or equal to the lower bound $n_0$ plus one, then at operation 904 the REE/MA-TM $$246 \text{ sets } n^* = \text{round}\left(\frac{n_0 + n_1}{2}\right),$$

and at operation 905 the REE/MA-TM 246 determines whether the reliability target $\epsilon$ is met with n*. If the reliability target $\epsilon$ is met with n*, then at operation 906 the REE/MA-TM 246 sets the upper bound $n_1$ to be n* (e.g., $n_1 = n^*$). If the reliability target $\epsilon$ is not met with n*, then at operation 907 the REE/MA-TM 246 sets the lower bound $n_0$ to be n* (e.g., $n_0 = n^*$). After operation 906 or operation 907, the REE/MA-TM 246 proceeds back to operation 902 to determine if $n_1 \le n_0 + 1$.

The algorithm 900 starts with a lower bound $n_0$ k and an upper bound $n_1$ for the final searching output n. The choice of these bounds should ensure that the P-greedy allocation for $n_0$ does not satisfy the reliability constraint, but for $n_1$ it does. This condition will always be true throughout the execution of the algorithm. A simple choice is $n_0 = k$ and $n_1 = $ (if they meet the aforementioned requirement), but there could be more sophisticated ways to set the initial values of these bounds for better performance. If such a pair of bounds cannot be found, and if the P-greedy allocation $(x_1, \ldots, x_m)$ for $n_0 = k$ already satisfies the reliability constraint, then the algorithm outputs n=k and the allocation $(x_1, \ldots, x_m)$. Additionally or alternatively, if such a pair of bounds cannot be found, and if the P-greedy allocation $(x_1, \ldots, x_m)$ for $n_1 \le \sum_{i=1}^{m} N_i$ does not satisfy the reliability constraint, then the algorithm 900 outputs a failure for the allocation.

If $n_1 \le n_0 + 1$ (902), the algorithm 900 outputs $n=n_1$ and its corresponding P-greedy allocation (903). Otherwise, the algorithm $$900 \text{ sets } n^* = \text{round}\left(\frac{n_0 + n_1}{2}\right)(904),$$

where round(•) rounds its argument to the nearest integer. Then, the algorithm 900 checks if the P-greedy allocation for n* satisfies the reliability constraint (905). If it is true, the algorithm 900 sets $n_1 = n^*$ (906). Otherwise, the algorithm 900 sets $n_0 = n^*$ (907). Then, the algorithm 900 continues with the next iteration (902).

The above greedy algorithms (800 and 900) may have a "reliability overshooting" problem that leads to potential performance losses. That is, given an instance of the optimization problem the greedy algorithms may output an allocation that achieves a reliability unnecessarily higher than required by the constraint. Oftentimes, some units can be replaced in the allocation to alleviate this issue. Namely, some other units with better spectral efficiency can be used, but this may result in worse erasure probability to achieve lower reliability (but still satisfying the constraint) with less radio resources. Accordingly, a recursive final-unit adjustment procedure (see e.g., FIG. 10) for the greedy algorithms can be implemented. This recursive final-unit adjustment procedure reconsiders all available paths when allocating the last transmission unit in the greedy searching processes.

2.2.3. Recursive Final-Unit Adjustment Procedure for Greedy Algorithms

Figure 10:
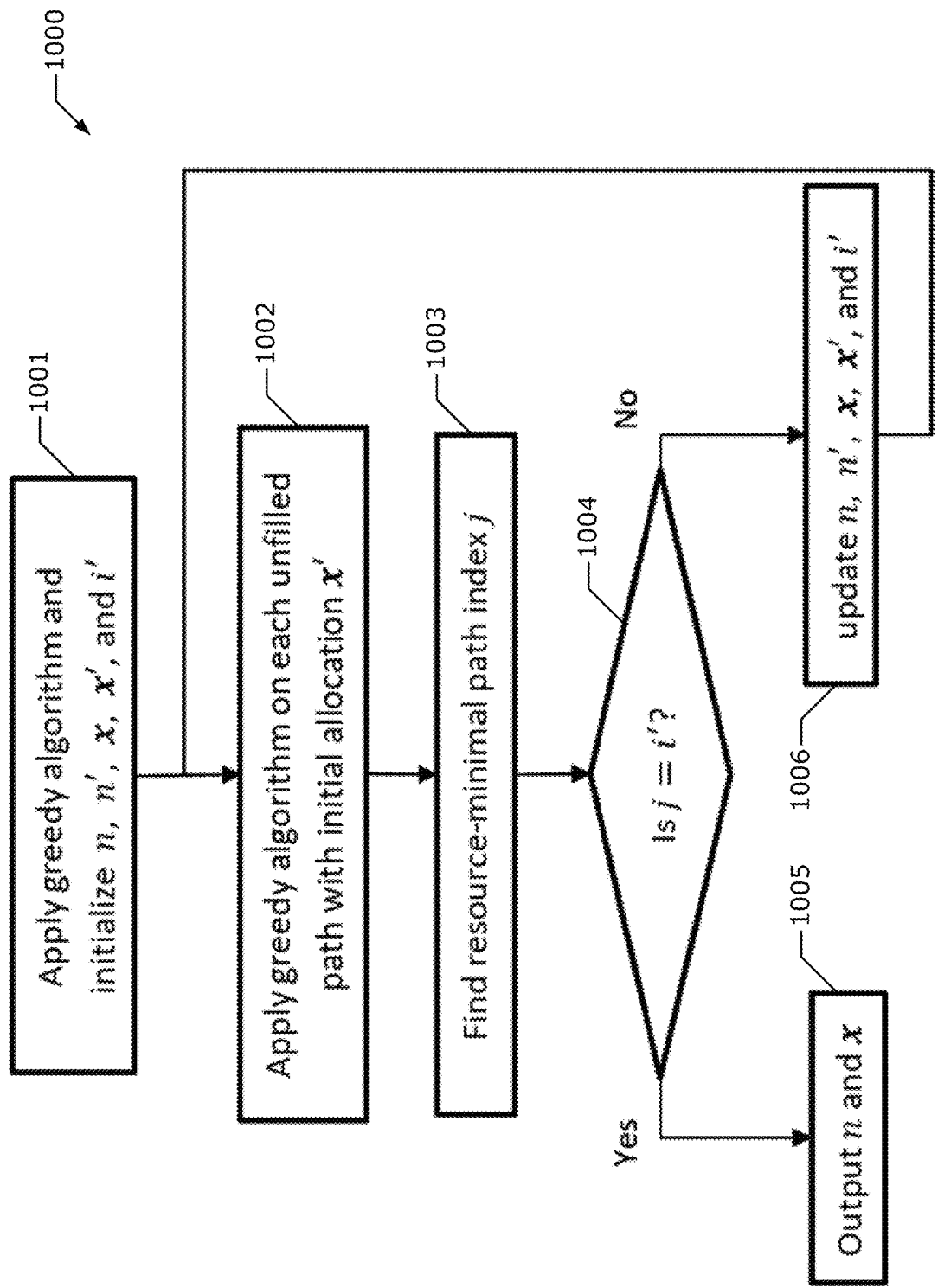
FIG. 10 depicts an example recursive final-unit adjustment procedure for greedy algorithms according to various embodiments.

FIG. 10 depicts an example recursive final-unit adjustment procedure 1000 for greedy algorithms. Procedure 1000 begins at operation 1001 where the REE/MA-TM 246 applies a greedy algorithm and initializes the variables n, n', x, x', and i'. At operation 1002, the REE/MA-TM 246 applies the greedy algorithm on each unfilled path with initial allocation x'. At operation 1003, the REE/MA-TM 246 finds resource-minimal path index j. At operation 1004, the REE/MA-TM 246 determines whether the resource-minimal path index j is the same as i' (j=i'). If j=i', then at operation 1005 the REE/MA-TM 246 outputs n and x. If j≠i', then at operation 1006 the REE/MA-TM 246 updates n, n', x, x', and C.

At operation 1001, the REE/MA-TM 246 applies the greedy algorithm (e.g., algorithm 800 or algorithm 900) to get its output, which includes the total encoded packets n and the allocation $x=(x_1, \ldots, x_m)$. The adjustment procedure 1000 starts by removing the last allocated unit n from the greedy allocation. The REE/MA-TM 246 starts with an initial number n'=n−1 and its corresponding P-greedy allocation $x'=(x'_1, \ldots, x'_m)$, which agrees with x on all the coordinates except the entry i that corresponds to the path containing the last allocated unit n (see e.g., FIG. 7), for which $x'_i = x_i - 1$. The REE/MA-TM 246 also records a final-unit path index which is initialized to i'=i.

At operation 1002, for each individual unfilled path with the initial allocation x', (e.g., for each path i with x'$_i$<N$_i$), the REE/MA-TM 246 solves for the smallest number d$_i$ of units such that the allocation x$^{(i)}$=(x$_1^{(i)}$, . . . , x$_m^{(i)}$)=(x'$_1$, . . . , x'$_i$+d$_i$, . . . , x'$_m$) satisfies the reliability constraint. Then, at operation 1003, the REE/MA-TM 246 finds the path index j for which x$^{(j)}$ has the minimal radio resource utilization:

$$j = \underset{j'}{\operatorname{argmin}} \left( \sum_{i=1}^{m} \frac{x_i^{(j')}}{\gamma_i} \right).$$

If at operation 1004 the final-unit path index does not need to change (i.e., j=i'), then at operation 1005 the REE/MA-TM 246 stops and outputs the total number of encoded packets n and allocation x. Otherwise, at operation 1006 the REE/MA-TM 246 updates various variables as shown by Table 2.2.3-1, and then continues with a next step (iteration) at operation 1002.

TABLE 2.2.3-1

| Variable | Updated Variable |
| --- | --- |
| n | n = n' + d$_j$ |
| n' | n' = n' + d$_j$ − 1 |
| x | x = x' on all coordinates except x$_j$ = x$_j$ + d$_j$ |
| x'$_j$ | x'$_j$ = x'$_j$ + d$_j$ − 1 |
| i' | i' = j |

For all allocation algorithms, given an allocation (x$_1$, . . . , x$_m$), if systematic network codes are used, the systematic packets will be transmitted using the units with the smallest possible erasure probabilities to boost the reliability performance. Additionally, as noted in Section 2.1.3, the reliability target could have different formulations in different contexts and with different code choices (systematic/non-systematic).

2.3. Performance Evaluation and Complexity Comparison for Greedy Algorithms

Table 2.3-1 shows the computational complexity of the various algorithms discussed previously.

TABLE 2.3-1

| Algorithm | Time Complexity | Time Complexity Type |
| --- | --- | --- |
| M1 or M2 path score computation | O(m) | linear time |
| M1 or M2 score ordering | O(m log m) | linearithmic, loglinear, or quasilinear time |
| line-search greedy algorithm | O(mD) | linear time |
| binary-search greedy algorithm | O(log(mD)) | logarithmic time |
| recursive final-unit adjustment procedure | O(m$^2$ log m) (at a minimum) | quadradic logarithmic time |
| exhaustive searching algorithm | O(D$^m$) | polynomial, algebraic, or exponential time |

In Table 2.3-1, the "O" in the Time Complexity column refers to the use of Big O notation, which is a mathematical notation that describes the limiting behavior of a function when the argument tends towards a particular value or infinity. The Big O notation is often used to classify algorithms according to how their running time or space requirements grow in size as the input size grows. The "m" in the Time Complexity column (e.g., "m" in "O(m log m)") refers to the number of paths i, and the "D" in the Time Complexity column (e.g., "D" in "O(mD)" refers to the delay bound. It should be noted that the time complexity of each algorithm may vary based on the memory structures used when operating the algorithms. Furthermore, the exhaustive searching algorithm was used as a comparison for the other algorithms listed in Table 2.3-1.

Randomized simulations were used to evaluate the performance and compare the computational complexity (through runtime) of the greedy algorithms discussed previously. In one such exemplary setting, m=4 paths, delay bound D=5 milliseconds (msec), and the fixed packet size B=12 kilobits (kbits). Each path i has a randomly generated packet erasure probability within the range $10^{-4}$~0.1, and a randomly generated data rate between 12~60 megabits per second (Mbps). For simplicity, the data rate was set to be a multiple of 12 Mbps so that within each millisecond the number of packets transmitted is an integer between 1 and 5. The bandwidth was assumed to be constant for all paths, so the spectral efficiency $\gamma_i$ for each path i is proportional to its data rate. Therefore, the maximum possible number of packets each path can transmit within the delay bound is 5×5=25, and for all four paths at most 100 packets can be transmitted. When a systematic network code is used, the reliability target can be $10^{-6}$ or $10^{-9}$.

One hundred (100) random instances were run under these settings, and all possible NC group sizes k were tested. The schemes that were compared are listed by Table 2.3-2.

TABLE 2.3-2

| Scheme | Algorithm |
| --- | --- |
| a | optimal exhaustive searching algorithm |
| b | standard Round-Robin algorithm |
| c1 | line-search greedy algorithm 800 using path ordering method M1 |
| c2 | binary-search greedy algorithm 900 using path ordering method M1 |
| d1 | line-search greedy algorithm 800 using path ordering method M1 |
| d2 | binary-search greedy algorithm 900 using path ordering method M1 |
| e1 | line-search greedy algorithm 800 using path ordering method M2 and the recursive final-unit adjustment procedure 1000 |
| e2 | binary-search greedy algorithm 900 using path ordering method M2 and the recursive final-unit adjustment procedure 1000 |

Figure 11A:
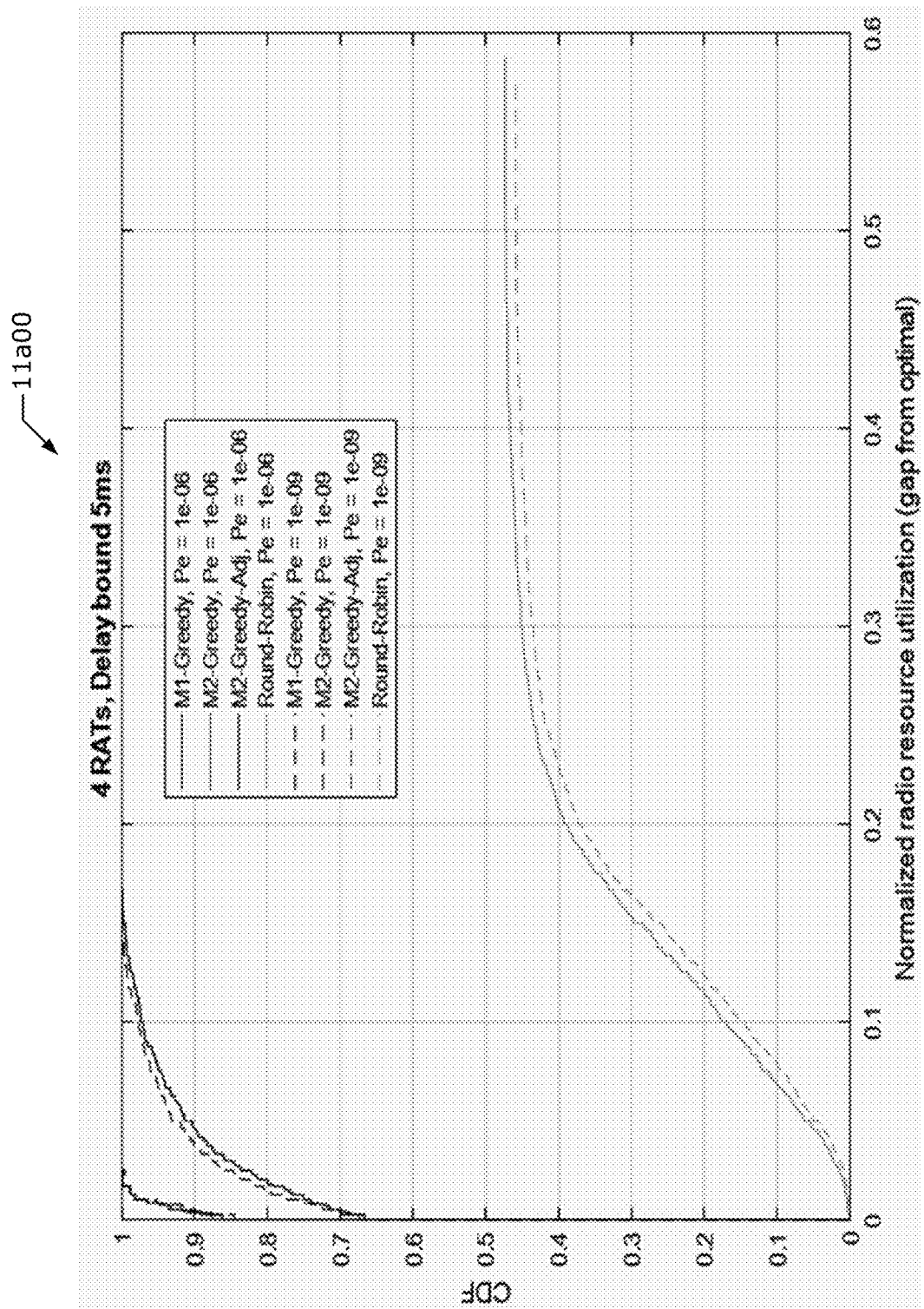
FIGS. 11a, 11b, 12a, and 12b depict simulation results of various optimization algorithms.
Figure 11B:
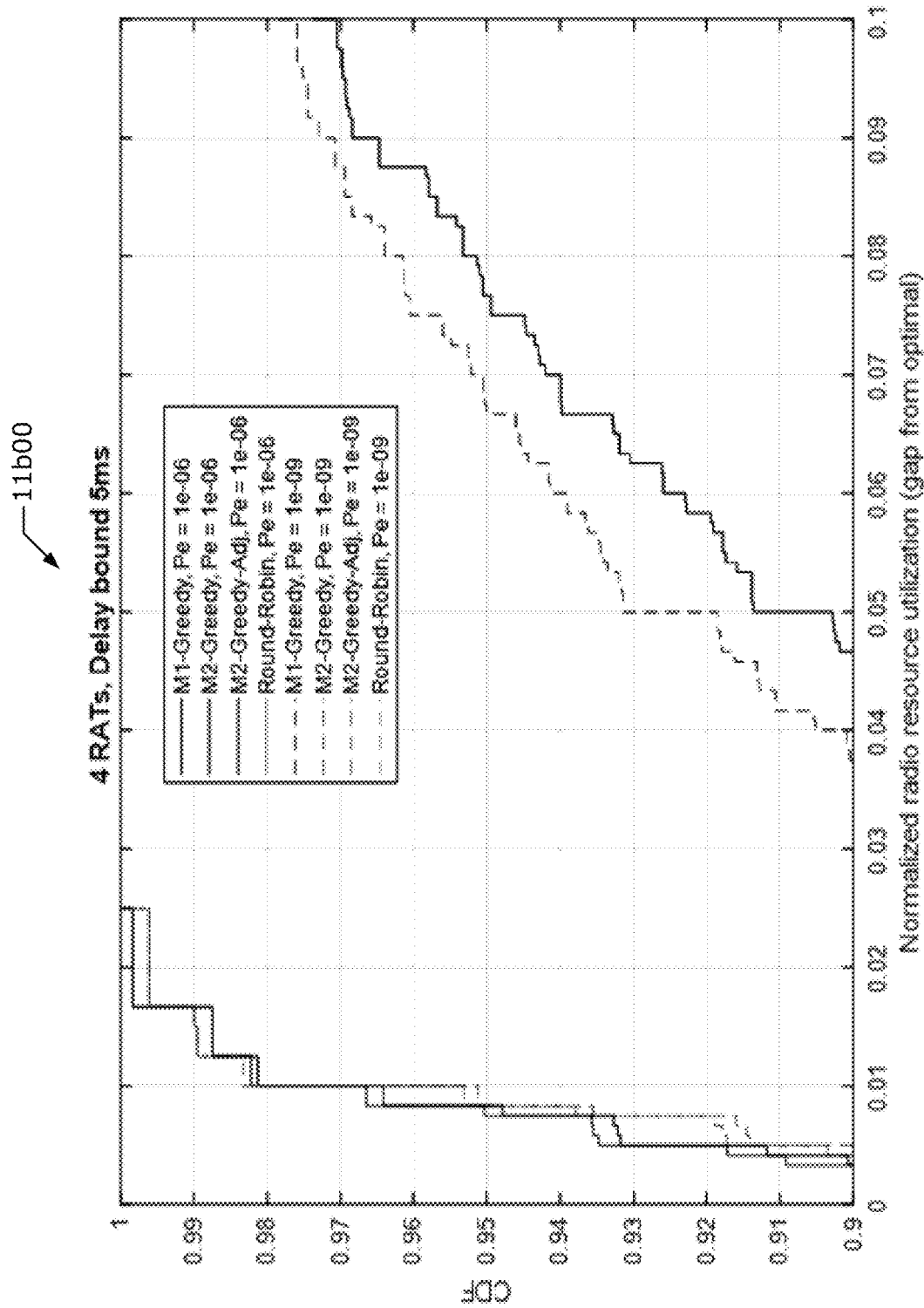

The exhaustive searching algorithm can always find the minimum resource utilization for the optimization problem if the total resource is enough to meet the reliability constraint (e.g., if the problem is feasible) for the given NC group size k. For each instance, the results were gathered for all feasible coding group sizes k, and all the data was combined to plot in graphs 11a00 and 11b00 in FIGS. 11a and 11b. FIG. 11a includes a graph 11a00 showing a normal scale of the extra percentage of resources used by non-optimal algorithms, and FIG. 11b includes a graph 11b00 showing a zoomed-in scale of the extra percentage of resources used by non-optimal algorithms. In graphs 11a00 and 11b00, the cumulative distribution function (CDF) of the extra $$\sum_{i=1}^{m} \frac{N_i}{\gamma_i}$$

radio resources used for each non-optimal algorithm, normalized by the total resources in each instance (cf. FIG. 5). Note that the line-search and binary-search greedy algorithms output the exact same solution in these simulations, so they are shown as the same curve in the plot. It can be seen that whenever the problem is feasible (e.g., when an optimal solution exists), each greedy-type algorithm can find a resource-utilization solution that meets the reliability target, whereas the standard Round-Robin algorithm can only achieve that for less than 50% of the cases.

Among the greedy-type algorithms, those using path ordering method M2 perform better than method M1. In particular, for 95% of the cases the greedy-type algorithms using method M2 can find solutions that utilize no more than 1% extra resources compared to the optimal solution, while those using method M1 this extra resource gap is 7%-8%. Applying the final-unit adjustment procedure 1000 can further bring some (very limited) performance gains.

Figure 12A:
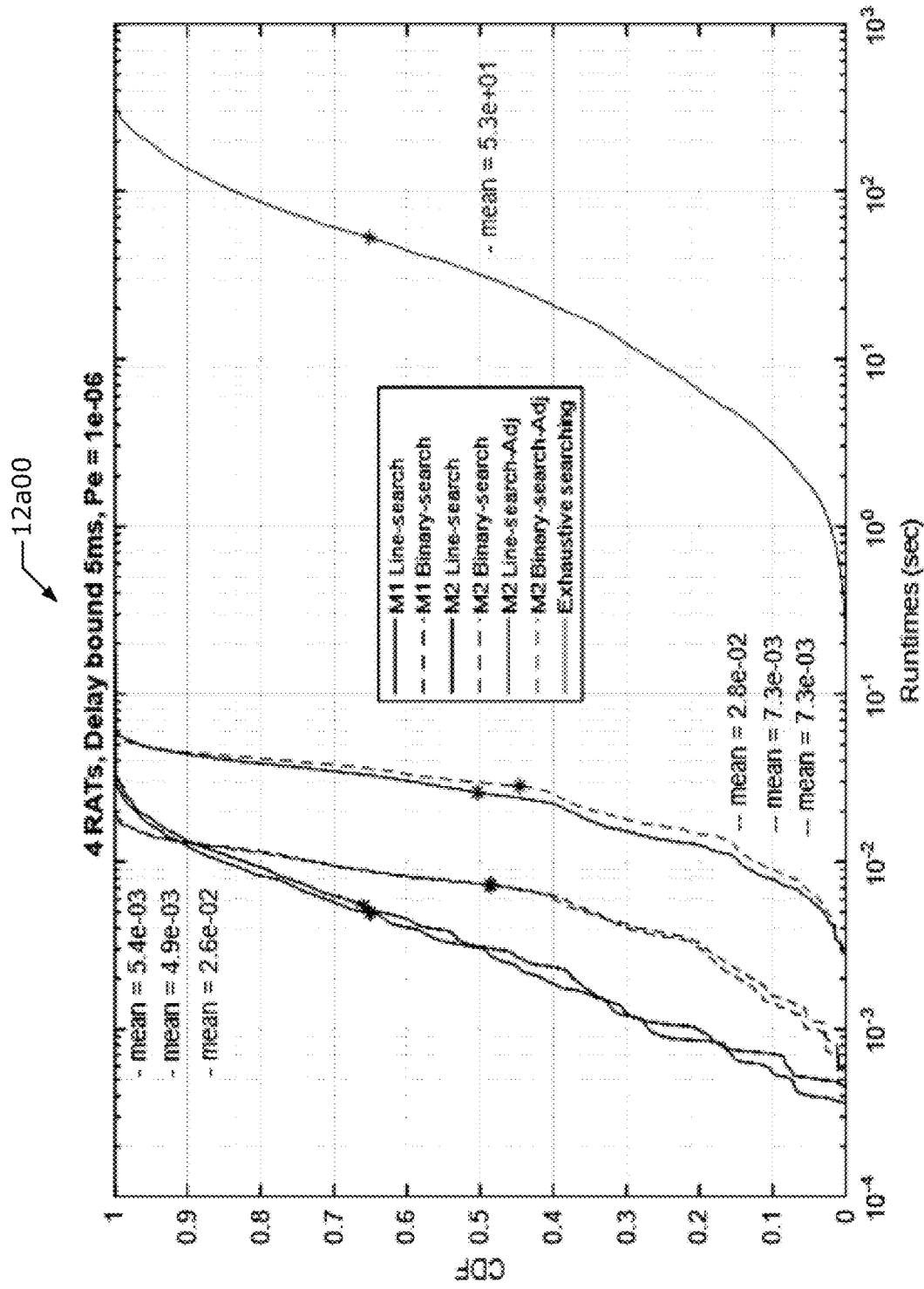
Figure 12B:
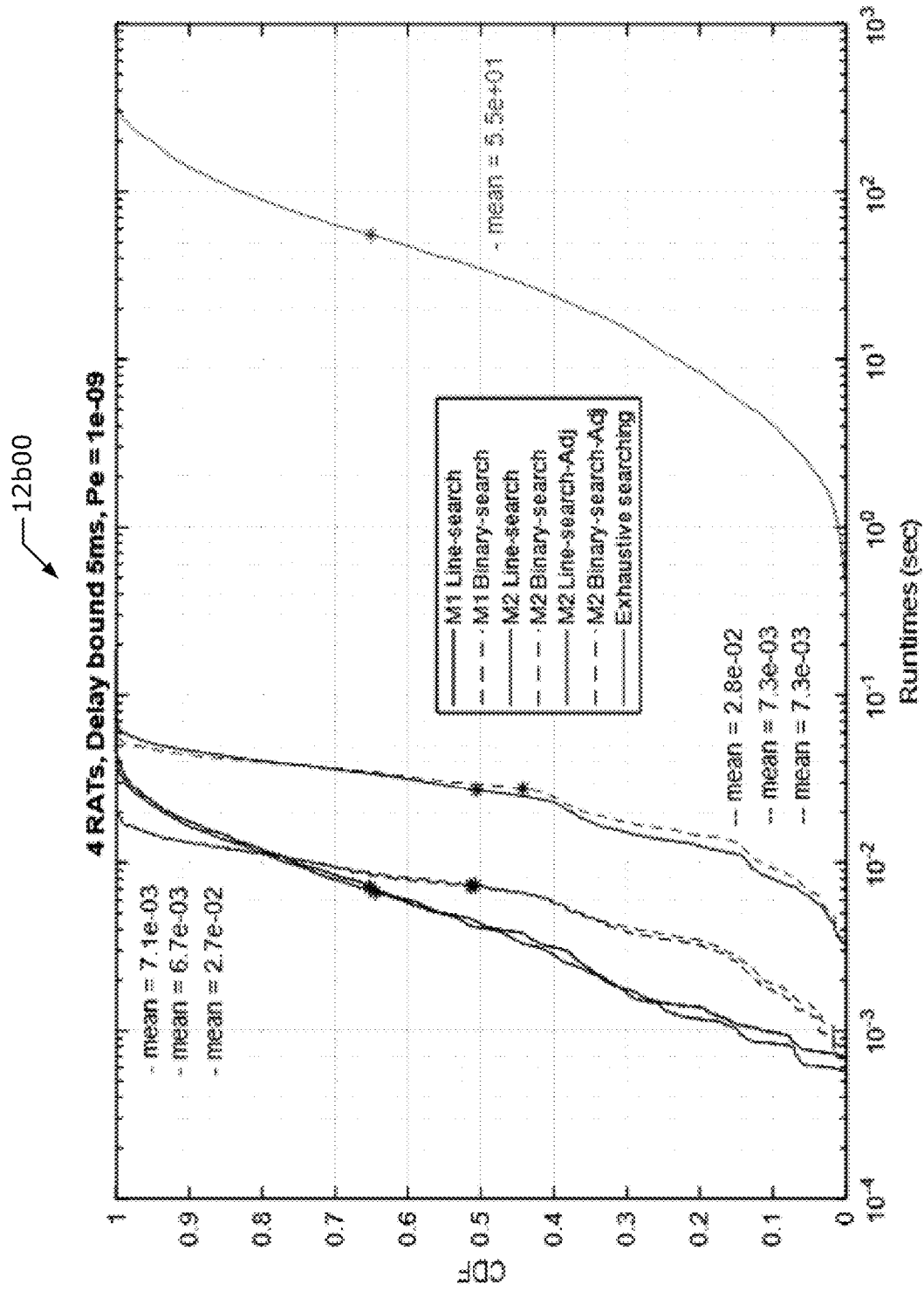

A comparison of the computational complexity of the algorithms is shown empirically through the recorded runtime for each optimization instance simulation. FIG. 12a includes a graph 12a00 showing the reliability ($10^{-6}$) of the greedy-type algorithms, and FIG. 12b includes a graph 12b00 showing the reliability ($10^{-9}$) of the greedy-type algorithms. In FIGS. 12a and 12b, the CDF of these runtimes are plotted. From graphs 12a00 and 12b00, it can be seen that the greedy-type algorithms require only ~$10^{-4}$ of the runtime for the optimal exhaustive searching. With the recursive final-unit adjustment procedure 1000 (see e.g., section 2.2.3 supra), the runtime increases to ~$5 \times 10^{-4}$ of the exhaustive searching runtime, but still negligible compared to the latter. The line-search and binary-search roughly have similar average runtimes, since the scale of the optimization problem is not too large and both algorithms are fast on this scale.

3. Transmission-Delay Optimal Traffic Distribution for Network Coding on Multiple Paths As mentioned previously, NC can be used as a technique to provide proactive redundancy when data packets are transmitted on communication networks, which enhances e2e reliability and reduces transmission latency. When there are multiple communication links/paths (using the same or different RATs) between source and destination nodes with different data rates, reliability, and delay profiles, it is difficult to optimally add redundancy to the source packets to meet a given reliability target, and it is also difficult to optimally distribute these network coded packets to different links/paths.

On a single path with i.i.d. erasure of packets, the amount of NC needed that meets a given reliability target can be determined by comparing the target with the decoding probability of the network code, which can be calculated using the CDF of binomial distributions. For the case with multiple links/paths, given the number of encoded packets sent on each path, the probability of successful decoding can also be computed. Thus, if a traffic distribution rule is given, the number of network coded packets distributed on the paths follow a pre-determined pattern, and therefore, the amount of NC needed can also be figured out by comparing the decoding probability with the reliability target. Existing traffic distribution rules include the standard round-robin algorithm, which distributes an equal amount of traffic to each path. When all the paths have the same erasure probability and delay profiles, a traffic distribution rule that sends network coded traffic to each path in proportion to the data rate supported may be used (see e.g., U.S. application Ser. No. 17/014,945, filed on 8 Sep. 2020, the contents of which are hereby incorporated by reference in its entirety). However, these traffic distribution algorithms are not the efficient when the data rates, reliability, and delay profiles are all different for some or all of the multiple links/paths. To meet a given reliability target, they may incur a longer transmission delay, or require a lower NC rate, and therefore, have a lower radio efficiency than the optimal solution.

The present disclosure provides a multi-path traffic distribution algorithm, together with an iterative bisection algorithm for NC that achieves an optimal transmission delay under a given reliability target. The present disclosure also provides an early-stop mechanism to save radio resource if feedback is available. If NC is performed across different packets and the reliability is measured per packet, systematic NC is used to fill the paths with systematic packets (e.g., original information packets) first, in the ascending order of the path erasure probabilities. This traffic distribution strategy plus bisection algorithm is transmission-delay optimal, which reduces latency and increases network efficiency at least in terms of resource utilization. The algorithms discussed herein can efficiently enhance the reliability of any multi-path system with minimum delay (e.g., for cellular systems with multi-connectivity and/or multi-access edge computing traffic management). The traffic distribution algorithm discussed herein tries to equalize the transmission delay on each path and is independent of the reliability profiles for the paths, and the early-stop mechanism can save radio resources for all paths.

3.1. Network Coding Rate and Traffic Distribution for Multiple Paths

Figure 13:
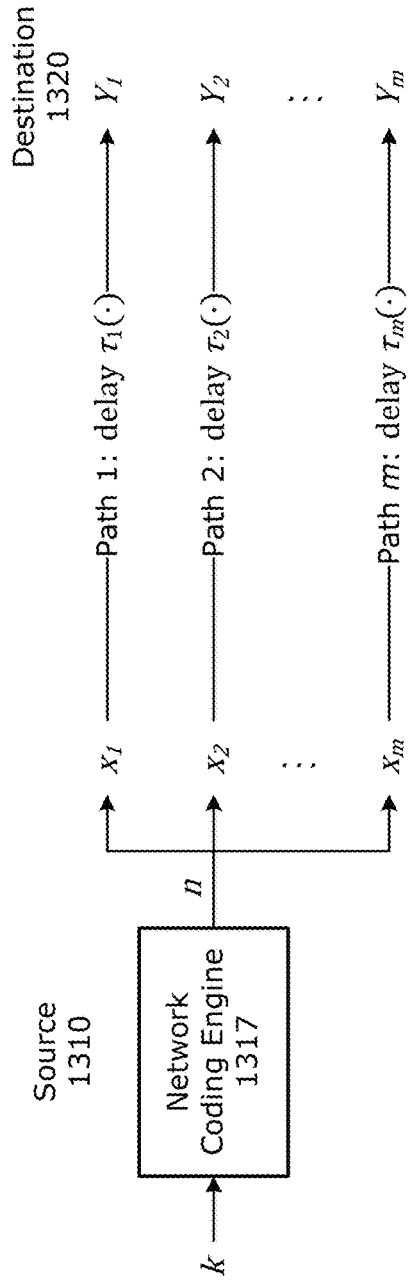
FIG. 13 depicts another example of multi-path network coding according to various embodiments.

FIG. 13 shows an example of multi-path NC 1300 according to various embodiments. The multi-path NC 1300 is used for traffic distribution among the multiple paths 230, some or all of which may have different data rates, reliability, and delay profiles. In the example of FIG. 13, a group of k information packets (e.g., all of which have a same size B) are to be sent by a source node 1310 through a lossy network to a destination node 1320, where the lossy network includes m independent paths (e.g., 1 to m paths in FIG. 13, where m is a number). The m independent paths may correspond to individual paths 230 of FIG. 2 (including fronthaul and backhaul connections/links/channels). The k information packets are provided to a NC engine 1317 (which may be the same or similar to the NC engines 217 and 417 discussed previously with respect to FIGS. 2 and 4). The NC engine 1317 applies a coding scheme to the k information packets, and produces n encoded packets. The n encoded packets are then sent over m independent paths i (e.g., where i=1, . . . , m), where $x_i$ number of encoded packets from the n encoded packets are sent over corresponding paths i, and $Y_i$ number of encoded packets are received by the destination node 420 over the corresponding paths i. In this example, the source node 1310 may be the same or similar as source node 410 of FIG. 4, UE 201, NAN 233a-c, or edge node 236 of FIG. 2, and the destination node 1320 may be the same or similar as destination node 420 of FIG. 4, UE 201, NAN 233a-c, or edge node 236 of FIG. 2. Additionally, each of the paths i may utilize the same RAT or may be paths belonging to different RATs.

Furthermore, on each path i, there is a certain erasure pattern/probability, and the time for transmitting x packets is $\tau_i(x)$. NC is used to combat packet losses and provide the required reliability. If the k information packets are encoded into n coded packets and $x_i$ of the encoded packets are sent to path i so that $\sum_{i=1}^{m} x_i = n$, then the probability of decoding failure is denoted by equation (3-1).

$$F(x_1, \ldots, x_m; k) := Pr\left(\sum_{i=1}^{m} Y_i < k\right) \qquad (3\text{-}1)$$

In equation (3-1), $Y_i$ is the number of received packets after erasure on path i. Here, it is assumed that the network code is well-designed such that receiving any k out of n encoded packets ensures successful decoding. The present disclosure addresses the following problem: what is the required n, and how to distribute these n encoded packets to the m paths (e.g., what values should $x_1, \ldots, x_n$, take), to meet a reliability target $\epsilon$ to satisfy $F(x_1, \ldots, x_m; k) \le \epsilon$ and to minimize the transmission delay $$\max_{1 \le i \le m} \tau_i(x_i) ?$$

This problem can be characterized as shown by equation (3-2).

$$\min_{x_1, \ldots, x_m} \max_{1 \le i \le m} \tau_i(x_i) \quad (3\text{-}2)$$
$$\text{s.t. } x_i \ge 0, 1 \le i \le m$$
$$F(x_1, \ldots, x_m; k) \le \epsilon$$

The paths can have different erasure probabilities and the erasures are independent across different paths. On the same path, different packets may be subject to independent or dependent erasures. If m=1 and the packet erasures are i.i.d. with probability e, then the number of received packets $Y_1$ follows a binomial distribution. In this case the function F $(x_1; k) = F_1(x_1; k)$, where $F_1$ is defined as the CDF of $Y_1$ evaluated at k−1, as shown by equation (3-3).

$$F_1(x_1; k) := Pr(Y_1 < k) = \sum_{i=0}^{k-1} \binom{x_1}{i} (1-e)^i e^{x_1 - i} \quad (3\text{-}3)$$

If m>1 and the packet erasures are i.i.d. on each path i with probability $e_i$, then the total number of received packets $\Sigma_{i=1}^m Y_i$ becomes a sum of independent binomial random variables which are not necessarily identically distributed. Its probability mass function can be obtained via the convolution of the individual binomial probability mass functions.

Additionally or alternatively, the delay function $\tau_i(x)$ reflects path i's delay and data rate profiles. For example, if path i supports a data rate of $R_i$ and the scheduling interval is small enough, then $\tau_i(x)$ can be simply expressed as a linear function $$\frac{xd}{R_i},$$

where d is the size of each packet. If, instead, the transmission on path i is TTI-based and on each TTI a certain number of packets can be transmitted, then $\tau_i(x)$ takes the form of a staircase-shaped function. Furthermore, if there is an initial delay $D_{B,i}$ on path i (this could be the backhaul delay for downstream traffic, or access delay for upstream traffic), then an extra step function $D_{B,i} \cdot 1_{\{x>0\}}$ should be added to $\tau_i(x)$, where $1_{\{\cdot\}}$ is the indicator function.

3.2. Optimal Traffic Distribution Strategy to Satisfy Target Decoding Probability According to various embodiments, a 2-layered algorithm is provided, which tries to equalize the transmission delays on all paths to achieve the minimum overall transmission delay, under the constraint of a target decoding probability $F(x_1, \ldots x_m; k) \le \epsilon$.

In a first algorithm (L1), given a fixed delay bound t, the first algorithm (L1) tries to send as many packets as possible within t on each path to maximize the reliability at the receiver (e.g., destination node 1320). That is, the traffic allocation rule of L1 sends $x_i = \tau_i^{-1}(t)$ packets to path i, where $\tau_i^{-1}(t)$ denotes the maximum number of packets that can be transmitted on path i within time t, as expressed by equation (3-4).

$$\tau_i^{-1}(t) := \max\{x: \tau_i(x) \le t\} \quad (3\text{-}4)$$

From equation (3-4), it can be seen that the delays on all paths are equalized as much as possible, within bound t as shown by equation (3-5).

$$\tau^{-1}(t) = (\tau_1^{-1}(t), \ldots, \tau_m^{-1}(t)) \quad (3\text{-}5)$$

In a second algorithm (L2), to find the minimum delay t* that satisfies the reliability target $\epsilon$ using the traffic allocation rule, an iterative bisection method is used. The algorithm iteratively computes an interval which always contains t*, and whose length is halved in each iteration. When the length of the interval is smaller than the required precision $\sigma$, the algorithm (L2) outputs the upper bound of the interval.

A first step of algorithm (L2) involves picking an initial interval $[t_0, t_1]$ such that $F(\tau^{-1}(t_0); k) > \epsilon$ but $F(\tau^{-1}(t_1); k) \le \epsilon$. A second step of algorithm (L2) involves computing $$t = \frac{t_0 + t_1}{2}.$$

A third step of algorithm (L2) involves set $t_1 = t$ if $F(\tau^{-1}(t); k) \le \epsilon$; otherwise the third step of algorithm (L2) involves setting $t_0 = t$. A fourth step of algorithm (L2) involves stopping and outputting $t^* = t_1$ if the precision requirement is satisfied, (e.g., $|t_0 - t_1| < \sigma$); otherwise, the fourth step involves going back to the second step of algorithm (L2). Once the minimum delay t* is determined or obtained, the number of encoded packets to be sent to each path i is obtained through $x_i = \tau_i^{-1}(t)$, and the total number of encoded packets $n = \Sigma x_i$.

For the algorithm L2 to work, some parameters need to be appropriately set. First, the lower endpoint $t_0$ of the initial interval is set to zero (e.g., $t_0 = 0$). Since practically transmitting any packet comes with a delay, this forces $\tau_i^{-1}(t) = 0$ for each path i (e.g., no packets can be transmitted). Thus, no packets can be received and the decoding failure probability satisfies $F(\tau^{-1}(t_0); k) = F(0, \ldots, 0; k) = 1 > \epsilon$.

Second, for the upper endpoint $t_1$, either a large number $t_1$ can be used to test whether $F(\tau^{-1}(t_1); k) \le \epsilon$, or if packet erasures are i.i.d. with erasure probability $e_j$ on some path j, the following can be set: $t_1 = \tau_j(x_1)$, where $x_1$ is large enough to ensure that equation (3-6) is true (cf. equation (3-3) supra). This choice of $t_1$ guarantees that the reliability requirement is met even if we only consider the packets received from path j.

$$F(\tau^{-1}(t_1); k) \le F(0, \ldots, x_j, \ldots, 0; k) = \qquad (3\text{-}6)$$

$$\sum_{i=0}^{k-1} \binom{x_j}{i}(1-e_j)^i e_j^{x_j-i} \le \epsilon$$

Third, the precision requirement σ for the stopping criteria in the fourth step (4) of the algorithm L2 can be set to the shortest scheduled time slot for transmitting a packet through any path. For example, if one path is TTI-based and a whole packet can be transmitted within a TTI, then the time scheduled for one packet through that path is one TTI. If on another path, the time scheduling interval is much smaller than the transmission time of the packet, then roughly the time scheduled for a packet is $$\frac{\text{packet size}}{\text{data rate}}.$$

If a multi-pain system is composed of such two paths, then σ can be set to the smaller of the two scheduled time slots. The delay mentioned previously may be initial backhaul delay for downstream traffic, and/or may be access delay for upstream traffic In a special case when the erasures are i.i.d. on all paths and erasure probabilities are the same (or are estimated to be the same at the encoder), then the algorithm L2 takes a simpler form. In this case the decoding failure probability $F(x_1, \ldots, x_m; k) = F_1(n; k)$, where $n = \sum_{i=1}^{m} x_i$ and $F_1$ is defined in equation (3-3) with e being the common erasure probability. Define n* to be the smallest integer n satisfying $F_1(n; k) \le \epsilon$ and let $\Sigma\tau^{-1}(t) = \sum_{i=1}^{m} \tau_i^{-1}(t)$. Then in the algorithm L2, the conditions of form $F(\tau^{-1}(t); k) \le \epsilon$ can be replaced by $\Sigma\tau^{-1}(t) \ge n^*$, and $F(\tau^{-1}(t); k) > \epsilon$ by $\Sigma\tau^{-1}(t) < n^*$, and so forth. Furthermore, the value n* for most frequently used parameters (k, e, ε) can be stored as a lookup table and retrieved quickly whenever needed.

Note that when $\tau_i(x)$ is a linear function $$\frac{xd}{R_i}, \text{ then } \tau_i^{-1}(t) = \frac{tR_i}{d},$$

which is the rate-proportional traffic allocation strategy discussed in [AD2073]. If there is an initial delay $D_{B,i}$ on path i, $$\left(\text{e.g., } \tau_i(x) = \frac{xd}{R_i} + D_{B,i} \cdot 1_{\{x>0\}}\right), \text{ then } \tau_i^{-1}(t) = \begin{cases} \frac{(t-D_{B,i})R_i}{d}, & t > D_{B,i} \\ 0, & t \le D_{B,i} \end{cases},$$

which resembles a water-filling type of solution. The delay profile $\tau_i(x)$ may be dependent on load, size of packet, time to request resources, and/or other scheduling delays on each path, which are dynamically changing with time, and therefore, $\tau_i(x)$ is not expected to be a fixed function. However, since optimization is performed for each batch of k input packets and there is no dependence between different batches, $\tau_i(x)$ can be constantly measured and updated and for each optimization and the most up-to-date delay profile can be used. Similarly, for the erasure probabilities we can also constantly measure and adjust for each optimization. For downstream/DL traffic, the initial backhaul delay may not be fixed; it may be dependent on load, size of packet, other scheduling delays. I guess for downstream we can assume this is some expected backhaul delay.

3.3. Enhancements and Adjustments for Per-Packet Reliability

If the k information packets are intended to be used together, for example, together they form a file/upper layer packet that is to be delivered and used at the receiver (e.g., destination node 1320), then the e2e reliability requirement is the same as the constraint on the decoding probability $F(x_1, \ldots, x_m; k)$, and also the transmission delay calculated as discussed previously is exactly the e2e delay of the file/upper layer packet. In this sense, the 2-layered algorithm discussed previously minimizes the packet delivery delay while satisfying the reliability target. However, when the k information packets are to be used separately at the receiver (e.g., destination node 1320), the e2e reliability and the delay performance should be measured per each packet. In these revised metrics, the 2-layered algorithm does not necessarily guarantee the optimal performance.

When per-packet performance metrics are considered, the way reliability is calculated can be different from the decoding probability. For example, from the perspective of recovering a specific information packet p, it is not necessary for the receiver (e.g., destination node 1320) to successfully decode all k packets. As long as packet p is correctly received at the receiver (e.g., destination node 1320), it is considered a success, regardless of whether the other k−1 packets are recovered or not. In light of this observation, the aforementioned algorithm(s) may be enhanced in the following ways.

A first enhancement involves using systematic network codes. That is, if k information packets are encoded into n coded packets, then k number of the coded packets are kept in their original uncoded form (which are called the systematic packets). In this way, if $x_i$ packets are sent to path i for each i with $\sum_{i=1}^{m} x_i = n$, and among them a systematic packet p is sent through path j, then the receiver (e.g., destination node 1320) has two chances of recovering it: either the transmission of packet p through path j is successful, or it is not, but the receiver (e.g., destination node 1320) recovers packet p by decoding all the k information packets (including packet p) using all received packets from all the paths. In this case, the probability of not recovering packet p at the receiver (e.g., destination node 1320) can be written as $e_j \cdot F(x_1, \ldots, x_j-1, \ldots, x_m; k)$, assuming that $e_j$ is the packet erasure probability on path j and the erasures are independent on that path.

A second enhancement involves: prioritize the transmission of systematic packets on the paths with lower erasure probabilities given the number of packets allocated to each path (determined by the traffic distribution rule). Specifically, the second enhancement involves first allocating the systematic packets, using the paths in the order of ascending erasure probabilities; and second allocating the other encoded packets to the remaining unfilled paths. This method makes sure that the first chance of packet recovery is best utilized, with the highest reliability.

A third enhancement involves, with the two enhancement mentioned previously, modifying the reliability calculation in the bisection algorithm in section 3.2 to reflect the new per-packet failure probability. That is, the decoding failure probability $F(x_1, \ldots, x_m; k)$ is replaced with the average packet failure probability $$\frac{1}{k}\sum_{i=1}^{k} e_{j_i} \cdot F(x_1, \ldots, x_{j_i} - 1, \ldots, x_m; k),$$

where $j_i$ is the index of the path to which information packet i is allocated.

3.4. Early-Stop Mechanisms

In the case where exact per path erasure probability information is not available, NC and traffic distribution may be performed assuming worst-case per path erasure probability. For example, the underlying PHY/MAC layer can be assumed to select modulation-and-coding scheme that guarantees worst-case 10% packet drop rate and calculates $x_1, \ldots, x_m$ assuming per path erasure rate=0.1, using the method(s) described previously. Such worst-case provisioning provides performance guarantee at the cost of increased radio resource usage. Even when the information on per path erasure probability is available at the encoder, such resource provisioning still exists: since the transmitters (e.g., source node 1310) do not know whether the receiver (e.g., destination node 1320) has got enough packets to decode, the number of packets they send to the receiver (e.g., destination node 1320) needs to be large enough to provide the (probabilistic) reliability guarantee, even though in many cases the receiver (e.g., destination node 1320) gets more than enough for decoding. To mitigate such excessive radio usage for reliability provisioning, an early-stop cross-path acknowledgement may be used to stop unnecessary transmission once the desired number of packets are successfully received.

The early-stop cross-path acknowledgement may include using a NC group identification header to indicate which set of packets are jointly encoded through NC. The header also indicates the number of original information packets (k) belonging to this NC group.

Additionally or alternatively, during the transmission, the receiver (e.g., destination node 1320) counts how many packets belonging to the same NC group are received. Once that number becomes greater than or equal to k (e.g., some or all original information packets of this NC group can be successfully decoded), the receiver (e.g., destination node 1320) generates cross-path NC acknowledgement (NC-ACK) messages, indicating that some or all packets belonging to the NC group are successfully decoded, and then sends back one NC-ACK per path over all the paths 230.

Additionally or alternatively, for transmitters (e.g., source node 1310) that support NC-ACK messages, upon reception of an NC-ACK each of them will discard the remaining packets belonging to the same NC group indicated by the NC-ACK.

Additionally or alternatively, the NC-ACK can be sent to a designated master transmitter node (e.g., source node 1310). The transmitter node (e.g., source node 1310) then uses inter-node messaging to indicate to other nodes that additional packets belonging to the identified NC group are stopped. Such an approach may have slightly higher delay compared to transmitting NC-ACK to all transmitters (e.g., source node 1310), but is likely to be more resource efficient.

The NC-ACK identifies the NC group that is being acknowledged, and the NC-ACK can include some or all of the following additional information: a number of additional packets required for other NC groups that are partially received, and a timestamp (e.g., slot number) when enough packets were received for the NC group being acknowledged.

Figure 14:
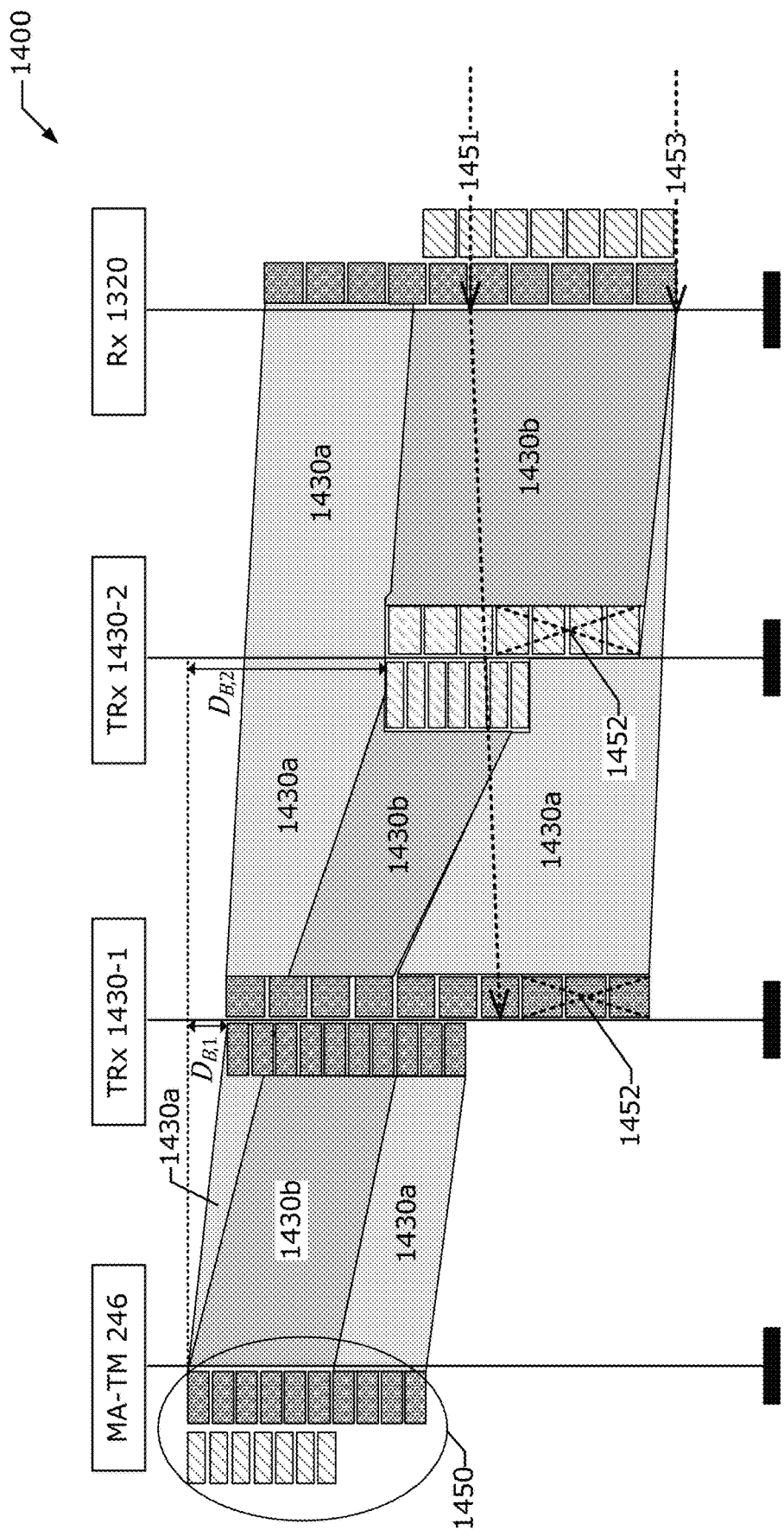
FIG. 14 depicts an early-stopping mechanism according to various embodiments.

FIG. 14 shows an example early-stopping mechanism 1400 according to various embodiments. In particular, FIG. 14 shows a timing diagram for an example illustrating the cross-path ACK early stop mechanism 1400 for DL data flows between the MA-TM 246 and an Rx 1320 via two transmitter/receiver (or transceiver) (TRx) nodes 1433 including TRx 1433-1 and TRx 1433-2. The TRx nodes 1433 may be individual NANs 233, base stations, access points, relay nodes, remote radio heads (RRHs), routers, switches, hubs, gateways, compute nodes 201, cloud compute nodes, edge compute nodes 236, and/or some other network element/node. The Rx 1320 may be a compute node 201, NAN 233, another edge compute node 236, and/or some other compute node.

Based on delay, data rate, and erasure rate of different paths, the MA-TM 246 can utilize methods described previously to apply NC on a group of information packets, and distributes jointly encoded packets 1450 over one or multiple paths 1430a, 1430b. Here, the jointly encoded packets 1450 are within the same NC group.

The TRx nodes 1433 on theses paths 1430a-b then send the encoded packets to the Rx 1320. The packets travel through different paths 1430a and 1430b, which are represented using different shadings in FIG. 14. The Rx 1320 may be able to successfully decode the original information packets before receiving all of the encoded packets, and the Rx 1320 sends an Early ACK message 1451 if/when it successfully decodes an NC group. By signaling successful reception of the NC group (e.g., using the Early ACK 1451), the TRx nodes 1433 can discard 1452 remaining packets of the same NC group in their respective Tx queues and free up radio resources for other traffic flows. The Rx 1320 may also equalize worst-case delay 1453.

3.5. Signaling Mechanisms to Enable Optimal Traffic Distribution Strategies

In various embodiments, the NC encoder 217, 417, 1317 needs to know the data rates, reliability, and delay profiles of each path 1430, 230 to perform the optimization algorithms discussed herein. In particular, some or all of the following information may be provided to the NC encoder 217, 417, 1317.

Each node that is not the NC encoder 217, 417, 1317, or does not include an NC encoder 217, 417, 1317 (e.g., NANs 233 and/or TRx nodes 1433 on the paths 1430, 230, which may be the same or different nodes for downstream traffic than those used for upstream traffic) reports its data rate selection, transport block (TB) size, and target packet error ratio (PER) to the NC encoder 217, 417, 1317. The NC encoder 217, 417, 1317 uses this information to determine an initial estimate of the delay profile and/or packet erasure probability.

Additionally or alternatively, the Rx 1320 (e.g., UE 201 and/or NAN 233 for downstream traffic, or edge node 236 or NAN 233 for upstream traffic) measures the delays and erasure probabilities during data transmission, and feeds back such information to the NC encoder 217, 417, 1317 to further adjust the (initial) estimates. For downstream traffic, the measured delays include the backhaul delay, and for upstream traffic the measured delays include the possible initial resource allocation (e.g., UL scheduling grant) delay.

Additionally or alternatively, for each path 1430, 230 the erasure probability may be estimated at the Tx entity (e.g., edge node 236 or NAN 233 for downstream, or UE 201 and/or NAN 233 for upstream) based on ACK/negative ACK (NACK) statistics. The estimated erasure probability can then be forwarded to the NC encoder 217, 417, 1317. The NC encoder 217, 417, 1317 can use these estimated erasure probabilities to further adjust the (initial) estimates.

For the early-stop mechanism 1400, the Rx 1320 (e.g., UE 201 and/or NAN 233 for downstream traffic, or edge node 236 or NAN 233 for upstream traffic) is further provided with cross-path NC acknowledgement (NC-ACK) messages from the TRx nodes 1433 indicating that packets belonging to the NC group are successfully decoded. In some implementations, a designated primary TRx node 1433 can collect the NC-ACKs and/or other metrics from other TRx nodes 1433, and provide the NC-ACKs and/or other metrics to the Rx 1320. Other metrics and/or measurements, such as those discussed herein, may also be collected and used for NC.

4. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include Multi-access Edge Computing (MEC); Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

FIG. 15 illustrates an example edge computing environment 1500. FIG. 15 specifically illustrates the different layers of communication occurring within the environment 1500, starting from endpoint sensors or things layer 1510 (e.g., operating in an Internet of Things (IoT) network topology) comprising one or more IoT devices 1511 (also referred to as edge endpoints 1510 or the like); increasing in sophistication to gateways or intermediate node layer 1520 comprising one or more user equipment (UEs) 1521a and 1521b (also referred to as intermediate nodes 1520 or the like), which facilitate the collection and processing of data from endpoints 1510; increasing in processing and connectivity sophistication to access node layer 1530 (or "edge node layer 1530") comprising a plurality of network access nodes (NANs) 1531, 1532, and 1533 (collectively referred to as "NANs 1531-1533" or the like) and a plurality of edge compute nodes 1536a-c (collectively referred to as "edge compute nodes 1536" or the like) within an edge computing system 1535; and increasing in connectivity and processing sophistication to a backend layer 1510 comprising core network (CN) 1542 and cloud 1544. The processing at the backend layer 1510 may be enhanced by network services as performed by one or more remote application (app) servers 1550 and/or other cloud services. Some or all of these elements may be equipped with or otherwise implement some or all features and/or functionality discussed herein.

The environment 1500 is shown to include end-user devices, such as intermediate nodes 1520 and endpoints 1510, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1531, 1532, and/or 1533. The NANs 1531-1533 are arranged to provide network connectivity to the end-user devices via respective links 1503, 1507 between the individual NANs and the one or more UEs 1511, 1521.

As examples, the communication networks and/or access technologies may include cellular technology such as LTE, MuLTEfire, and/or NR/5G (e.g., as provided by Radio Access Network (RAN) node 1531 and/or RAN nodes 1532), WiFi or wireless local area network (WLAN) technologies (e.g., as provided by access point (AP) 1533 and/or RAN nodes 1532), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1520 include UE 1521a and UE 1521b (collectively referred to as "UE 1521" or "UEs 1521"). In this example, the UE 1521a is illustrated as a vehicle UE, and UE 1521b is illustrated as a smartphone (e.g., handheld touchscreen mobile computing device connectable to one or more cellular networks). However, these UEs 1521 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1510 include UEs 1511, which may be IoT devices (also referred to as "IoT devices 1511"), which are uniquely identifiable embedded computing devices (e.g., within the Internet infrastructure) that comprise a network access layer designed for low-power IoT applications utilizing short-lived UE connections. The IoT devices 1511 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1511 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1511 can utilize technologies such as M2M or MTC for exchanging data with an MTC server (e.g., a server 1550), an edge server 1536 and/or edge computing system 1535, or device via a PLMN, ProSe or D2D communication, sensor networks, or IoT networks. The M2M or MTC exchange of data may be a machine-initiated exchange of data.

The IoT devices 1511 may execute background applications (e.g., keep-alive messages, status updates, etc.) to facilitate the connections of the IoT network. Where the IoT devices 1511 are, or are embedded in, sensor devices, the IoT network may be a WSN. An IoT network describes an interconnecting IoT UEs, such as the IoT devices 1511 being connected to one another over respective direct links 1505. The IoT devices may include any number of different types of devices, grouped in various combinations (referred to as an "IoT group") that may include IoT devices that provide one or more services for a particular user, customer, organizations, etc. A service provider (e.g., an owner/operator of server 1550, CN 1542, and/or cloud 1544) may deploy the IoT devices in the IoT group to a particular area (e.g., a geolocation, building, etc.) in order to provide the one or more services. In some implementations, the IoT network may be a mesh network of IoT devices 1511, which may be termed a fog device, fog system, or fog, operating at the edge of the cloud 1544. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1544 to Things (e.g., IoT devices 1511). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1530) and/or a central cloud computing service (e.g., cloud 1544) for performing heavy computations or computationally burdensome tasks. On the other hand, edge cloud computing consolidates human-operated, voluntary resources, as a cloud. These voluntary resource may include, inter-alia, intermediate nodes 1520 and/or endpoints 1510, desktop PCs, tablets, smartphones, nano data centers, and the like. In various implementations, resources in the edge cloud may be in one to two-hop proximity to the IoT devices 1511, which may result in reducing overhead related to processing data and may reduce network delay.

Additionally or alternatively, the fog may be a consolidation of IoT devices 1511 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1544. The fog operating at the edge of the cloud 1544 may overlap or be subsumed into an edge network 1530 of the cloud 1544. The edge network of the cloud 1544 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1536 or edge devices). The Fog layer resides on top of the edge layer and is a consolidation of networking devices such as the intermediate nodes 1520 and/or endpoints 1510 of FIG. 15.

Data may be captured, stored/recorded, and communicated among the IoT devices 1511 or, for example, among the intermediate nodes 1520 and/or endpoints 1510 that have direct links 1505 with one another as shown by FIG. 15. Analysis of the traffic flow and control schemes may be implemented by aggregators that are in communication with the IoT devices 1511 and each other through a mesh network. The aggregators may be a type of IoT device 1511 and/or network appliance. In the example of FIG. 15, the aggregators may be edge nodes 1530, or one or more designated intermediate nodes 1520 and/or endpoints 1510. Data may be uploaded to the cloud 1544 via the aggregator, and commands can be received from the cloud 1544 through gateway devices that are in communication with the IoT devices 1511 and the aggregators through the mesh network. Unlike the traditional cloud computing model, in some implementations, the cloud 1544 may have little or no computational capabilities and only serves as a repository for archiving data recorded and processed by the fog. In these implementations, the cloud 1544 centralized data storage system and provides reliability and access to data by the computing resources in the fog and/or edge devices. Being at the core of the architecture, the Data Store of the cloud 1544 is accessible by both Edge and Fog layers of the aforementioned edge-fog network.

As mentioned previously, the access networks provide network connectivity to the end-user devices 1520, 1510 via respective NANs 1531-1533. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 1531, 1532. This virtualized framework allows the freed-up processor cores of the NANs 1531, 1532 to perform other virtualized applications, such as virtualized applications for various elements discussed herein.

The UEs 1521, 1511 may utilize respective connections (or channels) 1503, each of which comprises a physical communications interface or layer. The connections 1503 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 1511, 1521 and the NANs 1531-1533 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1511, 1521 and NANs 1531-1533 may operate using LAA, enhanced LAA (eLAA), and/or further eLAA (feLAA) mechanisms. The UEs 1521, 1511 may further directly exchange communication data via respective direct links 1505, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 1521, 1511 provide radio information to one or more NANs 1531-1533 and/or one or more edge compute nodes 1536 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 1521, 1511 current location). As examples, the measurements collected by the UEs 1521, 1511 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio ($E_b/N_0$), energy per bit to interference power density ratio ($E_c/I_0$), peak-to-average power ratio (PAPR), reference signal received power (RSRP), reference signal received quality (RSRQ), received signal strength indicator (RSSI), received channel power indicator (RCPI), received signal to noise indicator (RSNI), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., The GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021 Mar. 31) ("[TS36214]"), 3GPP TS 38.215 v16.4.0 (2020 December) ("[TS38215]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[IEEE80211]"), and/or the like. Additionally or alternatively, any of the aforementioned measurements (or combination of measurements) may be collected by one or more NANs 1531-1533 and provided to the edge compute node(s) 1536.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 1511, 1521, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.3.1 (2021 Jun. 24) ("U5285521"), 3GPP TS 32.425 v17.1.0 (2021 Jun. 24) ("[TS32425]"), and/or the like.

The radio information may be reported in response to a trigger event and/or on a periodic basis. Additionally or alternatively, individual UEs 1521, 1511 report radio information either at a low periodicity or a high periodicity depending on a data transfer that is to take place, and/or other information about the data transfer. Additionally or alternatively, the edge compute node(s) 1536 may request the measurements from the NANs 1531-1533 at low or high periodicity, or the NANs 1531-1533 may provide the measurements to the edge compute node(s) 1536 at low or high periodicity. Additionally or alternatively, the edge compute node(s) 1536 may obtain other relevant data from other edge compute node(s) 1536, core network functions (NFs), application functions (AFs), and/or other UEs 1511, 1521 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP, ETSI, O-RAN, OpenNESS, and/or any other like standards such as those discussed herein.

The UE 1521b is shown to be configured to access an access point (AP) 1533 via a connection 1507. In this example, the AP 1533 is shown to be connected to the Internet without connecting to the CN 1542 of the wireless system. The connection 1507 can comprise a local wireless connection, such as a connection consistent with any IEEE 802.11 protocol, wherein the AP 1533 would comprise a wireless fidelity (WiFi®) router. Additionally or alternatively, the UEs 1521 and IoT devices 1511 can be configured to communicate using suitable communication signals with each other or with any of the AP 1533 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1531 and 1532 that enable the connections 1503 may be referred to as "RAN nodes" or the like. The RAN nodes 1531, 1532 may comprise ground stations (e.g., terrestrial access points) or satellite stations providing coverage within a geographic area (e.g., a cell). The RAN nodes 1531, 1532 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1531 is embodied as a NodeB, evolved NodeB (eNB), or a next generation NodeB (gNB), and the RAN nodes 1532 are embodied as relay nodes, distributed units, or Road Side Unites (RSUs). Any other type of NANs can be used.

Any of the RAN nodes 1531, 1532 can terminate the air interface protocol and can be the first point of contact for the UEs 1521 and IoT devices XE111. Additionally or alternatively, any of the RAN nodes 1531, 1532 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, etc. Additionally or alternatively, the UEs 1511, 1521 can be configured to communicate using OFDM communication signals with each other or with any of the NANs 1531, 1532 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by the RAN or individual NANs 1531-1532 organize DL transmissions (e.g., from any of the RAN nodes 1531, 1532 to the UEs 1511, 1521) and UL transmissions (e.g., from the UEs 1511, 1521 to RAN nodes 1531, 1532) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1511, 1521 at each transmission time interval (TTI). A TTI is the duration of a transmission on a radio link 1503, 1505, and is related to the size of the data blocks passed to the radio link layer from higher network layers.

The NANs 1531/1532 may be configured to communicate with one another via respective interfaces or links (not shown), such as an X2 interface for LTE implementations (e.g., when CN 1542 is an Evolved Packet Core (EPC)), an Xn interface for 5G or NR implementations (e.g., when CN 1542 is an Fifth Generation Core (5GC)), or the like. The NANs 1531 and 1532 are also communicatively coupled to CN 1542. Additionally or alternatively, the CN 1542 may be an evolved packet core (EPC) network, a NextGen Packet Core (NPC) network, a 5G core (5GC), or some other type of CN. The CN 1542 may comprise a plurality of network elements, which are configured to offer various data and telecommunications services to customers/subscribers (e.g., users of UEs 1521 and IoT devices 1511) who are connected to the CN 1542 via a RAN. The components of the CN 1542 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 1542 may be referred to as a network slice, and a logical instantiation of a portion of the CN 1542 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1542 components/functions.

The CN 1542 is shown to be communicatively coupled to an application server 1550 and a network 1550 via an IP communications interface 1555. the one or more server(s) 1550 comprise one or more physical and/or virtualized systems for providing functionality (or services) to one or more clients (e.g., UEs 1521 and IoT devices 1511) over a network. The server(s) 1550 may include various computer devices with rack computing architecture component(s), tower computing architecture component(s), blade computing architecture component(s), and/or the like. The server(s) 1550 may represent a cluster of servers, a server farm, a cloud computing service, or other grouping or pool of servers, which may be located in one or more datacenters. The server(s) 1550 may also be connected to, or otherwise associated with one or more data storage devices (not shown). Moreover, the server(s) 1550 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1550 offer applications or services that use IP/network resources. As examples, the server(s) 1550 may provide traffic management services, cloud analytics, content streaming services, immersive gaming experiences, social networking and/or microblogging services, and/or other like services. In addition, the various services provided by the server(s) 1550 may include initiating and controlling software and/or firmware updates for applications or individual components implemented by the UEs 1521 and IoT devices 1511. The server(s) 1550 can also be configured to support one or more communication services (e.g., Voice-over-Internet Protocol (VoIP) sessions, PTT sessions, group communication sessions, social networking services, etc.) for the UEs 1521 and IoT devices 1511 via the CN 1542.

The Radio Access Technologies (RATs) employed by the NANs 1531-1533, the UEs 1521, 1511, and the other elements in FIG. 15 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 1531-1533), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Int'l, "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018 Mar. 2) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer comprises [IEEE80211] (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020 January), 3GPP TS 23.285 v16.2.0 (2019 December); and 3GPP 5G/NR-V2X is outlined in, inter alia, 3GPP TR 23.786 v16.1.0 (2019 June) and 3GPP TS 23.287 v16.2.0 (2020 March).

The cloud 1544 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1544 include application capabilities type, infrastructure capabilities type, and platform capabilities type. A cloud capabilities type is a classification of the functionality provided by a cloud service to a cloud service customer (e.g., a user of cloud 1544), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1544 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1544 may represent one or more cloud servers, application servers, web servers, and/or some other remote infrastructure. The remote/cloud servers may include any one of a number of services and capabilities such as, for example, any of those discussed herein.

Additionally or alternatively, the cloud 1544 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 1544 may be a network that comprises computers, network connections among the computers, and software routines to enable communication between the computers over network connections. In this regard, the cloud 1544 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1544 may be via a wired or a wireless connection using the various communication protocols discussed infra. More than one network may be involved in a communication session between the illustrated devices. Connection to the cloud 1544 may require that the computers execute software routines which enable, for example, the seven layers of the OSI model of computer networking or equivalent in a wireless (cellular) phone network. Cloud 1544 may be used to enable relatively long-range communication such as, for example, between the one or more server(s) 1550 and one or more UEs 1521 and IoT devices 1511. Additionally or alternatively, the cloud 1544 may represent the Internet, one or more cellular networks, local area networks, or wide area networks including proprietary and/or enterprise networks, TCP/Internet Protocol (IP)-based network, or combinations thereof. In these implementations, the cloud 1544 may be associated with network operator who owns or controls equipment and other elements necessary to provide network-related services, such as one or more base stations or access points, one or more servers for routing digital data or telephone calls (e.g., a core network or backbone network), etc. The backbone links 1555 may include any number of wired or wireless technologies, and may be part of a LAN, a WAN, or the Internet. In one example, the backbone links 1555 are fiber backbone links that couple lower levels of service providers to the Internet, such as the CN 1512 and cloud 1544.

The edge compute nodes 1536 may include or be part of an edge system 1535 (or edge network 1535). The edge compute nodes 1536 may also be referred to as "edge hosts 1536" or "edge servers 1536." The edge system 1535 includes a collection of edge servers 1536 and edge management systems (not shown by FIG. 15) necessary to run edge computing applications within an operator network or a subset of an operator network. The edge servers 1536 are physical computer systems that may include an edge platform and/or virtualization infrastructure, and provide compute, storage, and network resources to edge computing applications. Each of the edge servers 1536 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1520 and/or endpoints 1510. The VI of the edge servers 1536 provide virtualized environments and virtualized resources for the edge hosts, and the edge computing applications may run as VMs and/or application containers on top of the VI.

In one example implementation, the edge system 1535 may operate according to the MEC framework, as discussed in ETSI GS MEC 003 v2.1.1 (2019 January), ETSI GS MEC 009 V2.1.1 (2019 January), ETSI GS MEC 010-1 v1.1.1 (2017 October), ETSI GS MEC 010-2 v2.1.1 (2019 November), ETSI GS MEC 011 V1.1.1 (2017 July); ETSI GS MEC 012 V2.1.1 (2019 December), ETSI GS MEC 013 v2.1.1 (2019 September); ETSI GS MEC 014 V1.1.1 (2018 February); ETSI GS MEC 015 v2.1.1 (2020 June), ETSI GS MEC 016 V2.2.1 (2020 April), ETSI GS MEC 021 V2.1.1 (2020 January), ETSI GS MEC 028 v2.1.1 (2020 June), ETSI GS MEC 029 v2.1.1 (2019 July), ETSI MEC GS 030 v2.1.1 (2020 April), ETSI GS NFV-MAN 001 v1.1.1 (2014 December), U.S. Provisional App. No. 63/003,834 filed Apr. 1, 2020 ("[AC6833Z]"), and Int'l App. No. PCT/US2020/066969 filed on Dec. 23, 2020 ("[AC6833PCT]") (collectively referred to herein as "[MEC]"), the contents of each of which are hereby incorporated by reference in their entireties.

In another example implementation, the edge system 1535 operates according to the O-RAN framework as described in O-RAN Alliance Working Group (WG) 1, "O-RAN Architecture Description" v04.00 (March 2021), O-RAN Alliance WG1, "O-RAN Operations and Maintenance Interface Specification" v04.00 (November 2020), O-RAN Alliance WG1, "O-RAN Operations and Maintenance Architecture Specification" v04.00 (November 2020), O-RAN Alliance WG1, "Near-Real-time RAN Intelligent Controller, E2 Application Protocol (E2AP)" v01.01 (July 2020), O-RAN Alliance WG2, "O-RAN AI interface: General Aspects and Principles 2.02" v02.02 (March 2021), O-RAN Alliance WG3, "O-RAN Near-Real-time RAN Intelligent Controller Architecture & E2 General Aspects and Principles" v01.01 (July 2020), O-RAN Near-Real-time RAN Intelligent Controller E2 Service Model 1.0 (February 2020), O-RAN WG3, Near-Real-time RAN Intelligent Controller E2 Service Model (E2SM) KPM v01.00 (February 2020), O-RAN WG3, "O-RAN Near-Real-time RAN Intelligent Controller E2 Service Model (E2SM), RAN Function Network Interface (NI)" v1.0 (February 2020), E2SM RAN Control (E2SM-RC), O-RAN Alliance WG4, O-RAN Fronthaul Management Plane Specification, version 2.0 (July 2019), O-RAN Alliance WG4, "O-RAN Fronthaul Control, User and Synchronization Plane Specification 6.0" v06.00 (March 2021), and O-RAN Alliance WG6, "Cloud Architecture and Deployment Scenarios for O-RAN Virtualized RAN" v02.01 (July 2020) (collectively referred to as "[O-RAN]") the contents of each of which are hereby incorporated by reference in their entireties.

In another example implementation, the edge system 1535 operates according to the $3^{rd}$ Generation Partnership Project (3GPP) System Aspects Working Group 6 (SA6) Architecture for enabling Edge Applications (referred to as "3GPP edge computing") as discussed in 3GPP TS 23.558 v17.1.0 (2021 Sep. 24) ("[TS23558]"), 3GPP TS 23.501 v17.2.0 (2021 Sep. 24) ("[TS23501]"), and U.S. application Ser. No. 17/484,719 filed on 24 Sep. 2021 ("[AD4420-US]"), the contents of each of which is hereby incorporated by reference in their entireties.

In another example implementation, the edge system 1535 operates according to the Intel® Smart Edge Open framework (formerly known as OpenNESS) as discussed in Intel® Smart Edge Open Developer Guide, version 21.09 (30 Sep. 2021), available at: <https://smart-edge-open.githubio>("[ISE0]"), the contents of which are hereby incorporated by reference in its entirety.

It should be understood that the aforementioned edge computing frameworks and services deployment examples are only one illustrative example of edge computing systems/networks 1535, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 15, each of the NANs 1531, 1532, and 1533 are co-located with edge compute nodes (or "edge servers") 1536a, 1536b, and 1536c, respectively. These implementations may be small-cell clouds (SCCs) where an edge compute node 1536 is co-located with a small cell (e.g., pico-cell, femto-cell, etc.), or may be mobile micro clouds (MCCs) where an edge compute node 1536 is co-located with a macro-cell (e.g., an eNB, gNB, etc.). The edge compute node 1536 may be deployed in a multitude of arrangements other than as shown by FIG. 15. In a first example, multiple NANs 1531-1533 are co-located or otherwise communicatively coupled with one edge compute node 1536. In a second example, the edge servers 1536 may be co-located or operated by RNCs, which may be the case for legacy network deployments, such as 3G networks. In a third example, the edge servers 1536 may be deployed at cell aggregation sites or at multi-RAT aggregation points that can be located either within an enterprise or used in public coverage areas. In a fourth example, the edge servers 1536 may be deployed at the edge of CN 1542. These implementations may be used in follow-me clouds (FMC), where cloud services running at distributed data centers follow the UEs 1521 as they roam throughout the network.

In any of the implementations discussed herein, the edge servers 1536 provide a distributed computing environment for application and service hosting, and also provide storage and processing resources so that data and/or content can be processed in close proximity to subscribers (e.g., users of UEs 1521, 1511) for faster response times The edge servers 1536 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1536 from the UEs 1511/1521, CN 1542, cloud 1544, and/or server(s) 1550, or vice versa. For example, a device application or client application operating in a UE 1521/1511 may offload application tasks or workloads to one or more edge servers 1536. In another example, an edge server 1536 may offload application tasks or workloads to one or more UE 1521/1511 (e.g., for distributed ML computation or the like).

5. Hardware Components, Configurations, and Arrangements

The network components of the various devices and/or systems discussed herein may be servers, appliances, network infrastructure, machines, robots, drones, and/or any other type of computing devices. For example, the edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 17. The edge cloud may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 17:
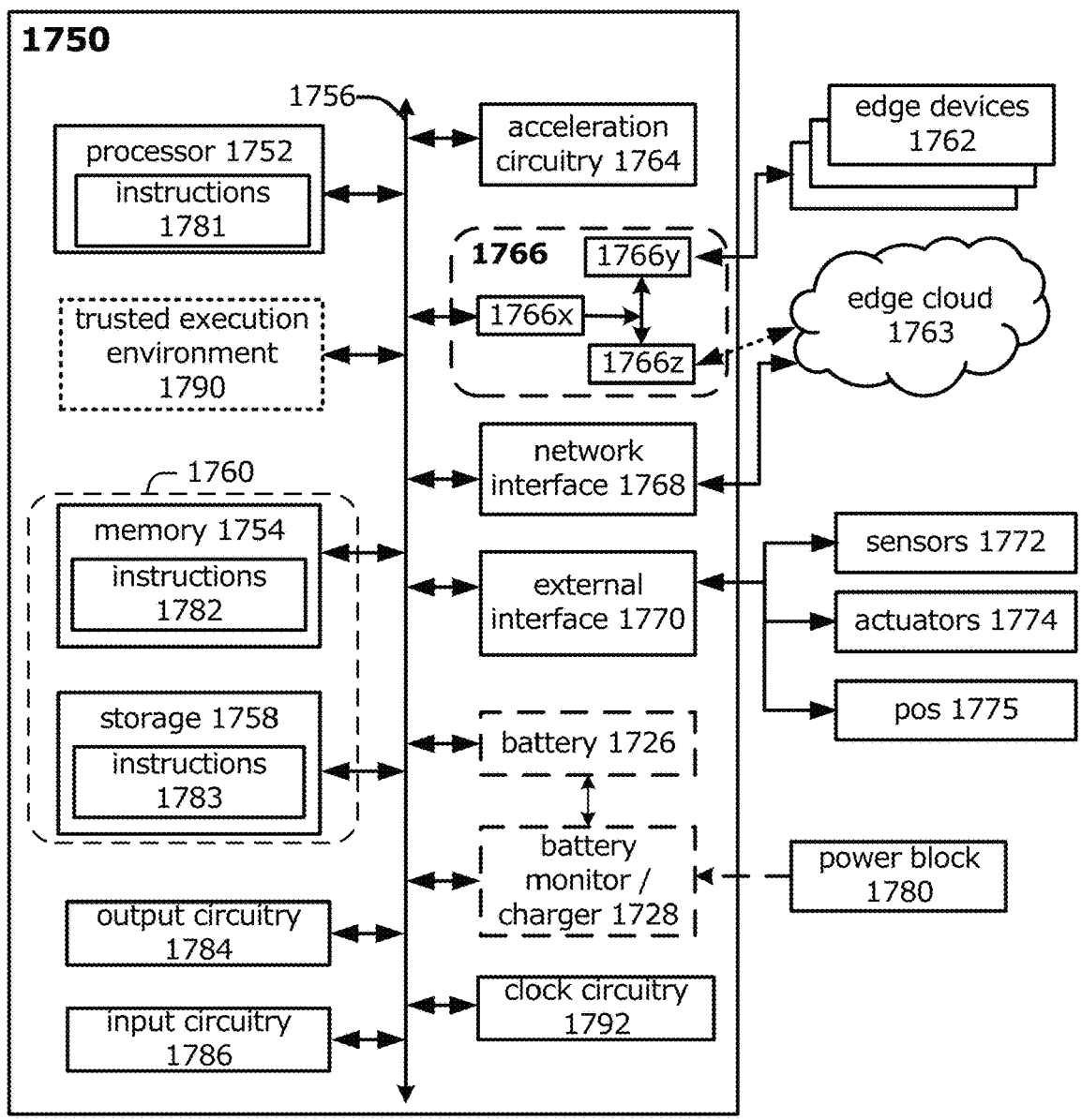
FIG. 17 depicts example components a compute node.

FIG. 17 illustrates an example of components that may be present in a computing node 1750 for implementing the techniques (e.g., operations, processes, methods, and methodologies) described herein. The compute node 1750 provides a closer view of the respective components of node 1700 when implemented as or as part of a computing device (e.g., as a mobile device, a base station, server, gateway, etc.). The compute node 1750 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 1750, or as components otherwise incorporated within a chassis of a larger system.

In some embodiments, compute node 1750 may correspond to the UEs 101, NANs 131-133, edge compute node 136 of FIG. 1; UEs 201, NANs 233, edge compute node 236; UEs 1511, 1521*a*, NANs 1531-1533, edge compute node(s) 1536, CN 1542 (or compute node(s) therein), and/or cloud 1544 (or compute node(s) therein) of FIG. 15; software distribution platform 1605 and/or processor platform(s) 1600 of FIG. 16; CUs, DUs, and/or remote units (RUs) of a 3GPP-based CU/DU split RAN architecture; MEC hosts/servers and/or MEC platforms in ETSI MEC implementations; 3GPP edge computing; EAS, EES, and/or ECS of a 3GPP edge computing architecture; Non-RT RIC, Near-RT RIC, and/or E2 nodes in O-RAN implementations; and/or any other component, device, and/or system discussed herein. The compute node 1750 may be embodied as a type of device, appliance, computer, or other "thing" capable of communicating with other edge, networking, or endpoint components. For example, compute node 1750 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1750 includes processing circuitry in the form of one or more processors 1752. The processor circuitry 1752 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1752 may include one or more hardware accelerators (e.g., same or similar to acceleration circuitry 1764), which may be microprocessors, programmable processing devices (e.g., FPGA, ASIC, etc.), or the like. The one or more accelerators may include, for example, computer vision and/or deep learning accelerators. In some implementations, the processor circuitry 1752 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1752 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 1752 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 1752 may work in coordination with each other to execute many types of operations and instructions within and on behalf of the compute node 1750.

The processors (or cores) 1752 may be coupled with or may include memory/storage and may be configured to execute instructions stored in the memory/storage to enable various applications or operating systems to run on the platform 1750. The processors (or cores) 1752 is configured to operate application software to provide a specific service to a user of the platform 1750. Additionally or alternatively, the processor(s) 1752 may be a special-purpose processor(s)/controller(s) configured (or configurable) to operate according to the elements, features, and implementations discussed herein.

As examples, the processor(s) 1752 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S 1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1752 may be a part of a system on a chip (SoC), System-in-Package (SiP), a multi-chip package (MCP), and/or the like, in which the processor(s) 1752 and other components are formed into a single integrated circuit, or a single package, such as the Edison™ or Galileo™ SoC boards from Intel® Corporation. Other examples of the processor(s) 1752 are mentioned elsewhere in the present disclosure.

The processor(s) 1752 may communicate with system memory 1754 over an interconnect (IX) 1756. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1758 may also couple to the processor 1752 via the IX 1756. In an example, the storage 1758 may be implemented via a solid-state disk drive (SSDD) and/or high-speed electrically erasable memory (commonly referred to as "flash memory"). Other devices that may be used for the storage 1758 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1754 and/or storage circuitry 1758 may also incorporate three-dimensional (3D) cross-point (XPOINT) memories from Intel® and Micron®.

In low power implementations, the storage 1758 may be on-die memory or registers associated with the processor 1752. However, in some examples, the storage 1758 may be implemented using a micro hard disk drive (HDD). Further, any number of new technologies may be used for the storage 1758 in addition to, or instead of, the technologies described, such resistance change memories, phase change memories, holographic memories, or chemical memories, among others.

The components of edge computing device 1750 may communicate over an interconnect (IX) 1756. The IX 1756 may represent any suitable type of connection or interface such as, for example, metal or metal alloys (e.g., copper, aluminum, etc.), fiber, and/or the like. The IX 1756 may include any number of IX, fabric, and/or interface technologies, including instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1756 may be a proprietary bus, for example, used in a SoC based system.

The IX 1756 couples the processor 1752 to communication circuitry 1766 for communications with other devices, such as a remote server (not shown) and/or the connected edge devices 1762. The communication circuitry 1766 is a hardware element, or collection of hardware elements, used to communicate over one or more networks (e.g., cloud 1763) and/or with other devices (e.g., edge devices 1762).

The transceiver 1766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1766 (or multiple transceivers) may communicate using multiple standards or radios for communications at a different range. For example, the compute node 1750 may communicate with close devices, e.g., within about 10 meters, using a local transceiver based on BLE, or another low power radio, to save power. More distant connected edge devices 1762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1766 (e.g., a radio transceiver) may be included to communicate with devices or services in the edge cloud 1763 via local or wide area network protocols. The wireless network transceiver 1766 may be an LPWA transceiver that follows the IEEE 802.15.4, or IEEE 802.15.4g standards, among others. The compute node 1763 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1766, as described herein. For example, the transceiver 1766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1766 may include radios that are compatible with any number of 3GPP specifications, such as LTE and 5G/NR communication systems, discussed in further detail at the end of the present disclosure. A network interface controller (NIC) 1768 may be included to provide a wired communication to nodes of the edge cloud 1763 or to other devices, such as the connected edge devices 1762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1768 may be included to enable connecting to a second network, for example, a first NIC 1768 providing communications to the cloud over Ethernet, and a second NIC 1768 providing communications to other devices over another type of network.

Given the variety of types of applicable communications from the device to another component or network, applicable communications circuitry used by the device may include or be embodied by any one or more of components 1764, 1766, 1768, or 1770. Accordingly, in various examples, applicable means for communicating (e.g., receiving, transmitting, etc.) may be embodied by such communications circuitry.

The compute node 1750 may include or be coupled to acceleration circuitry 1764, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1764 may comprise logic blocks or logic fabric and other interconnected resources that may be programmed (configured) to perform various functions, such as the procedures, methods, functions, etc. discussed herein. In such implementations, the acceleration circuitry 1764 may also include memory cells (e.g., EPROM, EEPROM, flash memory, static memory (e.g., SRAM, anti-fuses, etc.) used to store logic blocks, logic fabric, data, etc. in LUTs and the like.

The IX 1756 also couples the processor 1752 to a sensor hub or external interface 1770 that is used to connect additional devices or subsystems. The additional/external devices may include sensors 1772, actuators 1774, and positioning circuitry 1775.

The sensor circuitry 1772 includes devices, modules, or subsystems whose purpose is to detect events or changes in its environment and send the information (sensor data) about the detected events to some other a device, module, subsystem, etc. Examples of such sensors 1772 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1750); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1774, allow platform 1750 to change its state, position, and/or orientation, or move or control a mechanism or system. The actuators 1774 comprise electrical and/or mechanical devices for moving or controlling a mechanism or system, and converts energy (e.g., electric current or moving air and/or liquid) into some kind of motion. The actuators 1774 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1774 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1750 may be configured to operate one or more actuators 1774 based on one or more captured events and/or instructions or control signals received from a service provider and/or various client systems.

The positioning circuitry 1775 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1775 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1775 may include a Micro-Technology for Positioning, Navigation, and Timing (Micro-PNT) IC that uses a primary timing clock to perform position tracking/estimation without GNSS assistance. The positioning circuitry 1775 may also be part of, or interact with, the communication circuitry 1766 to communicate with the nodes and components of the positioning network. The positioning circuitry 1775 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1775 is, or includes an INS, which is a system or device that uses sensor circuitry 1772 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1750 without the need for external references.

In some optional examples, various input/output (I/O) devices may be present within or connected to, the compute node 1750, which are referred to as input circuitry 1786 and output circuitry 1784 in FIG. 17. The input circuitry 1786 and output circuitry 1784 include one or more user interfaces designed to enable user interaction with the platform 1750 and/or peripheral component interfaces designed to enable peripheral component interaction with the platform 1750. Input circuitry 1786 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1784 may be included to show information or otherwise convey information, such as sensor readings, actuator position(s), or other like information. Data and/or graphics may be displayed on one or more user interface components of the output circuitry 1784. Output circuitry 1784 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1750. The output circuitry 1784 may also include speakers or other audio emitting devices, printer(s), and/or the like. Additionally or alternatively, the sensor circuitry 1772 may be used as the input circuitry 1784 (e.g., an image capture device, motion capture device, or the like) and one or more actuators 1774 may be used as the output device circuitry 1784 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1776 may power the compute node 1750, although, in examples in which the compute node 1750 is mounted in a fixed location, it may have a power supply coupled to an electrical grid, or the battery may be used as a backup or for temporary capabilities. The battery 1776 may be a lithium ion battery, or a metal-air battery, such as a zinc-air battery, an aluminum-air battery, a lithium-air battery, and the like.

A battery monitor/charger 1778 may be included in the compute node 1750 to track the state of charge (SoCh) of the battery 1776, if included. The battery monitor/charger 1778 may be used to monitor other parameters of the battery 1776 to provide failure predictions, such as the state of health (SoH) and the state of function (SoF) of the battery 1776. The battery monitor/charger 1778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1778 may communicate the information on the battery 1776 to the processor 1752 over the IX 1756. The battery monitor/charger 1778 may also include an analog-to-digital (ADC) converter that enables the processor 1752 to directly monitor the voltage of the battery 1776 or the current flow from the battery 1776. The battery parameters may be used to determine actions that the compute node 1750 may perform, such as transmission frequency, mesh network operation, sensing frequency, and the like.

A power block 1780, or other power supply coupled to a grid, may be coupled with the battery monitor/charger 1778 to charge the battery 1776. In some examples, the power block 1780 may be replaced with a wireless power receiver to obtain the power wirelessly, for example, through a loop antenna in the compute node 1750. A wireless battery charging circuit, such as an LTC4020 chip from Linear Technologies of Milpitas, California, among others, may be included in the battery monitor/charger 1778. The specific charging circuits may be selected based on the size of the battery 1776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1758 may include instructions 1783 in the form of software, firmware, or hardware commands to implement the techniques described herein. Although such instructions 1782, 1783 are shown as code blocks included in the memory 1754 and the storage 1758, any of the code blocks 1782, 1783 may be replaced with hardwired circuits, for example, built into an application specific integrated circuit (ASIC) or programmed into an FPGA, or the like.

In an example, the instructions 1781, 1782, 1783 provided via the memory 1754, the storage 1758, or the processor 1752 may be embodied as a non-transitory machine-readable medium (NTMRM) 1760 including code to direct the processor 1752 to perform electronic operations in the compute node 1750. The processor 1752 may access the NTMRM 1760 over the IX 1756. For instance, the NTMRM 1760 may be embodied by devices described for the storage 1758 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 1760 may include instructions to direct the processor 1752 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 1781, 1782, 1783) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1781, 1782, 1783 for carrying out operations of the present disclosure may also be written in any combination of the programming languages discussed herein. The program code may execute entirely on the system 1750, partly on the system 1750, as a stand-alone software package, partly on the system 1750 and partly on a remote computer or entirely on the remote computer or server. In the latter scenario, the remote computer may be connected to the system 1750 through any type of network, including a LAN or WAN, or the connection may be made to an external computer (e.g., through the Internet using an Internet Service Provider).

In an example, the instructions 1781, 1782, 1783 on the processor circuitry 1752 (separately, or in combination with the instructions 1781, 1782, 1783) may configure execution or operation of a trusted execution environment (TEE) 1790. The TEE 1790 operates as a protected area accessible to the processor circuitry 1702 to enable secure access to data and secure execution of instructions. In some embodiments, the TEE 1790 may be a physical hardware device that is separate from other components of the system 1750 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1790 may be implemented as secure enclaves, which are isolated regions of code and/or data within the processor and/or memory/storage circuitry of the system 1750. Only code executed within a secure enclave may access data within the same secure enclave, and the secure enclave may only be accessible using the secure application (which may be implemented by an application processor or a tamper-resistant microcontroller). Various implementations of the TEE 1790, and an accompanying secure area in the processor circuitry 1752 or the memory circuitry 1754 and/or storage circuitry 1758 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1700 through the TEE 1790 and the processor circuitry 1752. Additionally or alternatively, the memory circuitry 1754 and/or storage circuitry 1758 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1704 and/or storage circuitry 1708 may be divided into one or more trusted memory regions for storing applications or software modules of the TEE 1790.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 17 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

FIG. 17 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

Figure 16:
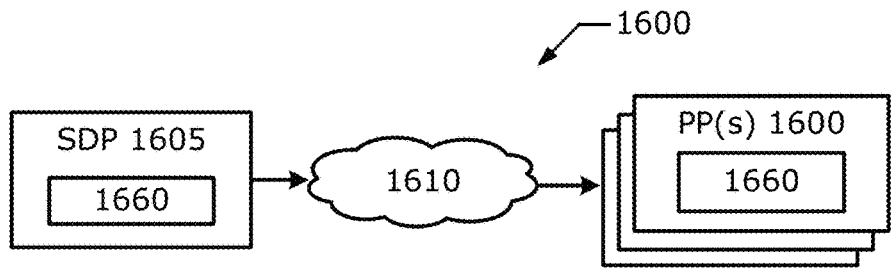
FIG. 16 illustrates an example software distribution platform.

FIG. 16 illustrates an example software (SW) distribution platform (SDP) 1605 to distribute software 1660, such as the example computer readable instructions 1781, 1782, 1783 of FIG. 17, to one or more devices, such as example processor platform(s) (pp) 1600, connected edge devices 1762 (see e.g., FIG. 17), and/or any of the other computing systems/devices discussed herein. The SDP 1605 (or components thereof) may be implemented by any computer server, data facility, cloud service, CDN, edge computing framework, etc., capable of storing and transmitting software (e.g., code, scripts, executable binaries, containers, packages, compressed files, and/or derivatives thereof) to other computing devices (e.g., third parties, the example connected edge devices 1762 of FIG. 17). The SDP 1605 (or components thereof) may be located in a cloud (e.g., data center, etc.), a local area network, an edge network, a wide area network, on the Internet, and/or any other location communicatively coupled with the pp 1600.

The pp 1600 and/or connected edge devices 1762 connected edge devices 1762 may include customers, clients, managing devices (e.g., servers), third parties (e.g., customers of an entity owning and/or operating the SDP 1605), IoT devices, and the like. The pp 1600/connected edge devices 1762 may operate in commercial and/or home automation environments. In some examples, a third party is a developer, a seller, and/or a licensor of software such as the example computer readable media 1781, 1782, 1783 of FIG. 17. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.). In some examples, the pp 1600/connected edge devices 1762 can be physically located in different geographic locations, legal jurisdictions, etc.

In FIG. 16, the SDP 1605 includes one or more servers (referred to as "servers 1605") and one or more storage devices (referred to as "storage 1605"). The storage 1605 store the computer readable instructions 1660, which may correspond to the instructions 1781, 1782, 1783 of FIG. 17. The servers 1605 are in communication with a network 1610, which may correspond to any one or more of the Internet and/or any of the example networks as described herein. The servers 1605 are responsive to requests to transmit the software to a requesting party as part of a commercial transaction. Payment for the delivery, sale and/or license of the software may be handled by the servers 1605 and/or via a third-party payment entity. The servers 1605 enable purchasers and/or licensors to download the computer readable instructions 1660 from the SDP 1605.

The servers 1605 are communicatively connected to one or more security domains and/or security devices through which requests and transmissions of the example computer readable instructions 1660 must pass. Additionally or alternatively, the servers 1605 periodically offer, transmit, and/or force updates to the software 1660 to ensure improvements, patches, updates, etc. are distributed and applied to the software at the end user devices. The computer readable instructions 1660 are stored on storage 1605 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 1660 stored in the SDP 1605 are in a first format when transmitted to the pp 1600. Additionally or alternatively, the first format is an executable binary in which particular types of the pp 1600 can execute. Additionally or alternatively, the first format is uncompiled code that requires one or more preparation tasks to transform the first format to a second format to enable execution on the pp 1600. For example, the receiving pp 1600 may need to compile the computer readable instructions 1660 in the first format to generate executable code in a second format that is capable of being executed on the pp 1600. Additionally or alternatively, the first format is interpreted code that, upon reaching the pp 1600, is interpreted by an interpreter to facilitate execution of instructions. Additionally or alternatively, different components of the computer readable instructions 1782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

6. Example Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example A01 includes a method for providing reliability enhancements in a multi-access communication network, the method comprising: collecting metrics related to the multi-access communication network from one or more data sources within the multi-access communication network; determining, based on the collected metrics, a reliability target, a network coding (NC) group size, and per path characteristics for each network path of a set of network paths in the multi-access environment; determining a traffic distribution strategy based on the per path characteristics, the NC group size, and the reliability target; generating an NC group from a set of incoming packets, wherein the NC group comprises a set of network coded packets to achieve the reliability target; and routing individual subsets from the NC group to respective network paths of the set of network paths according to the traffic distribution strategy.

Example A02 includes the method of example A01, wherein the traffic distribution strategy specifies a number of network coded packets in the individual subsets to be routed over the respective network paths.

Example A03 includes the method of examples A01-A02, wherein generating the NC group comprises: applying NC to packets in the set of incoming packets to produce the set of network coded packets in the NC group.

Example A04 includes the method of example A03, wherein a number of packets in the set of incoming packets is same as the NC group size.

Example A05 includes the method of examples A01-A04, further comprising: determining a code rate for encoding the set of incoming packets.

Example A06 includes the method of example A05, wherein the determining the code rate comprises:
  determining the code rate to be a ratio of the NC group size to a total number of network coded packets in the NC group.

Example A07 includes the method of examples A01-A06, wherein the NC group size is a first NC group size among a plurality of NC group sizes, the traffic distribution strategy is a first traffic distribution strategy, and the method further comprises: determining a respective traffic distribution strategy of a plurality of traffic distribution strategies for each NC group size of the plurality of NC group sizes based on the per path characteristics, a corresponding NC group size of the plurality of NC group sizes, and the reliability target.

Example A08 includes the method of example A07, further comprising: performing header inspection on the set of packets to determine a packet identifier of the set of incoming packets associated with a reliability flow.

Example A09 includes the method of example A08, wherein the packet identifier is one or more of a source node network address, a destination node network address, an ingress port number, an egress port number, and a QoS flow identifier.

Example A10 includes the method of examples A08-A09, further comprising: performing automatic burst size detection based on a burst time spread parameter, wherein the burst time spread parameter specifies a maximum arrival time difference between a first packet of a burst of packets and a last packet of the burst of packets.

Example A11 includes the method of example A10, wherein the performing the automatic burst size detection comprises: determining a burst size by counting a number of incoming packets of the set of incoming packets arriving within a time window after arrival of the first packet of the burst of packets, wherein the time window has a same size as the burst time spread parameter; and selecting a traffic distribution strategy from the plurality of traffic distribution strategies based on the determined burst size.

Example A12 includes the method of example A11, wherein, when the set of incoming packets are systematic code packets, the performing the automatic burst size detection further comprises: routing, incoming packets of the set of incoming packets arriving within the time window, for transmission over one or more network paths of the set of network paths without performing NC on the incoming packets arriving within the time window.

Example A13 includes the method of examples A01-A12, wherein the per path characteristics include: an erasure probability for transmitting packets over individual network paths of the set of network paths; and delay characteristics indicating an expected time required for sending a number of packets over the individual network paths of the set of network paths.

Example A14 includes the method of examples A01-A13, wherein the reliability target is a probability that a receiver will be able to decode the set of packets.

Example A15 includes the method of examples A13-A14, further comprising: operating an optimizer to determine an optimal subset of network paths from among the set of network paths and an optimal number of network coded packets to belong to the individual subsets of the NC group.

Example A16 includes the method of example A15, further comprising: determining a worst-case delay for the individual network paths of the set of network paths based on the erasure probability, the delay characteristics, the reliability target, and the NC group size; determining a burst size based on the NC group size; and generating a mapping function mapping the worst-case delay to the burst size, wherein the mapping function is for determining admission control criteria for performing admission control.

Example A17 includes the method of example A16, wherein the determining the worst-case delay comprises: operating the optimizer to derive the worst-case delay for the individual network paths based on optimization of the erasure probability, the delay characteristics, the reliability target, and the NC group size for the individual network paths.

Example A18 includes the method of example A17, wherein the derived worst-case delay is a maximum amount of acceptable delay for delivering the set of network coded packets over the individual network paths that still meets the reliability target.

Example A19 includes the method of examples A16-A18, further comprising: performing admission control for bursty-arrival traffic with a fixed burst size and a burst interval, wherein the burst interval is based on the worst-case delay to the burst size mapping.

Example A20 includes the method of example A19, further comprising: determining an interleaving factor based on the per path characteristics, the NC group size, and the reliability target; and interleaving packets belonging to one or more other bursts.

Example A21 includes the method of examples A16-A18, further comprising: performing admission control for periodic-arrival traffic based on an arrival period of the periodic-arrival traffic and the burst size.

Example A22 includes the method of examples A16-A21, further comprising: performing the admission control using a leaky-bucket traffic pacing mechanism or a token-bucket traffic pacing mechanism.

Example A23 includes the method of example A15, further comprising: determining, based on the collected metrics, a delay bound for the individual network paths of the set of network paths.

Example A24 includes the method of example A23, further comprising: determining a feasibility for the set of network coded packets based on the per path characteristics, the NC group size, the reliability target, and the delay bound; and generating a feasibility indicator based on the determined feasibility, wherein a value of the feasibility indicator indicates whether sending traffic over the individual network paths is feasible or not.

Example A25 includes the method of example A24, wherein the determining the feasibility comprises: operating the optimizer to determine, as the optimal subset of network paths, a most resource efficient subset of the set of network paths among various other subsets of network paths from the set of network paths.

Example A26 includes the method of examples A24-A25, wherein the feasibility indicator includes a value of 'true' to indicate that sending traffic over the individual network paths is feasible, and the feasibility indicator includes a value of 'false' to indicate that sending traffic over the individual network paths is not feasible.

Example A27 includes the method of examples A24-A25, wherein the feasibility indicator includes a numeric value, wherein the numeric value being above a predetermined or configured threshold indicates that sending traffic over the individual network paths is feasible, and the numeric value being below the predetermined or configured threshold indicates that sending traffic over the individual network paths is not feasible.

Example A28 includes the method of examples A26-A27, further comprising: performing admission control using the feasibility indicator including: rejecting admission of the set of network coded packets when the value of the feasibility indicator indicates that sending traffic over the individual network paths is not feasible; and admitting the set of network coded packets when the value of the feasibility indicator indicates that sending traffic over the individual network paths is feasible.

Example A29 includes the method of examples A28, further comprising: determining whether delivering individual subsets of the optimal subsets of network coded packets to be sent over respective ones of the optimal subset of network paths exceeds a reliability flow resource allocation threshold during a period that is within an inter-burst interval or the delay bound; and rejecting admission of the set of network coded packets when delivering at least one of the optimal subsets exceeds the reliability flow resource allocation threshold during the period.

Example A30 includes the method of examples A01-A29, wherein the metrics include radio characteristics and QoS requirements.

Example A31 includes the method of examples A01-A30, wherein the one or more data sources include one or more network access nodes (NANs), and the metrics related to the multi-access environment include access network measurements.

Example A32 includes the method of example A31, wherein the access network measurements include one or more of reference signal received power (RSRP), reference signal received quality (RSRQ), received signal strength indicator (RSSI), received channel power indicator (RCPI), received signal to noise indicator (RSNI), average noise plus interference (ANPI), signal-to-noise ratio (SNR), signal-to-noise and interference ratio (SINR), expected peak data rate, end-to-end delay measurements, backhaul delay measurements, scheduling delay measurements, packet drop rate, and packet error ratio.

Example A33 includes the method of examples A31-A32, wherein the metrics related to the multi-access environment further include capabilities indicated by one or more configurations.

Example A34 includes the method of example A33, wherein the capabilities include one or more of quality of service (QoS) capabilities included in a QoS configuration, wireless local area network (WLAN) capabilities included in a WLAN configuration, and radio resource control (RRC) information included in a RRC configuration.

Example A35 includes the method of examples A31-A34, wherein the metrics related to the multi-access environment further include application layer metrics.

Example A36 includes the method of example A35, wherein the application layer metrics include one or more of priority indicators for data flows, QoS requirements of the data flows, wherein the QoS requirements include one or more of the reliability target, a latency bound, a minimum guaranteed bit rate, and a maximum burst size.

Example A37 includes the method of examples A31-A36, wherein the metrics related to the multi-access environment further include data plane telemetry metrics.

Example A38 includes the method of example A37, wherein the data plane telemetry metrics include one or more of traffic volume estimates of reliability flows, traffic volume estimates of non-reliability flows, flow path and latency metrics, packet drop metrics, traffic congestion metrics, platform load metrics, and application load metrics.

Example B01 includes the method of examples A15-A38, further comprising: determining a number of available transmission units on each network path of the set of network paths; performing NC on the set of incoming packets to obtain the set of network coded packets; and delivering the individual subsets of the set of network coded packets to the respective network paths of the set of network paths.

Example B02 includes the method of example B01, wherein the determining the number of available transmission units on each network path comprises: calculating a number of independently transmitted packets supported on each network path within a transmission delay bound of the set of incoming packets.

Example B03 includes the method of examples B01-B02, wherein the performing NC on the set of incoming packets and the delivering the individual subsets to the respective network paths comprises: grouping a succession of the set of incoming packets, wherein a length of the succession of the set of incoming packets is specified by a predefined NC configuration; determining a number of network coded packets in the set of network coded packets to be generated from each grouping of the incoming packets; determining respective sizes of corresponding subsets of the individual subsets to be delivered to the respective network paths; generating the individual subsets from each grouping of the incoming packets according to the NC configuration and a total number of network coded packets in the set of network coded packets; and delivering the individual subsets to the respective network paths according to the respective sizes.

Example B04 includes the method of example B03, wherein the determining the respective sizes of the corresponding subsets comprises: operating the optimizer to determine the respective sizes of the corresponding subsets based on the NC group size, the reliability target, the erasure probability of the respective network paths, a spectral efficiency of the respective network paths, and the number of available transmission units, and to output.

Example B05 includes the method of example B04, further comprising: determining a score for each network path of the set of network paths; generating a preference order for each of the respective network paths according to the score of each network path; and operating the optimizer to determine the respective sizes of the corresponding subsets further based on the preference order.

Example B06 includes the method of example B05, wherein the determining the score for each network path comprises: determining the score for each network path based on the erasure probability of a corresponding one of each network path and a spectral efficiency of the corresponding one of each network path.

Example B07 includes the method of example B06, wherein the determining the score for each network path comprises: determining the score for each network path further based on the NC group size and the reliability target.

Example B08 includes the method of examples B05-B07, further comprising: operating the optimizer to determine the respective sizes of the corresponding subsets according to a greedy-type algorithm using the preference order.

Example B09 includes the method of example B08, wherein the greedy-type algorithm is a line-search greedy algorithm or a binary-search greedy algorithm.

Example B10 includes the method of examples B08-B09, further comprising: applying a recursive final-unit adjustment procedure to a result of the greedy-type algorithm.

Example C01 includes the method of examples A01-B10, further comprising: determining transmission delays of each network path of the set of network paths; and determining the traffic distribution strategy further based on the determined transmission delays.

Example C02 includes the method of example C01, wherein the determining the transmission delays comprises: determining initial estimates of the transmission delays from a transmitter data rate selection, a transport block (TB) size, and a target packet error ratio (PER); and adjusting the initial estimates of the transmission delays based on packet delay measurements, wherein the transmitter data rate selection, the TB size, the target PER, and the packet delay measurements are among the collected metrics.

Example C03 includes the method of examples C01-C02, wherein the determining the transmission delays of each network path is based on a data rate associated with corresponding ones of each network path and a scheduling interval associated with the corresponding ones of each network path.

Example C04 includes the method of examples C02-C03, further comprising: determining packet erasure probabilities of each network path of the set of network paths; and determining the traffic distribution strategy further based on the determined packet erasure probabilities.

Example C05 includes the method of example C04, wherein the determining packet erasure probabilities comprises: determining initial estimates of the erasure probabilities based on the data rate selection, the TB size, and the target PER; and adjusting the initial estimates of the erasure probabilities based on a number of packet erasures during data transmissions over each of the network paths or based on acknowledgement (ACK)/negative ACK (HACK) statistics.

Example C06 includes the method of example C05, further comprising: adding an NC header to each network coded packet in the NC group, wherein the NC header includes an NC group indicator to identify which set of packets should be jointly encoded and additional NC configuration parameters for determination of successful decoding criteria, including a number of received packets required for successful recovery of original data packets; and obtaining a cross-path NC acknowledgement (NC-ACK) via a network access node (NAN) that relayed the set of network coded packets when the successful decoding criteria for the NC group are met, wherein the NC-ACK includes the NC group indicator of successfully decoded packets.

Example C07 includes the method of example C06, further comprising: forwarding the NC-ACK to another NAN; and discarding one or more network coded packets belonging to the NC group as indicated by the NC-ACK remaining in a transmit buffer when the NC-ACK is received.

Example C08 includes the method of examples A13-C07, wherein at least one network path in the set of network paths has an erasure probability that is different than an erasure probability of at least one other network path in the set of network paths.

Example C09 includes the method of examples A13-C08, wherein an individual network coded packet transmitted via a path the set of network paths is subject to independent erasures or dependent erasures.

Example C10 includes the method of examples A13-C09, wherein at least one network path in the set of network paths has packet erasures that are independent and identically distributed (IID).

Example D01 includes the method of examples A01-C10, wherein the method is performed by a reliability enhancement engine (REE).

Example D02 includes the method of example D01, wherein the REE is part of a multi-access traffic manager (MA-TM).

Example D03 includes the method of examples D01-D02, wherein the REE and the MA-TM are implemented as respective edge applications (apps) of an edge compute node.

Example D04 includes the method of examples D01-D02, wherein the MA-TM is part of an edge platform of an edge compute node, and the REE is an edge app operated by the edge compute node.

Example D05 includes the method of example D03 or D04, wherein the edge compute node is a Multi-Access Edge Computing (MEC) server of a MEC framework, and the REE is implemented as a MEC app configured to be operated by a MEC platform of the MEC server.

Example D06 includes the method of example D03 or D04, wherein the edge compute node is a Multi-Access Management Services (MAMS) server or a MAMS client of a MAMS framework, and the REE is implemented as a Network Connection Manager (NCM) configured to be operated by the MAMS server or a Client Connection Manager (CCM) configured to be operated by the MAMS client.

Example D07 includes the method of example D03 or D04, wherein the edge compute node is a Radio Access Network (RAN) intelligent controller (RIC) of an Open RAN Alliance (O-RAN) framework, and the REE is implemented as an xApp configured to be operated by the RIC.

Example D08 includes the method of example D03 or D04, wherein the edge compute node is a central unit (CU) of a CU/distributed unit (DU)-split architecture of a next generation (NG)-RAN architecture of a third generation partnership project (3GPP) cellular network, and the REE is implemented as a network function (NF) configured to be operated by the CU.

Example D09 includes the method of example D03 or D04, wherein the edge compute node is an Edge Enabler Server (EES) or an Edge Configuration Server (ECS) of a 3GPP edge computing architecture, and the REE is implemented as an Edge Application Servers (EAS) configured to be operated by the EES or the ECS.

Example Z01 includes one or more computer readable media comprising instructions, wherein execution of the instructions by processor circuitry is to cause the processor circuitry to perform the method of any one of claims A01-D09 and/or any other aspect discussed herein.

Example Z02 includes a computer program comprising the instructions of claim Z01.

Example Z03 includes an Application Programming Interface defining functions, methods, variables, data structures, and/or protocols for the computer program of claim Z02.

Example Z04 includes an apparatus comprising circuitry loaded with the instructions of claim Z01.

Example Z05 includes an apparatus comprising circuitry operable to run the instructions of claim Z01.

Example Z06 includes an integrated circuit comprising one or more of the processor circuitry of claim Z01 and the one or more computer readable media of claim Z01.

Example Z07 includes a computing system comprising the one or more computer readable media and the processor circuitry of claim Z01.

Example Z08 includes an apparatus comprising means for executing the instructions of claim Z01.

Example Z09 includes a signal generated as a result of executing the instructions of claim Z01.

Example Z10 includes a data unit generated as a result of executing the instructions of claim Z01.

Example Z11 includes the data unit of claim Z10, the data unit is a datagram, network packet, data frame, data segment, a Protocol Data Unit (PDU), a Service Data Unit (SDU), a message, or a database object.

Example Z12 includes a signal encoded with the data unit of claim Z10 or Z11.

Example Z13 includes an electromagnetic signal carrying the instructions of claim Z01.

Example Z14 includes an apparatus comprising means for performing the method of any one of claims A01-D09.

7. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "receipt" at least in some embodiments refers to any action (or set of actions) involved with receiving or obtaining an object, data, data unit, etc., and/or the fact of the object, data, data unit, etc. being received. The term "receipt" at least in some embodiments refers to an object, data, data unit, etc., being pushed to a device, system, element, etc. (e.g., often referred to as a push model), pulled by a device, system, element, etc. (e.g., often referred to as a pull model), and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The terms "ego" (as in, e.g., "ego device") and "subject" (as in, e.g., "data subject") at least in some embodiments refers to an entity, element, device, system, etc., that is under consideration or being considered. The terms "neighbor" and "proximate" (as in, e.g., "proximate device") at least in some embodiments refers to an entity, element, device, system, etc., other than an ego device or subject device.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmut-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "access point" or "AP" at least in some embodiments refers to an entity that contains one station (STA) and provides access to the distribution services, via the wireless medium (WM) for associated STAs. An AP comprises a STA and a distribution system access function (DS AF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a UE. A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved Node B (eNB) or a next generation Node B (gNB). In some examples, the base station may operate or include compute hardware to operate as a compute node. However, in many of the scenarios discussed herein, a RAN node may be substituted with an access point (e.g., wireless network access point) or other network access hardware.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an Si interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021 Jul. 9)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "IAB-node" at least in some embodiments refers to a RAN node that supports new radio (NR) access links to user equipment (UEs) and NR backhaul links to parent nodes and child nodes. The term "IAB-donor" at least in some embodiments refers to a RAN node (e.g., a gNB) that provides network access to UEs via a network of backhaul and access links.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" indicates the sub-layer of infrastructure edge closest to the end user or device. For example, such layer may be fulfilled by an edge data center deployed at a cellular network site. The access edge layer functions as the front line of the infrastructure Edge and may connect to an aggregation Edge layer higher in the hierarchy.

The term "aggregation edge layer" indicates the layer of infrastructure edge one hop away from the access edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "RAT type" at least in some embodiments may identify a transmission technology and/or communication protocol used in an access network, for example, new radio (NR), Long Term Evolution (LTE), narrowband IoT (NB-IOT), untrusted non-3GPP, trusted non-3GPP, trusted IEEE 802.11, non-3GPP access, MuLTEfire, WiMAX, wireline, wireline-cable, wireline broadband forum (wireline-BBF), etc. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), etc.); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), etc.), Generic Access Network (GAN)/Unlicensed Mobile Access (UMA), High Speed Packet Access (HSPA) (and variants thereof such as HSPA Plus (HSPA+), etc.), Long Term Evolution (LTE) (and variants thereof such as LTE-Advanced (LTE-A), Evolved UTRA (E-UTRA), LTE Extra, LTE-A Pro, LTE LAA, MuLTEfire, etc.), Fifth Generation (5G) or New Radio (NR), etc.; ETSI technologies such as High Performance Radio Metropolitan Area Network (HiperMAN) and the like; IEEE technologies such as WiFi (IEEE 802.11 and variants thereof), Worldwide Interoperability for Microwave Access (WiMAX) (IEEE 802.16 and variants thereof), Mobile Broadband Wireless Access (MBWA)/iBurst (IEEE 802.20 and variants thereof), etc.; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (IEEE 802.11ad, IEEE 802.11ay, etc.), etc.); short-range and/or wireless personal area network (WPAN) technologies/standards such as Bluetooth (and variants thereof such as Bluetooth 5.3, Bluetooth Low Energy (BLE), etc.), IEEE 802.15 technologies/standards (e.g., IEEE 802.15.4 (low rate WPAN), ZigBee, Thread, IPv6 over Low power WPAN (6LoWPAN), WirelessHART, MiWi, ISA100.11a, IEEE 802.15.6 (Body Area Networks (BANs), etc.), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE 802.15.7 and the like; V2X communication including 3GPP cellular V2X (C-V2X), Wireless Access in Vehicular Environments (WAVE) (IEEE 802.11p), IEEE 802.11bd, Dedicated Short Range Communications (DSRC), Intelligent-Transport-Systems (ITS) (including the European ITS-G5, ITS-GSB, ITS-GSC, etc.); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), etc.); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, etc.); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "subframe" at least in some embodiments at least in some embodiments refers to a time interval during which a signal is signaled. In some implementations, a subframe is equal to 1 millisecond (ms). The term "time slot" at least in some embodiments at least in some embodiments refers to an integer multiple of consecutive subframes. The term "superframe" at least in some embodiments at least in some embodiments refers to a time interval comprising two time slots.

The term "interoperability" at least in some embodiments refers to the ability of STAs utilizing one communication system or RAT to communicate with other STAs utilizing another communication system or RAT. The term "Coexistence" at least in some embodiments refers to sharing or allocating radiofrequency resources among STAs using either communication system or RAT.

The term "reliability" at least in some embodiments refers to the ability of a computer-related component (e.g., software, hardware, or network element/entity) to consistently perform a desired function and/or operate according to a specification. Additionally or alternatively, the term "reliability" at least in some embodiments refers to the probability that a product, system, or service will perform its intended function adequately for a specified period of time, or will operate in a defined environment with a low probability of failure. Additionally or alternatively, the term "reliability" in the context of network communications (e.g., "network reliability") at least in some embodiments refers to the ability of a network to carry out communication. The term "network reliability" at least in some embodiments refers to a probability or measure of delivering a specified amount of data from a source to a destination (or sink).

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some embodiments refers to different concepts.

The term "stream" at least in some embodiments refers to a sequence of data elements made available over time. At least in some embodiments, functions that operate on a stream, which may produce another stream, are referred to as "filters," and can be connected in pipelines, analogously to function composition. Filters may operate on one item of a stream at a time, or may base an item of output on multiple items of input, such as a moving average.

The term "distributed computing" at least in some embodiments refers to computation resources that are geographically distributed within the vicinity of one or more localized networks' terminations.

The term "distributed computations" at least in some embodiments refers to a model in which components located on networked computers communicate and coordinate their actions by passing messages interacting with each other in order to achieve a common goal.

The term "service" at least in some embodiments refers to the provision of a discrete function within a system and/or environment. Additionally or alternatively, the term "service" at least in some embodiments refers to a functionality or a set of functionalities that can be reused.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. Additionally or alternatively, the term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "session" at least in some embodiments refers to a temporary and interactive information interchange between two or more communicating devices, two or more application instances, between a computer and user, and/or between any two or more entities or elements. Additionally or alternatively, the term "session" at least in some embodiments refers to a connectivity service or other service that provides or enables the exchange of data between two entities or elements. The term "network session" at least in some embodiments refers to a session between two or more communicating devices over a network. The term "web session" at least in some embodiments refers to session between two or more communicating devices over the Internet or some other network. The term "session identifier," "session ID," or "session token" at least in some embodiments refers to a piece of data that is used in network communications to identify a session and/or a series of message exchanges.

The term "quality" at least in some embodiments refers to a property, character, attribute, or feature of something as being affirmative or negative, and/or a degree of excellence of something. Additionally or alternatively, the term "quality" at least in some embodiments, in the context of data processing, refers to a state of qualitative and/or quantitative aspects of data, processes, and/or some other aspects of data processing systems.

The term "Quality of Service" or "QoS" at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS" at least in some embodiments refers to mechanisms that provide traffic-forwarding treatment based on flow-specific traffic classification. In some implementations, the term "Quality of Service" or "QoS" can be used interchangeably with the term "Class of Service" or "CoS".

The term "Class of Service" or "CoS" at least in some embodiments refers to mechanisms that provide traffic-forwarding treatment based on non-flow-specific traffic classification. In some implementations, the term "Class of Service" or "CoS" can be used interchangeably with the term "Quality of Service" or "QoS".

The term "QoS flow" at least in some embodiments refers to the finest granularity for QoS forwarding treatment in a network. The term "5G QoS flow" at least in some embodiments refers to the finest granularity for QoS forwarding treatment in a 5G System (5GS). Traffic mapped to the same QoS flow (or 5G QoS flow) receive the same forwarding treatment.

The term "reliability flow" at least in some embodiments refers to the finest granularity for reliability forwarding treatment in a network, where traffic mapped to the same reliability flow receive the same reliability treatment. Additionally or alternatively, the term "reliability flow" at least in some embodiments refers to the a reliability treatment assigned to packets of a data flow The term "reliability forwarding treatment" or "reliability treatment" refers to the manner in which packets belonging to a data flow are handled to provide a certain level of reliability to that data flow including, for example, a probability of success of packet delivery, QoS or Quality of Experience (QoE) over a period of time (or unit of time), admission control capabilities, a particular coding scheme, and/or coding rate for arrival data bursts.

The term "forwarding treatment" at least in some embodiments refers to the precedence, preferences, and/or prioritization a packet belonging to a particular data flow receives in relation to other traffic of other data flows. Additionally or alternatively, the term "forwarding treatment" at least in some embodiments refers to one or more parameters, characteristics, and/or configurations to be applied to packets belonging to a data flow when processing the packets for forwarding. Examples of such characteristics may include resource type (e.g., non-guaranteed bit rate (GBR), GBR, delay-critical GBR, etc.); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds; etc. In some implementations, the term "forwarding treatment" may be referred to as "Per-Hop Behavior" or "PHB".

The term "admission control" at least in some embodiments refers to a function or process that decides if new packets, messages, work, tasks, etc., entering a system should be admitted to enter the system or not. Additionally or alternatively, the term "admission control" at least in some embodiments refers to a validation process where a check is performed before a connection is established to see if current resources are sufficient for the proposed connection.

The term "QoS Identifier" at least in some embodiments refers to a scalar that is used as a reference to a specific QoS forwarding behaviour (e.g., packet loss rate, packet delay budget, etc.) to be provided to a QoS flow. This may be implemented in an access network by referencing node specific parameters that control the QoS forwarding treatment (e.g., scheduling weights, admission thresholds, queue management thresholds, link layer protocol configuration, etc.).

The term "time to live" (or "TTL") or "hop limit" at least in some embodiments refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "channel coding" at least in some embodiments refers to processes and/or techniques to add redundancy to messages or packets in order to make those messages or packets more robust against noise, channel interference, limited channel bandwidth, and/or other errors. For purposes of the present disclosure, the term "channel coding" can be used interchangeably with the terms "forward error correction" or "FEC"; "error correction coding", "error correction code", or "ECC"; and/or "network coding" or "NC".

The term "network coding" at least in some embodiments refers to processes and/or techniques in which transmitted data is encoded and decoded to improve network performance.

The term "code rate" at least in some embodiments refers to the proportion of a data stream or flow that is useful or non-redundant (e.g., for a code rate of k/n, for every k bits of useful information, the (en)coder generates a total of n bits of data, of which n−k are redundant).

The term "systematic code" at least in some embodiments refers to any error correction code in which the input data is embedded in the encoded output. The term "non-systematic code" at least in some embodiments refers to any error correction code in which the input data is not embedded in the encoded output.

The term "interleaving" at least in some embodiments refers to a process to rearrange code symbols so as to spread bursts of errors over multiple codewords that can be corrected by ECCs.

The term "code word" or "codeword" at least in some embodiments refers to an element of a code or protocol, which is assembled in accordance with specific rules of the code or protocol.

The term "PDU Connectivity Service" at least in some embodiments refers to a service that provides exchange of protocol data units (PDUs) between a UE and a data network (DN). The term "PDU Session" at least in some embodiments refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" at least in some embodiments refers to a PDU Session that provides a PDU connectivity service, which can use one access network at a time or multiple access networks simultaneously.

The term "traffic shaping" at least in some embodiments refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some embodiments refers to the regulation of flows into or out of a network, or into or out of a specific device or element.

The term "access traffic steering" or "traffic steering" at least in some embodiments refers to a procedure that selects an access network for a new data flow and transfers the traffic of one or more data flows over the selected access network. Access traffic steering is applicable between one 3GPP access and one non-3GPP access.

The term "access traffic switching" or "traffic switching" at least in some embodiments refers to a procedure that moves some or all traffic of an ongoing data flow from at least one access network to at least one other access network in a way that maintains the continuity of the data flow.

The term "access traffic splitting" or "traffic splitting" at least in some embodiments refers to a procedure that splits the traffic of at least one data flow across multiple access networks. When traffic splitting is applied to a data flow, some traffic of the data flow is transferred via at least one access channel, link, or path, and some other traffic of the same data flow is transferred via another access channel, link, or path.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof.

The term "application identifier", "application ID", or "app ID" at least in some embodiments refers to an identifier that can be mapped to a specific application or application instance; in the context of 3GPP 5G/NR systems, an "application identifier" at least in some embodiments refers to an identifier that can be mapped to a specific application traffic detection rule.

The term "endpoint address" at least in some embodiments refers to an address used to determine the host/authority part of a target URI, where the target URI is used to access an NF service (e.g., to invoke service operations) of an NF service producer or for notifications to an NF service consumer.

The term "closed access group" or "CAG" at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "CAG-ID" at least in some embodiments refers to an identifier of a CAG.

The term "port" in the context of computer networks, at least in some embodiments refers to a communication endpoint, a virtual data connection between two or more entities, and/or a virtual point where network connections start and end. Additionally or alternatively, a "port" at least in some embodiments is associated with a specific process or service.

The term "subnetwork" or "subnet" at least in some embodiments refers to a logical subdivision of a network, such as an IP network. The practice of dividing a network into two or more networks is called "subnetting."

The term "netmask" or "subnet mask" at least in some embodiments refers to a bitmask applied by bitwise AND operations to a network address (e.g., an IP address in an IP network) to yield a routing prefix, and/or is a 32-bit "mask" used to divide an IP address into subnets and specify the network's available hosts.

The term "localized network" at least in some embodiments refers to a local network that covers a limited number of connected vehicles in a certain area or region.

The term "local data integration platform" at least in some embodiments refers to a platform, device, system, network, or element(s) that integrate local data by utilizing a combination of localized network(s) and distributed computation.

The term "physical rate" or "PHY rate" at least in some embodiments refers to a speed at which one or more bits are actually sent over a transmission medium. Additionally or alternatively, the term "physical rate" or "PHY rate" at least in some embodiments refers to a speed at which data can move across a wireless link between a transmitter and a receiver.

The term "delay" at least in some embodiments refers to a time interval between two events. Additionally or alternatively, the term "delay" at least in some embodiments refers to a time interval between the propagation of a signal and its reception.

The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized.

The term "processing delay" at least in some embodiments refers to an amount of time taken to process a packet in a network node.

The term "transmission delay" at least in some embodiments refers to an amount of time needed (or necessary) to push a packet (or all bits of a packet) into a transmission medium.

The term "propagation delay" at least in some embodiments refers to amount of time it takes a signal's header to travel from a sender to a receiver.

The term "network delay" at least in some embodiments refers to the delay of an a data unit within a network (e.g., an IP packet within an IP network).

The term "queuing delay" at least in some embodiments refers to an amount of time a job waits in a queue until that job can be executed. Additionally or alternatively, the term "queuing delay" at least in some embodiments refers to an amount of time a packet waits in a queue until it can be processed and/or transmitted.

The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped.

The term "packet drop rate" at least in some embodiments refers to a share of packets that were not sent to the target due to high traffic load or traffic management and should be seen as a part of the packet loss rate.

The term "packet loss rate" at least in some embodiments refers to a share of packets that could not be received by the target, including packets dropped, packets lost in transmission and packets received in wrong format.

The term "latency" at least in some embodiments refers to the amount of time it takes to transfer a first/initial data unit in a data burst from one point to another.

The term "throughput" or "network throughput" at least in some embodiments refers to a rate of production or the rate at which something is processed. Additionally or alternatively, the term "throughput" or "network throughput" at least in some embodiments refers to a rate of successful message (date) delivery over a communication channel.

The term "goodput" at least in some embodiments refers to a number of useful information bits delivered by the network to a certain destination per unit of time.

The term "performance indicator" at least in some embodiments refers to performance data aggregated over a group of network functions (NFs), which is derived from performance measurements collected at the NFs that belong to the group, according to the aggregation method identified in a Performance Indicator definition.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The terms "instantiate," "instantiation," and the like at least in some embodiments refers to the creation of an instance. An "instance" also at least in some embodiments refers to a concrete occurrence of an object, which may occur, for example, during execution of program code.

The term "data processing" or "processing" at least in some embodiments refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "software agent" at least in some embodiments refers to a computer program that acts for a user or other program in a relationship of agency.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "user" in the context of reconfigurable radio equipment/systems, at least in some embodiments refers to an abstract representation of any entity issuing command requests (e.g., using the services) to the multiradio computer. Three types of users are distinguished based on the type of services used: administrator for multiradio management plane, mobility policy manager for control plane, and networking stack for user plane.

The term "analytics" at least in some embodiments refers to the discovery, interpretation, and communication of meaningful patterns in data.

The term "application programming interface" or "API" at least in some embodiments refers to a set of subroutine definitions, communication protocols, and tools for building software. Additionally or alternatively, the term "application programming interface" or "API" at least in some embodiments refers to a set of clearly defined methods of communication among various components. An API may be for a web-based system, operating system, database system, computer hardware, or software library.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit", a "protocol data unit" or "PDU", a "service data unit" or "SDU", a frame, a packet, and/or the like.

The term "information element" at least in some embodiments refers to a structural element containing one or more fields.

The term "field" at least in some embodiments refers to individual contents of an information element, or a data element that contains content.

The term "data element" or "DE" at least in some embodiments refers to a data type that contains one single data.

The term "data frame" or "DF" at least in some embodiments refers to a data type that contains more than one data element in a predefined order.

The term "data element" at least in some embodiments refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some embodiments refers to a data type that contains one single data. Data elements may store data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, etc.), object instances, and/or other data elements. An "attribute" at least in some embodiments refers to a markup construct including a name-value pair that exists within a start tag or empty element tag. Attributes contain data related to its element and/or control the element's behavior.

The term "reference" at least in some embodiments refers to data useable to locate other data and may be implemented a variety of ways (e.g., a pointer, an index, a handle, a key, an identifier, a hyperlink, etc.).

The term "translation" at least in some embodiments refers to the process of converting or otherwise changing data from a first form, shape, configuration, structure, arrangement, embodiment, description, etc. into a second form, shape, configuration, structure, arrangement, embodiment, description, etc.; at least in some embodiments there may be two different types of translation: transcoding and transformation.

The term "transcoding" at least in some embodiments refers to taking information/data in one format (e.g., a packed binary format) and translating the same information/data into another format in the same sequence. Additionally or alternatively, the term "transcoding" at least in some embodiments refers to taking the same information, in the same sequence, and packaging the information (e.g., bits or bytes) differently.

The term "transformation" at least in some embodiments refers to changing data from one format and writing it in another format, keeping the same order, sequence, and/or nesting of data items. Additionally or alternatively, the term "transformation" at least in some embodiments involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some embodiments refers to changing the schema of a data object to another schema.

The term "stream" or "streaming" refers to a manner of processing in which an object is not represented by a complete logical data structure of nodes occupying memory proportional to a size of that object, but are processed "on the fly" as a sequence of events.

In this context, the term "logical data structure," "logical structure," or the like may be any organization or collection of data values and/or data elements, the relationships among the data values/elements, and/or the functions or operations that can be applied to the data values/elements provided. A "logical data structure" may be an aggregate, tree (e.g., abstract syntax tree or the like), graph (e.g., a directed acyclic graph (DAG)), finite automaton, finite state machine (FSM), or other like data structure including at least one parentless node (or root node) together with zero or more descendant nodes, plus all the attributes and namespaces of the parentless and descendant nodes.

The term "cryptographic hash function", "hash function", or "hash") at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "accuracy" at least in some embodiments refers to the closeness of one or more measurements to a specific value.

The term "artificial intelligence" or "AI" at least in some embodiments refers to any intelligence demonstrated by machines, in contrast to the natural intelligence displayed by humans and other animals. Additionally or alternatively, the term "artificial intelligence" or "AI" at least in some embodiments refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), etc.), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), etc.), Linear Dynamical System (LDS), Switching LDS (SLDS), Optical NNs (ONNs), an NN for reinforcement learning (RL) and/or deep RL (DRL), and/or the like.

The term "Bayesian optimization" at least in some embodiments refers to a sequential design strategy for global optimization of black-box functions that does not assume any functional forms.

The term "epoch" at least in some embodiments refers to one cycle through a full training dataset. Additionally or alternatively, the term "epoch" at least in some embodiments refers to a full training pass over an entire training dataset such that each training example has been seen once; here, an epoch represents N/batch size training iterations, where N is the total number of examples.

The term "event", in probability theory, at least in some embodiments refers to a set of outcomes of an experiment (e.g., a subset of a sample space) to which a probability is assigned. Additionally or alternatively, the term "event" at least in some embodiments refers to a software message indicating that something has happened. Additionally or alternatively, the term "event" at least in some embodiments refers to an object in time, or an instantiation of a property in an object. Additionally or alternatively, the term "event" at least in some embodiments refers to a point in space at an instant in time (e.g., a location in spacetime). Additionally or alternatively, the term "event" at least in some embodiments refers to a notable occurrence at a particular point in time.

The term "experiment" in probability theory, at least in some embodiments refers to any procedure that can be repeated and has a well-defined set of outcomes, known as a sample space.

The term "feature" at least in some embodiments refers to an individual measureable property, quantifiable property, or characteristic of a phenomenon being observed. Additionally or alternatively, the term "feature" at least in some embodiments refers to an input variable used in making predictions. At least in some embodiments, features may be represented using numbers/numerals (e.g., integers), strings, variables, ordinals, real-values, categories, and/or the like.

The term "feature extraction" at least in some embodiments refers to a process of dimensionality reduction by which an initial set of raw data is reduced to more manageable groups for processing. Additionally or alternatively, the term "feature extraction" at least in some embodiments refers to retrieving intermediate feature representations calculated by an unsupervised model or a pretrained model for use in another model as an input. Feature extraction is sometimes used as a synonym of "feature engineering."

The term "feature map" at least in some embodiments refers to a function that takes feature vectors (or feature tensors) in one space and transforms them into feature vectors (or feature tensors) in another space. Additionally or alternatively, the term "feature map" at least in some embodiments refers to a function that maps a data vector (or tensor) to feature space. Additionally or alternatively, the term "feature map" at least in some embodiments refers to a function that applies the output of one filter applied to a previous layer. In some embodiments, the term "feature map" may also be referred to as an "activation map".

The term "feature vector" at least in some embodiments, in the context of ML, refers to a set of features and/or a list of feature values representing an example passed into a model. Additionally or alternatively, the term "feature vector" at least in some embodiments, in the context of ML, refers to a vector that includes a tuple of one or more features.

The term "inference engine" at least in some embodiments refers to a component of a computing system that applies logical rules to a knowledge base to deduce new information.

The term "intelligent agent" at least in some embodiments refers to an a software agent or other autonomous entity which acts, directing its activity towards achieving goals upon an environment using observation through sensors and consequent actuators (i.e. it is intelligent). Intelligent agents may also learn or use knowledge to achieve their goals.

The term "iteration" at least in some embodiments refers to the repetition of a process in order to generate a sequence of outcomes, wherein each repetition of the process is a single iteration, and the outcome of each iteration is the starting point of the next iteration. Additionally or alternatively, the term "iteration" at least in some embodiments refers to a single update of a model's weights during training.

The term "loss function" or "cost function" at least in some embodiments refers to an event or values of one or more variables onto a real number that represents some "cost" associated with the event. A value calculated by a loss function may be referred to as a "loss" or "error". Additionally or alternatively, the term "loss function" or "cost function" at least in some embodiments refers to a function used to determine the error or loss between the output of an algorithm and a target value. Additionally or alternatively, the term "loss function" or "cost function" at least in some embodiments refers to a function are used in optimization problems with the goal of minimizing a loss or error.

The term "mathematical model" at least in some embodiments refer to a system of postulates, data, and inferences presented as a mathematical description of an entity or state of affairs including governing equations, assumptions, and constraints.

The term "machine learning" or "ML" at least in some embodiments refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm" at least in some embodiments refers to different concepts than the term "ML model," these terms may be used interchangeably for the purposes of the present disclosure. Furthermore, the term "AI/ML application" or the like at least in some embodiments refers to an application that contains some AI/ML models and application-level descriptions. ML techniques generally fall into the following main types of learning problem categories: supervised learning, unsupervised learning, and reinforcement learning.

The term "matrix" at least in some embodiments refers to a rectangular array of numbers, symbols, or expressions, arranged in rows and columns, which may be used to represent an object or a property of such an object.

The term "nondeterministic polynomial time" or "NP" at least in some embodiments refers to a class of computational decision problems for which any given yes-solution can be verified as a solution in polynomial time by a deterministic Turing machine (or solvable by a non-deterministic Turing machine in polynomial time). The term "NP-hard" at least in some embodiments refers to a class of problems which are at least as hard as the hardest problems in NP; problems that are NP-hard do not have to be elements of NP and may not even be decidable. The term "NP-complete" at least in some embodiments refers to a class of decision problems that contains the hardest problems in NP; each NP-complete problem is in NP.

The term "objective function" at least in some embodiments refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" refers to a variable that represents a decision to be made.

The term "optimization" at least in some embodiments refers to an act, process, or methodology of making something (e.g., a design, system, or decision) as fully perfect, functional, or effective as possible. Optimization usually includes mathematical procedures such as finding the maximum or minimum of a function. The term "optimal" at least in some embodiments refers to a most desirable or satisfactory end, outcome, or output. The term "optimum" at least in some embodiments refers to an amount or degree of something that is most favorable to some end. The term "optima" at least in some embodiments refers to a condition, degree, amount, or compromise that produces a best possible result. Additionally or alternatively, the term "optima" at least in some embodiments refers to a most favorable or advantageous outcome or result.

The term "probability" at least in some embodiments refers to a numerical description of how likely an event is to occur and/or how likely it is that a proposition is true. The term "probability distribution" at least in some embodiments refers to a mathematical function that gives the probabilities of occurrence of different possible outcomes for an experiment or event.

The term "probability distribution" at least in some embodiments refers to a function that gives the probabilities of occurrence of different possible outcomes for an experiment or event. Additionally or alternatively, the term "probability distribution" at least in some embodiments refers to a statistical function that describes all possible values and likelihoods that a random variable can take within a given range (e.g., a bound between minimum and maximum possible values). A probability distribution may have one or more factors or attributes such as, for example, a mean or average, mode, support, tail, head, median, variance, standard deviation, quantile, symmetry, skewness, kurtosis, etc. A probability distribution may be a description of a random phenomenon in terms of a sample space and the probabilities of events (subsets of the sample space). Example probability distributions include discrete distributions (e.g., Bernoulli distribution, discrete uniform, binomial, Dirac measure, Gauss-Kuzmin distribution, geometric, hypergeometric, negative binomial, negative hypergeometric, Poisson, Poisson binomial, Rademacher distribution, Yule-Simon distribution, zeta distribution, Zipf distribution, etc.), continuous distributions (e.g., Bates distribution, beta, continuous uniform, normal distribution, Gaussian distribution, bell curve, joint normal, gamma, chi-squared, non-central chi-squared, exponential, Cauchy, lognormal, logit-normal, F distribution, t distribution, Dirac delta function, Pareto distribution, Lomax distribution, Wishart distribution, Weibull distribution, Gumbel distribution, Irwin-Hall distribution, Gompertz distribution, inverse Gaussian distribution (or Wald distribution), Chernoff's distribution, Laplace distribution, Pólya-Gamma distribution, etc.), and/or joint distributions (e.g., Dirichlet distribution, Ewens's sampling formula, multinomial distribution, multivariate normal distribution, multivariate t-distribution, Wishart distribution, matrix normal distribution, matrix t distribution, etc.).

The term "probability density function" or "PDF" at least in some embodiments refers to a function whose value at any given sample (or point) in a sample space can be interpreted as providing a relative likelihood that the value of the random variable would be close to that sample. Additionally or alternatively, the term "probability density function" or "PDF" at least in some embodiments refers to a probability of a random variable falling within a particular range of values. Additionally or alternatively, the term "probability density function" or "PDF" at least in some embodiments refers to a value at two different samples can be used to infer, in any particular draw of the random variable, how much more likely it is that the random variable would be close to one sample compared to the other sample.

The term "precision" at least in some embodiments refers to the closeness of the two or more measurements to each other. The term "precision" may also be referred to as "positive predictive value".

The term "sample space" in probability theory (also referred to as a "sample description space" or "possibility space") of an experiment or random trial at least in some embodiments refers to a set of all possible outcomes or results of that experiment.

The term "search space", in the context of optimization, at least in some embodiments refers to an a domain of a function to be optimized. Additionally or alternatively, the term "search space", in the context of search algorithms, at least in some embodiments refers to a feasible region defining a set of all possible solutions. Additionally or alternatively, the term "search space" at least in some embodiments refers to a subset of all hypotheses that are consistent with the observed training examples. Additionally or alternatively, the term "search space" at least in some embodiments refers to a version space, which may be developed via machine learning.

The term "stochastic" at least in some embodiments refers to a property of being described by a random probability distribution. Although the terms "stochasticity" and "randomness" are distinct in that the former refers to a modeling approach and the latter refers to phenomena themselves, for purposes of the present disclosure these two terms may be used synonymously unless the context indicates otherwise.

The term "vector" at least in some embodiments refers to a one-dimensional array data structure. Additionally or alternatively, the term "vector" at least in some embodiments refers to to a tuple of one or more values called scalars.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. An edge compute node for providing reliability enhancements in a multi-access communication network, the edge compute node comprising:
   interface circuitry arranged to communicatively couple the edge compute node with a set of network access nodes (NANs) in the multi-access communication network, wherein one or more NANs in the set of NANs is communicatively coupled with one or more user devices; and
   processor circuitry connected to the interface circuitry, wherein the processor circuitry is to:
      collect, via the interface circuitry, metrics related to the multi-access communication network from one or more data sources within the multi-access communication network;
      determine, based on the collected metrics, a reliability target, a network coding (NC) group size, and per path characteristics for each network path of a set of network paths in the multi-access communication network;
      determine a traffic distribution strategy based on the per path characteristics, the NC group size, and the reliability target, wherein the traffic distribution strategy specifies a number of network coded packets to be routed over respective network paths of the set of network paths;
      generate an NC group from a set of incoming packets, wherein the NC group comprises a set of network coded packets to achieve the reliability target; and
      route individual subsets from the NC group to the respective network paths according to the traffic distribution strategy.

2. The edge compute node of claim 1, wherein, to generate the NC group, the processor circuitry is to:
   apply NC to packets in the set of incoming packets to produce the set of network coded packets in the NC group.

3. The edge compute node of claim 1, wherein the processor circuitry is further to:
   determine a code rate for encoding the set of incoming packets based on a ratio of the NC group size to a total number of network coded packets in the NC group.

4. The edge compute node of claim 1, wherein the NC group size is a first NC group size among a plurality of NC group sizes, the traffic distribution strategy is a first traffic distribution strategy, and the processor circuitry is further to:
   determine a respective traffic distribution strategy of a plurality of traffic distribution strategies for each NC group size of the plurality of NC group sizes based on the per path characteristics, a corresponding NC group size of the plurality of NC group sizes, and the reliability target.

5. The edge compute node of claim 4, wherein the processor circuitry is further to:
   perform header inspection on the set of packets to determine a packet identifier of the set of incoming packets associated with a reliability flow, wherein the packet identifier is one or more of a source node network address, a destination node network address, an ingress port number, an egress port number, and a quality of service (QOS) flow identifier.

6. The edge compute node of claim 5, wherein the processor circuitry is further to:
   perform automatic burst size detection based on a burst time spread parameter, wherein the burst time spread parameter specifies a maximum arrival time difference between a first packet of a burst of packets and a last packet of the burst of packets, wherein, to perform the automatic burst size detection, the processor circuitry is to:
      determine a burst size by counting a number of incoming packets of the set of incoming packets arriving within a time window after arrival of the first packet of the burst of packets, wherein the time window has a same size as the burst time spread parameter;
      select a traffic distribution strategy from the plurality of traffic distribution strategies based on the determined burst size; and
      when the set of incoming packets are systematic code packets, route incoming packets of the set of incoming packets arriving within the time window for transmission over one or more network paths of the set of network paths without performing NC on the incoming packets arriving within the time window.

7. The edge compute node of claim 1, wherein the per path characteristics include:
   an erasure probability for transmitting packets over individual network paths of the set of network paths; and
   delay characteristics indicating an expected time required for sending a number of packets over the individual network paths of the set of network paths.

8. The edge compute node of claim 7, wherein the processor circuitry is further to:
   operate an optimizer to determine an optimal subset of network paths from among the set of network paths and an optimal number of network coded packets to belong to the individual subsets of the NC group.

9. The edge compute node of claim 8, wherein the processor circuitry is further to:

operate the optimizer to derive a worst-case delay for the individual network paths of the set of network paths based on the erasure probability, the delay characteristics, the reliability target, and the NC group size, wherein the derived worst-case delay is a maximum amount of acceptable delay for delivering the set of network coded packets over the individual network paths that still meets the reliability target;
determine a burst size based on the NC group size; and
generate a mapping function mapping the worst-case delay to the burst size, wherein the mapping function is for determining admission control criteria for performing admission control.

10. The edge compute node of claim 9, wherein the processor circuitry is further to:
perform admission control for bursty-arrival traffic with a fixed burst size and a burst interval, wherein the burst interval is based on the worst-case delay to the burst size mapping;
perform admission control for periodic-arrival traffic based on an arrival period of the periodic-arrival traffic and the burst size; and
perform the admission control for the bursty-arrival traffic or the periodic-arrival traffic using a leaky-bucket traffic pacing mechanism or a token-bucket traffic pacing mechanism.

11. The edge compute node of claim 8, wherein the processor circuitry is further to:
determine, based on the collected metrics, a delay bound for the individual network paths of the set of network paths; and
operate the optimizer to:
determine, as the optimal subset of network paths, a most resource efficient subset of the set of network paths among various other subsets of network paths from the set of network paths;
determine a feasibility for the set of network coded packets based on the per path characteristics, the NC group size, the reliability target, and the delay bound; and
generate a feasibility indicator based on the determined feasibility, wherein a value of the feasibility indicator indicates whether sending traffic over the individual network paths is feasible or not.

12. The edge compute node of claim 11, wherein:
the feasibility indicator includes a value of 'true' to indicate that sending traffic over the individual network paths is feasible, and the feasibility indicator includes a value of 'false' to indicate that sending traffic over the individual network paths is not feasible; or
the feasibility indicator includes a numeric value, wherein the numeric value being above a predetermined or configured threshold indicates that sending traffic over the individual network paths is feasible, and the numeric value being below the predetermined or configured threshold indicates that sending traffic over the individual network paths is not feasible.

13. The edge compute node of claim 11, wherein the processor circuitry is further to:
perform admission control using the feasibility indicator, wherein performance of the admission control includes:
rejection of admission of the set of network coded packets when the value of the feasibility indicator indicates that sending traffic over the individual network paths is not feasible; and
admission of the set of network coded packets when the value of the feasibility indicator indicates that sending traffic over the individual network paths is feasible.

14. The edge compute node of claim 13, wherein the processor circuitry is further to:
determine whether delivering individual subsets of the optimal subsets of network coded packets to be sent over respective ones of the optimal subset of network paths exceeds a reliability flow resource allocation threshold during a period that is within an inter-burst interval or the delay bound; and
reject admission of the set of network coded packets when delivering at least one of the optimal subsets exceeds the reliability flow resource allocation threshold during the period.

15. The edge compute node of claim 1, wherein the one or more data sources include the set of NANs or the one or more user devices, and the metrics related to the multi-access communication network include access network measurements, wherein the access network measurements include one or more of reference signal received power (RSRP), reference signal received quality (RSRQ), received signal strength indicator (RSSI), received channel power indicator (RCPI), received signal to noise indicator (RSNI), average noise plus interference (ANPI), signal-to-noise ratio (SNR), signal-to-noise and interference ratio (SINR), expected peak data rate, end-to-end delay measurements, backhaul delay measurements, scheduling delay measurements, packet drop rate, and packet error ratio.

16. The edge compute node of claim 15, wherein the metrics related to the multi-access environment further include capabilities indicated by one or more configurations, wherein the capabilities include one or more of QoS capabilities included in a QoS configuration, wireless local area network (WLAN) capabilities included in a WLAN configuration, and radio resource control (RRC) information included in a RRC configuration.

17. The edge compute node of claim 16, wherein the metrics related to the multi-access environment further include application layer metrics, wherein the application layer metrics include one or more of priority indicators for data flows, QoS requirements of the data flows, wherein the QoS requirements include one or more of the reliability target, a latency bound, a minimum guaranteed bit rate, and a maximum burst size.

18. The edge compute node of claim 17, wherein the metrics related to the multi-access environment further include data plane telemetry metrics, wherein the data plane telemetry metrics include one or more of traffic volume estimates of reliability flows, traffic volume estimates of non-reliability flows, flow path and latency metrics, packet drop metrics, traffic congestion metrics, platform load metrics, and application load metrics.

19. One or more non-transitory computer readable media (NTCRM) comprising instructions for operating a reliability enhancement engine (REE), wherein execution of the instructions by one or more processors of a compute node is to cause the compute node to operate the REE to:
collect metrics related to a multi-access communication network from one or more data sources within the multi-access communication network, wherein the one or more data sources include a set of network access nodes (NANs) in the multi-access communication network or one or more user devices connected to the set of NANs;
determine, based on the collected metrics, a reliability target, a network coding (NC) group size, and per path characteristics for each network path of a set of networks paths in the multi-access communication network;

determine a traffic distribution strategy based on the per path characteristics, the NC group size, and the reliability target;

generate an NC group from a set of incoming packets, wherein the NC group comprises a set of network coded packets to achieve the reliability target; and route individual subsets from the NC group to respective network paths of the set of network paths according to the traffic distribution strategy.

20. The one or more NTCRM of claim 19, wherein execution of the instructions is to cause the compute node to operate the REE to:

determine a number of available transmission units on each network path of the set of network paths;

perform NC on the set of incoming packets to obtain the set of network coded packets; and deliver the individual subsets of the set of network coded packets to the respective network paths of the set of network paths.

21. The one or more NTCRM of claim 19, wherein, to determine the number of available transmission units on each network path, execution of the instructions is to cause the compute node to operate the REE to:

calculate a number of independently transmitted packets supported on each network path within a transmission delay bound of the set of incoming packets.

22. The one or more NTCRM of claim 19, wherein, to perform NC on the set of incoming packets and deliver the individual subsets to the respective network paths, execution of the instructions is to cause the compute node to operate the REE to:

group a succession of the set of incoming packets, wherein a length of the succession of the set of incoming packets is specified by a predefined NC configuration;

determine a number of network coded packets in the set of network coded packets to be generated from each grouping of the incoming packets;

determine respective sizes of corresponding subsets of the individual subsets to be delivered to the respective network paths;

generate the individual subsets from each grouping of the incoming packets according to the NC configuration and a total number of network coded packets in the set of network coded packets; and deliver the individual subsets to the respective network paths according to the respective sizes.

23. The one or more NTCRM of claim 22, wherein, to determine the respective sizes of the corresponding subsets, execution of the instructions is to cause the compute node to operate the REE to:

operate an optimizer to determine the respective sizes of the corresponding subsets based on the NC group size, the reliability target, an erasure probability of the respective network paths, a spectral efficiency of the respective network paths, and a number of available transmission units.

24. The one or more NTCRM of claim 23, wherein execution of the instructions is to cause the compute node to operate the REE to:

determine a score for each network path of the set of network paths based on the erasure probability of a corresponding one of each network path, a spectral efficiency of the corresponding one of each network path, the NC group size, and the reliability target;

generate a preference order for each of the respective network paths according to the score of each network path; and operate the optimizer to determine the respective sizes of the corresponding subsets further based on the preference order.

25. The one or more NTCRM of claim 24, wherein execution of the instructions is to cause the compute node to operate the REE to:

operate the optimizer to determine the respective sizes of the corresponding subsets according to a greedy-type algorithm using the preference order, wherein the greedy-type algorithm is a line-search greedy algorithm or a binary-search greedy algorithm; and apply a recursive final-unit adjustment procedure to a result of the greedy-type algorithm.

26. The one or more NTCRM of claim 19, wherein the REE is part of a multi-access traffic manager (MA-TM), and the compute node is an edge compute node.

27. The one or more NTCRM of claim 26, wherein:

the MA-TM is part of an edge platform of an edge compute node, and the REE is an edge app operated by the edge compute node; or the REE and the MA-TM are implemented as respective edge applications (apps) of an edge compute node.

28. The one or more NTCRM of claim 26, wherein:

the edge compute node is a Multi-Access Edge Computing (MEC) server of a MEC framework, and the REE is implemented as a MEC app configured to be operated by a MEC platform of the MEC server;

the edge compute node is a Multi-Access Management Services (MAMS) server or a MAMS client of a MAMS framework, and the REE is implemented as a Network Connection Manager (NCM) configured to be operated by the MAMS server or a Client Connection Manager (CCM) configured to be operated by the MAMS client;

the edge compute node is a Radio Access Network (RAN) intelligent controller (RIC) of an Open RAN Alliance (O-RAN) framework, and the REE is implemented as an xApp configured to be operated by the RIC;

the edge compute node is a central unit (CU) of a CU/distributed unit (DU)-split architecture of a next generation (NG)-RAN architecture of a third generation partnership project (3GPP) cellular network, and the REE is implemented as a network function (NF) configured to be operated by the CU; or the edge compute node is an Edge Enabler Server (EES) or an Edge Configuration Server (ECS) of a 3GPP edge computing architecture, and the REE is implemented as an Edge Application Servers (EAS) configured to be operated by the EES or the ECS.

* * * * *